US011976162B2

(12) United States Patent
Friesen et al.

(10) Patent No.: US 11,976,162 B2
(45) Date of Patent: May 7, 2024

(54) SOLVENT-LESS IONIC LIQUID EPOXY RESIN

(71) Applicant: Arizona Board of Regents on behalf of Arizona State University, Scottsdale, AZ (US)

(72) Inventors: Cody Friesen, Fort McDowell, AZ (US); Jose Antonio Bautista-Martinez, Mesa, AZ (US); Mykhaylo Goncharenko, Scottsdale, AZ (US); Paul Johnson, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 2 days.

(21) Appl. No.: 17/431,961

(22) PCT Filed: Feb. 18, 2020

(86) PCT No.: PCT/US2020/018682
§ 371 (c)(1),
(2) Date: Aug. 18, 2021

(87) PCT Pub. No.: WO2020/172191
PCT Pub. Date: Aug. 27, 2020

(65) Prior Publication Data
US 2022/0153922 A1 May 19, 2022

Related U.S. Application Data

(60) Provisional application No. 62/807,134, filed on Feb. 18, 2019.

(51) Int. Cl.
C08G 59/22 (2006.01)
C08G 59/02 (2006.01)
C08G 59/24 (2006.01)
C08G 59/30 (2006.01)
C08G 59/32 (2006.01)
C08G 59/40 (2006.01)
C08G 59/50 (2006.01)
C08G 59/56 (2006.01)
C08L 63/00 (2006.01)
H01G 9/025 (2006.01)
H01G 11/56 (2013.01)

(52) U.S. Cl.
CPC ....... *C08G 59/5073* (2013.01); *C08G 59/022* (2013.01); *C08G 59/245* (2013.01); *C08G 59/304* (2013.01); *C08G 59/4064* (2013.01); *C08G 59/4071* (2013.01); *C08G 59/56* (2013.01); *C08L 63/00* (2013.01); *C08L 2203/20* (2013.01)

(58) Field of Classification Search
None
See application file for complete search history.

(56) References Cited

U.S. PATENT DOCUMENTS

| 5,229,392 A | 7/1993 | George et al. |
| 8,075,757 B2 | 12/2011 | Friesen et al. |
| 8,168,337 B2 | 5/2012 | Friesen et al. |
| 8,282,809 B2 | 10/2012 | Friesen et al. |
| 8,309,259 B2 | 11/2012 | Friesen et al. |
| 8,445,133 B2 | 5/2013 | Friesen et al. |
| 8,450,498 B2 | 5/2013 | Paley |
| 8,470,157 B2 | 6/2013 | Friesen et al. |
| 8,481,207 B2 | 7/2013 | Friesen et al. |

(Continued)

FOREIGN PATENT DOCUMENTS

| CN | 102197066 | 9/2011 |
| CN | 102531991 | 7/2012 |

(Continued)

OTHER PUBLICATIONS

[No Author Listed] [online], "Former National Compliance Initiative: Cutting Hazardous Air Pollutants," available on or before Feb. 12, 2020, via Internet Archive: Wayback Machine URL <http://web.archive.org/web/20200311020430/https://www.epa.gov/enforcement/former-national-compliance-initiative-cutting-hazardous-air-pollutants>, 4 pages.

Adamovich, et al., "Biologically active protic (2-hydroxyethyl)ammonium ionic liquids. Liquid aspirin," Letters to the Editor in Russian Chemical Bulletin, International Edition, vol. 61, No. 6, Jun. 2012, pp. 1260-1261.

Al-Mohammed, et al., "Bis-imidazolium and benzimidazolium based gemini-type ionic liquids structure: synthesis and antibacterial evaluation", Royal Society of Chemistry, RSC Advanced, 2015, 5, pp. 92602-92617.

(Continued)

*Primary Examiner* — Michael J Feely
(74) *Attorney, Agent, or Firm* — Fish & Richardson P.C.

(57) ABSTRACT

Solvent free epoxy systems are disclosed that can include a hardener compound H comprising: a molecular structure $(R_1—(Y^1)n)$, wherein $R_1$ is an ionic moiety, $Y^1$ is a nucleophilic group, n is a between 2 and 10; and an ionic moiety A acting as a counter ion to $R_1$; and an epoxy compound E comprising: a molecular structure $(R_2—Z^1)n)$, wherein $R_2$ is an ionic moiety, $Z^1$ comprises an epoxide group, n is a between 2 and 10, and an ionic moiety B acting as a counter ion to $R_2$. In embodiments, the epoxy compound E and/or the hardener H is comprised in a solvent-less ionic liquid. The systems can further include accelerators, crosslinkers, plasticizers, inhibitors, ionic hydrophobic and/or super-hydrophobic compounds, ionic hydrophilic compounds, ionic transitional hydrophobic/hydrophilic compounds, biological active compounds, and/or plasticizer compounds. Polymers made from the disclosed epoxy systems and their methods of use are described.

20 Claims, 29 Drawing Sheets

(56) References Cited

U.S. PATENT DOCUMENTS

| | | | |
|---|---|---|---|
| 8,546,028 | B2 | 10/2013 | Friesen et al. |
| 8,895,197 | B2 | 11/2014 | Friesen et al. |
| 9,184,478 | B2 | 11/2015 | Friesen et al. |
| 9,236,643 | B2 | 1/2016 | Friesen et al. |
| 9,346,925 | B2 | 5/2016 | Chen et al. |
| 9,687,840 | B2 | 6/2017 | Gin et al. |
| 9,780,394 | B2 | 10/2017 | Friesen et al. |
| 9,882,215 | B2 | 1/2018 | Johnson et al. |
| 9,990,578 | B2 | 6/2018 | Johnson et al. |
| 10,060,240 | B2 | 8/2018 | Friesen et al. |
| 10,090,520 | B2 | 10/2018 | Friesen et al. |
| 10,256,460 | B2 | 4/2019 | Friesen et al. |
| 10,374,236 | B2 | 8/2019 | Friesen et al. |
| 10,443,365 | B2 | 10/2019 | Friesen et al. |
| 10,457,853 | B2 | 10/2019 | Friesen et al. |
| 10,458,220 | B2 | 10/2019 | Switzer et al. |
| 10,482,367 | B2 | 11/2019 | Johnson et al. |
| 10,909,437 | B2 | 2/2021 | Jonhson et al. |
| 10,975,238 | B2 * | 4/2021 | Friesen ............... C08K 5/3435 |
| 2007/0129568 | A1 | 6/2007 | Flanagan et al. |
| 2007/0194275 | A1 | 8/2007 | Masuda et al. |
| 2009/0017342 | A1 | 1/2009 | Friesen et al. |
| 2010/0004389 | A1 | 1/2010 | Paley et al. |
| 2010/0048829 | A1 | 2/2010 | D'Andola et al. |
| 2011/0039467 | A1 * | 2/2011 | Xu ............... C08K 5/50 558/207 |
| 2011/0250502 | A1 * | 10/2011 | Gonzalez ............... H01B 1/122 429/207 |
| 2011/0257409 | A1 * | 10/2011 | Paley ............... C08G 59/10 548/311.1 |
| 2014/0212582 | A1 * | 7/2014 | Padilla-Acevedo ... C08G 59/50 523/400 |
| 2015/0209776 | A1 | 7/2015 | Gin et al. |
| 2016/0350565 | A1 | 12/2016 | Friesen et al. |
| 2018/0260673 | A1 | 9/2018 | Johnson et al. |
| 2019/0036115 | A1 | 1/2019 | Friesen et al. |
| 2019/0123340 | A1 | 4/2019 | Friesen et al. |
| 2019/0276662 | A1 | 9/2019 | Friesen et al. |
| 2019/0355996 | A1 | 11/2019 | Friesen et al. |
| 2021/0363341 | A1 | 11/2021 | Friesen et al. |

FOREIGN PATENT DOCUMENTS

| | | |
|---|---|---|
| CN | 105949129 | 9/2016 |
| EP | 2174969 | 4/2010 |
| EP | 2950153 | 12/2015 |
| JP | 2004-059924 | 2/2004 |
| JP | 2009-256574 | 11/2009 |
| JP | 2010-150356 | 7/2010 |
| JP | 2012-012350 | 1/2012 |
| WO | WO 2008/079586 | 7/2008 |
| WO | WO 2008/080075 | 7/2008 |
| WO | WO 2009/124249 | 10/2009 |
| WO | WO 2009/142848 | 11/2009 |
| WO | WO 2010/002438 | 1/2010 |
| WO | WO 2010/132357 | 11/2010 |
| WO | WO 2011/142855 | 11/2011 |
| WO | WO 2011/143368 | 11/2011 |
| WO | WO 2011/146154 | 11/2011 |
| WO | WO 2013/106122 | 7/2013 |
| WO | WO 2014/159676 | 10/2014 |
| WO | WO 2014/164150 | 10/2014 |
| WO | WO 2015/105746 | 7/2015 |
| WO | WO 2015/106132 | 7/2015 |
| WO | WO 2015/175553 | 11/2015 |
| WO | WO 2015/175556 | 11/2015 |
| WO | WO 2016/037094 | 3/2016 |
| WO | WO 2016/137931 | 9/2016 |
| WO | WO 2018/081165 | 5/2018 |

OTHER PUBLICATIONS

Araujo, et al., "Cholinium-based ionic liquids with pharmaceutically active anions", Royal Society of Chemistry, RSC Advances, 2014, 4, pp. 28126-28132.

Balk, et al., "'Pro et contra' ionic liquid drugs—Challenges and opportunities for pharmaceutical translation", European Journal of Pharmaceutics and Biopharmaceutics 94 (2015) pp. 291-304.

Bica, et al., "Pharmaceutically active ionic liquids with solids handling, enhanced thermal stability, and fast release", Chem. Commun., 2012, 48, pp. 5422-5424.

Bratychak, et al., "Synthesis and Properties of Peroxy Derivatives of Epoxy Resins Based on Bisphenol A. 1. Effects of the Presence of Inorganic Bases", Polymer Engineering and Science, Aug. 1999, vol. 39, pp. 1541-1549.

Cabeza, "Properties and Green Aspects of Ionic Liquids," Ionic Liquids in Separation Technology, 2014, 12 pages.

Chiappe et al., "Ionic Liquids: solvent properties and organic reactivity," J. Phys. Org. Chem. 2005, 18, 275-297.

Chiappe et al., "Stereoselective Halogenations of Alkenes and Alkynes in Ionic Liquids," Organic Letters, 2001, 3(7), 1061-1063.

Choi, et al., "Dual functional ionic liquids as plasticisers and antimicrobial agents for medical polymers", Green Chem. 2011, 13, pp. 1527-1535.

Chowdhury et al., "Reactivity of ionic liquids," Tetrahedron 63 (2007) 2363-2389.

Environmental Protection Agency, "Clean Air Act Stationary Source Compliance Monitoring Strategy," Oct. 2016, 26 pages.

Environmental Protection Agency, "EPA-453/R-08-005 Control Techniques Guidelines for Miscellaneous Industrial Adhesives", Sep. 2008, 47 pages.

Environmental Protection Agency, "National Emission Standards for Hazardous Air Pollutants (NESHAP): Plywood and Composite Wood Products Compliance Requirements & Timeline," Feb. 16, 2006, retrieved from URL <https://www.epa.gov/stationary-sources-air-pollution/national-emission-standards-hazardous-air-pollutants-neshap-9>, 15 pages.

Extended European Search Report in European Appln. No. 20922504.4, dated Aug. 26, 2022, 7 pages.

Fedoseev, M. et al., "1-Butyl-3-methylimidazolium Salts as New Catalysts to Produce Epoxy-anhydride Polymers with Improved Properties", International Journal of Polymer Science, May 2014, vol. 2014, 8 pages, Article ID 607341 <DOI:10.1155/2014/607341>.

Ferraz, et al., "Antitumor Activity of Ionic Liquids Based on Ampicillin", ChemMedChem, 2015, 10, pp. 1480-1483.

Guo, X. Pan, C. Zhang, W. Liu, M. Wang, X. Fang, S. Dai., "Ionic liquid electrolyte based on S-propyltetrahydrothiophenium iodide for dye-sensitized solar cells," Solar Energy, 2010, 84, 373-378.

Hager, et al., Self-Healing Materials, Adv. Mater., 2010, 22, pp. 5424-5430.

Hagiwara, K. Matsumoto, Y. Nakamori, T. Tsuda, Y. Ito, H. Matsumoto, K. Momota, "Physicochemical Properties of 1,3-Dialkylimidazolium Fluorohydrogenate Room-Temperature Molten Salts," J. Electrochem. Soc., 150 (12) D195-D199, 2003.

Handy, "Applications of Ionic Liquids in Science and Technology", IntechOpen, Sep. 2011, pp. 1-528 <DOI:10.5772/1769>.

Hohlbein, et al., "Self-healing dynamic bond-based rubbers: understanding the mechanisms in ionomeric elastomer model systems", Phys. Chem. Chem. Phys., 2015, 17, pp. 21005-21017.

Hough, et al., "The third evolution of ionic liquids: active pharmaceutical ingredients", New J. Chem., 2007, 31, pp. 1429-1436.

Ignatev, et al., "New hydrophobic ionic liquids with perfluoroalkyl phosphate and cyanofluoroborate anions", Journal of Fluorine Chemistry 177 (2015) pp. 46-54.

Immergut, et al., "Principles of Plasticization," Platzer; Plasticization and Plasticizer Processes Advances in Chemistry; American Chemical Society: Washington, DC, 1965, 26 pages.

International Search Report and Written Opinion in International Appln. No. PCT/US2017/058142, dated Feb. 12, 2018, 11 pages.

Jaitely, A. Karatas, A. T. Florence, "Water-immiscible room temperature ionic liquids (RTILs) as drug reservoirs for controlled release," Int. J. of Pharmaceutics, 2008, 354, 168-173.

(56) References Cited

OTHER PUBLICATIONS

Kamal and G. Chouhan, "A task-specific ionic liquid [bmim]SCN for the conversion of alkyl halides to alkyl thiocyanates at room temperature," Tetrahedron Letters 46 (2005) 1489-1491.
Kim, R. S. Varma, "Tetrahaloindate(III)-Based Ionic Liquids in the Coupling Reaction of Carbon Dioxide and Epoxides to Generate Cyclic Carbonates: H-Bonding and Mechanistic Studies," J. Org. Chem. 2005, 70, 7882-7891.
Kowalczyk et al., "Ionic liquids as convenient latent hardeners of epoxy resins", Polimery, Nov. 2003, vol. 18, No. 11, pp. 833-835 <DOI:10.14314/polimery.2003.833>.
Kunchornsup, et al., "Physical cross-linked cellulosic gel via 1-butyl-3-methylimidazolium chloride ionic liquid and its electromechanical responses", Sensors and Actuators A, 175, 2012, pp. 155-164.
Li, et al., "Thermal behavior of cellulose diacetate melt using ionic liquids as plasticizers," RSC Adv., 2015, 5, pp. 901-907.
Mahadeva, et al., "Electromechanical Behavior of Room Temperature Ionic Liquid Dispersed Cellulose," J. Phys. Chem. C, 2009, 113, pp. 12523-12529.
Maka et al., "Epoxy Resin/Ionic Liquid Systems: The Influence of Imidazolium Cation Size and Anion Type on Reactivity and Thermomechanical Properties", Industrial and Engineering Chemistry Research, Mar. 2012, vol. 51, pp. 5197-5206 <DOI: 10.1021/ie202321j>.
Maka et al., "Epoxy resin/phosphonium ionic liquid/carbon nanofiller systems: Chemorheology and properties", eXPRESS Polymer Letters vol. 8, No. 10, 2014. pp. 723-732.
Maka et al., "Imidazolium and Deep Eutectic Ionic Liquids as Epoxy Resin Crosslinkers and Graphite Nanoplatelets Dispersants", Journal of Applied Polymer Science, Jan. 2014, vol. 131, pp. 40401-1-40401-7 <DOI:10.1002/app.40401>.
Mandal, et al., "Ionic Liquid Integrated Multiwalled Carbon Nanotube in a Poly(vinylidene fluoride) Matrix: Formation of a Piezoelectric B-Polymorph with Significant Reinforcement and Conductivity Improvement," ACS Appl. Mater. Interfaces 2013, 5, pp. 747-760.
Matsumoto, K. et al., "Confinement of Ionic Liquid by Networked Polymers Based on Multifunctional Epoxy Resins", Macromolecules, Jul. 2008, vol. 41, No. 19, pp. 6981-6986 <DOI: 10.1021/ma801293j>.
Matsumoto, K. et al., "Synthesis and properties of methacrylate-based ionic networked polymers containing ionic liquids: comparison of ionic and nonionic networked polymers", Polymer Bulletin, Jun. 2010, vol. 66, No. 6, pp. 771-778 <DOI:10.1007/s00289-010-0310-1>.
Meng, Z. et al., "Dissolution of natural polymers in ionic liquids: A review", e-Polymers, Mar. 2012, vol. 12, No. 1, 29 pages, article 028 <DOI:10.1515/epoly.2012.12.1.317>.
Messadi, et al., "Syntheses and characterisation of hydrophobic ionic liquids containing trialkyl {2-elhoxy-2oxoethyl) ammonium or N-(1-methylpyrrolidyl-2-elhoxy-2-oxoethyl)ammonium cations," Journal of Molecular Liquids 184 (2013), pp. 68-72.
Moriel, et al., "Synthesis, characterization, and catalytic activity of ionic liquids based on biosources," Tetrahedron Letters 51 (2010) 4877-4881.
Muhamad, et al., "A review on bisphenol A occurrences, health effects and treatment process via membrane technology for drinking water,". Environ Sci. Pollut Res. In press. DOI 10.1007/s11356-016-6357-2, pp. 11549-11567, (2016).
Nezhad, E. et al., "Task specific ionic liquid as solvent, catalyst and reagent for regioselective ring opening of epoxides in waler", Arabian Journal of Chemistry, Dec. 2014, vol. 12, No. 8, pp. 2098-2103 <DOI: 10.1016/j.arabjc.2014.12.037>.
Nguyen et al., "Ionic Liquids: A New Route for the Design of Epoxy Networks", ACS Sustainable Chem. Eng., [Published online] Oct. 22, 2015, vol. 4, No. 2, pp. 481-490.
Office Action in Chinese Appln. No. 201780071976.X, dated Nov. 16, 2022, 14 pages (with English translation).
Office Action in Japanese Appln. No. 2019-543192, dated Oct. 5, 2021, 14 pages (with English translation).

Park, et al., "Ionic Liquids as Plasticizers/Lubricants for Polylactic Acid," Polymer Engineering and Science, 2010, 50(6), pp. 1105-1110.
Patel, et al., "Applications of Ionic Liquids," The Chemical Record, 2012, 12, 329-355.
Pernak, et al., Synthesis, properties and evaluation of biological activity of herbicidal ionic liquids with 4-(4-chloro-2-methylphenoxy)butanoate anion, RSC Advances, RSC Adv., 2016, 6, pp. 7330-7338.
Prudencio, et al., "Liquidos Ionicos Como Plastificantes Em Blendas De Borracha Nitrilica/Polianilina", Quim. Nova, 2014, 37 (4), pp. 618-623, [with English abstract].
Rahmathullah, M. et al., "Room Temperature Ionic Liquids as Thermally Latent Initiators for Polymerization of Epoxy Resins", Macromolecules, May 2009, vol. 42, No. 9, pp. 3219-3221 <DOI: 10.1021/ma802669k>.
Romeli, et al., "Synthesis and Characterization of Flufenamic Ionic Liquids," J. Appl. Sci., 2014, 14 (23), pp. 3373-3376.
Saurin, N. et al., "Self-Healing of Abrasion Damage in Epoxy Resin-Ionic Liquid Nanocomposites", Tribology Letters, Mar. 2015, vol. 58, No. 4, 9 pages <DOI: 10.1007/s11249-015-0490-9>.
Scott, et al., "Application of ionic liquids as plasticizer for poly(methyl methacrylate)", Chem. Commun., 2002, pp. 1370-1371.
Sha, et al., "Reversible tuning of the hydrophobic-hydrophilic transition of hydrophobic ionic liquids by means of an electric field," Soft Matter, 2011, 7:4228-4233.
Shirshova, N. et al., "Structural Supercapacitor Electrolytes Based on Bicontinuous Ionic Liquid—Epoxy Resin Systems", Journal of Materials Chemistry A, Dec. 2013, vol. 1, No. 48, pp. 15300-15309, plus supplemental info <DOI:10.1039/C3TA13163G>.
siemens.com [online], "Steam Turbines—Power Generation | Energy Technology," available on or before Aug. 26, 2018, via Internet Archive: Wayback Machine URL <http://web.archive.org/web/20180826144615/http://www.siemens.com:80/global/en/home/products/energy/power-generation/steam-turbines.html#!/>, 11 pages.
Soares, B. et al., "Preparation of Epoxy/Jeffamine Networks Modified with Phosphonium Based Ionic Liquids", Macromolecular Materials and Engineering, 2015, vol. 300, pp. 312-319 <DOI:10.1002/mame.201400293>.
Soares, B. et al., "Synthesis and Characterization of Epoxy/MCDEA Networks Modified with Imidazolium-Based Ionic Liquids", Macromolecular Materials and Engineering, May 2011, vol. 296, pp. 826-834 <DOI:10.1002/mame.201000388>.
Soares, et al., "New Epoxy/Jeffamine Networks Modified with Ionic Liquids", Journal of Applied Polymer Science, 2014, pp. 39834-39834.
Throckmorton, J., "Ionic Liquid-Modified Thermosets and Their Nanocomposites: Dispersion, Exfoliation, Degradation, and Cure", Drexel University Doctor of Philosophy Thesis, Jun. 2015, 170 pages.
Xiong, et al., "Reversible Hydrophobic-Hydrophilic Transition of Ionic Liquids Driven by Carbon Dioxide", Angew. Chem. Int. Ed. 2015, 54, pp. 7265-7269.
Yarinich, et al., "Synthesis and structure-activity relationship of novel 1,4-diazabicyclo [2.2.2]octane derivatives as potent antimicrobial agents", European Journal of Medicinal Chemistry, 2015, 95, pp. 563-573.
Yoshino et al., "Halofluorination of alkenes with ionic liquid EMIMF(HF)2.3," Journal of Fluorine Chemistry 125 (2004) 455-458.
Zhang, et al., "A Novel Dual Amino-Functionalized Cation-Tethered Ionic Liquid for CO2 Capture,", Ind. Eng. Chem. Res. 2013, 52, pp. 5835-5841.
Zhang, et al., "Highly conductive polymer composites from room temperature ionic liquid cured epoxy resin: effect of interphase layer on percolation conductance", RSC Advances, 2013, vol. 3, pp. 1916-1921 <DOI: 10.1039/c2ra23027 e>.
Zhang, et al., "Ionic Liquids as Plasticizers for Polyelectrolyte Complexes", J. Phys. Chem. B, 2015, 119, pp. 3603-3607.
Office Action in Chinese Appln. No. 202080026031.8, dated Jan. 27, 2024, 26 pages (with English translation).

\* cited by examiner

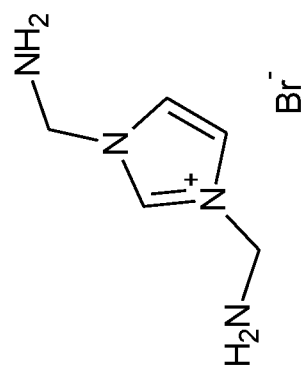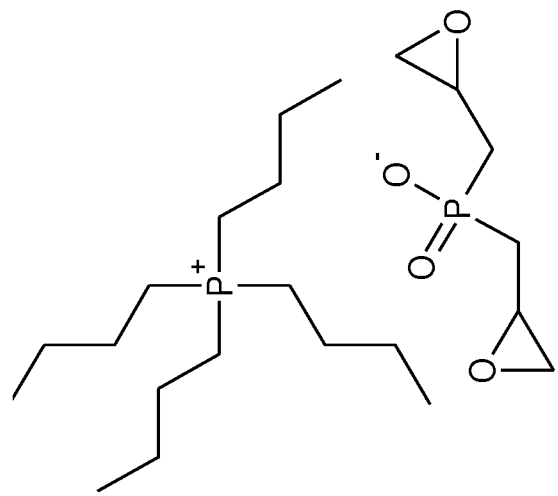
Figure 4

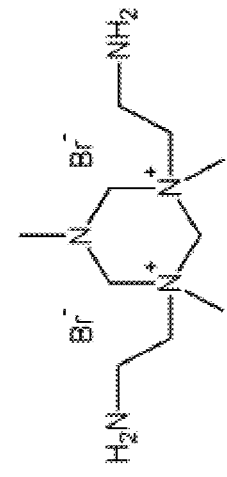
Figure 10C
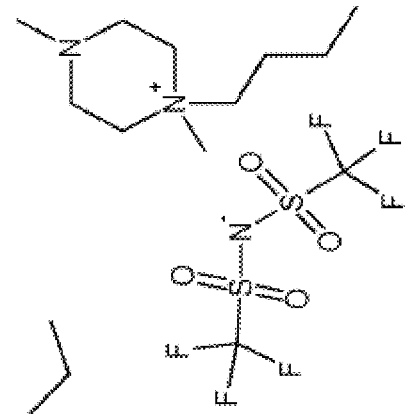
Figure 10F
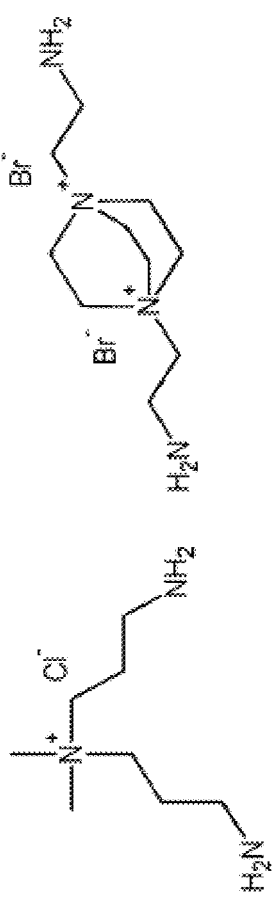
Figure 10B
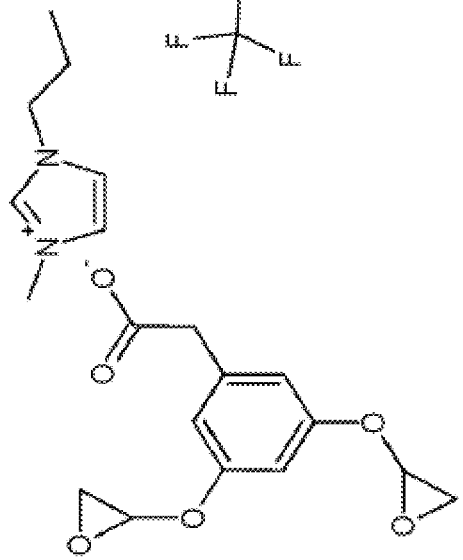
Figure 10E
Figure 10A
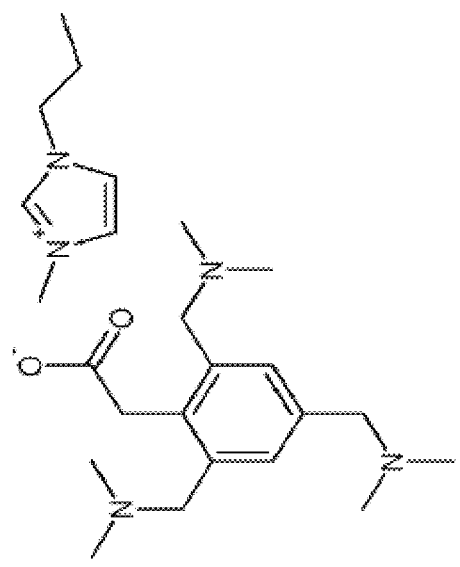
Figure 10D

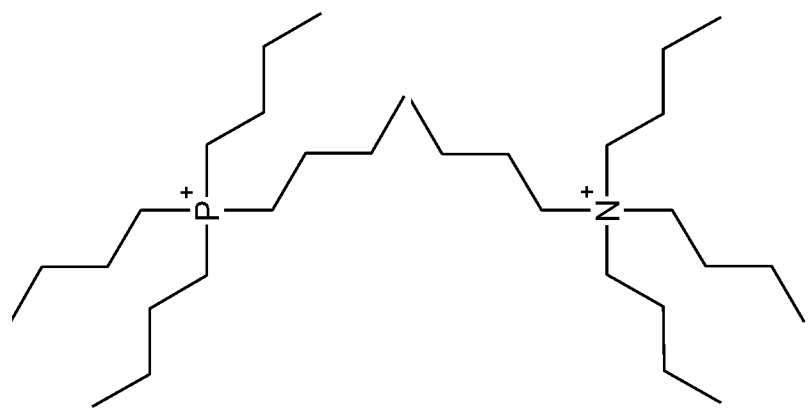
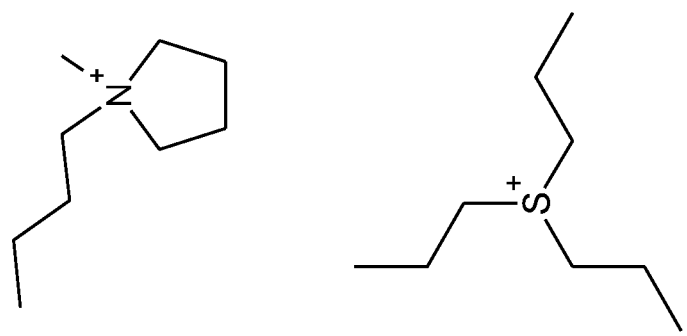
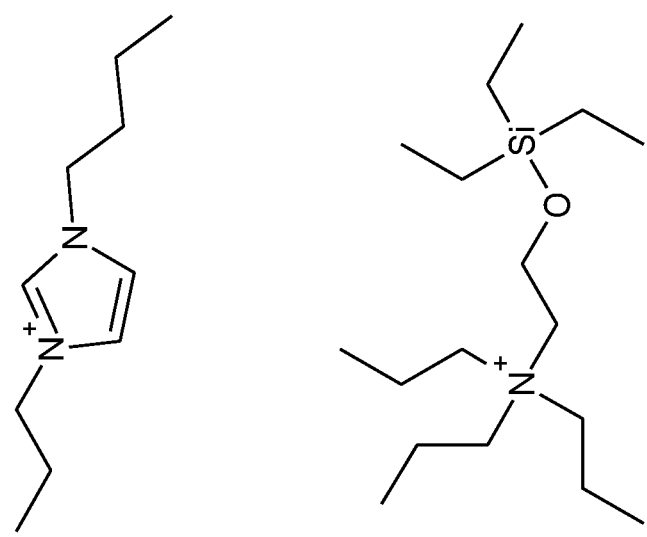
Figure 12

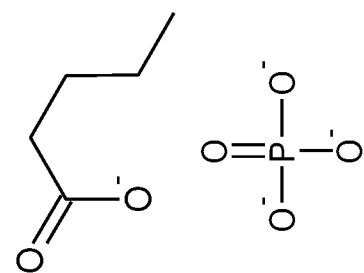
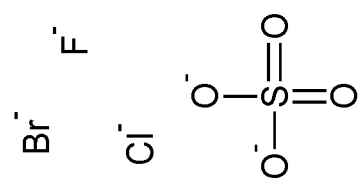
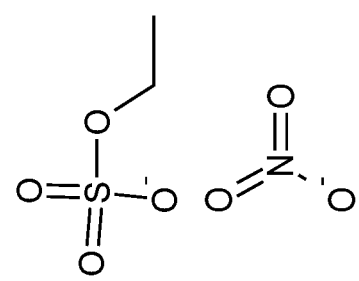
Figure 13

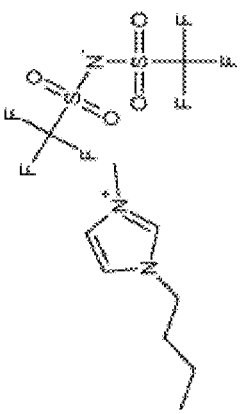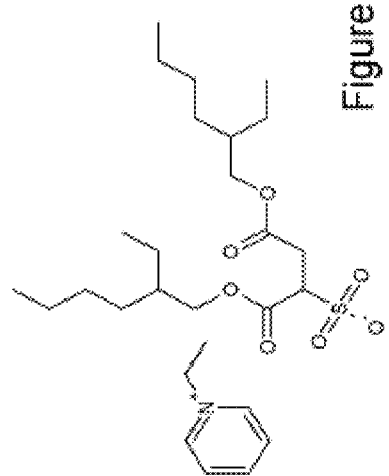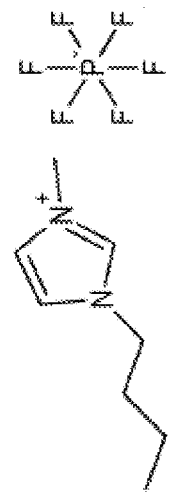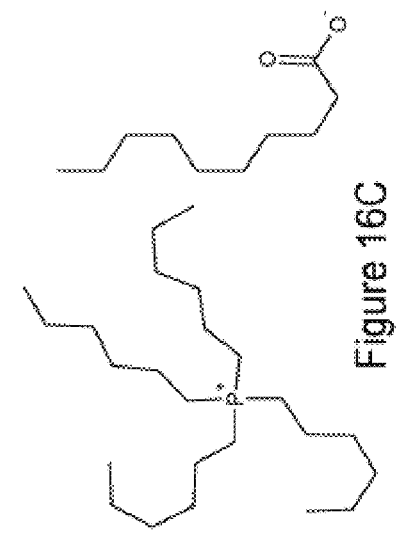

SOLVENT-LESS IONIC LIQUID EPOXY RESIN

CROSS REFERENCE TO RELATED APPLICATION

This application is a U.S. National Phase Application of International Patent Application No. PCT/US2020/018682, filed Feb. 18, 2020, which claims the benefit of the earlier filing date of U.S. Provisional Application No. 62/807,134 filed on Feb. 18, 2019, both of which are hereby incorporated by reference in their entirety.

FIELD OF THE DISCLOSURE

The present disclosure relates to novel ionic epoxy resins, systems containing such resins, and methods of making or using such resins.

BACKGROUND

Traditional epoxy systems often include thermoset polymers that are widely used in dental fillings, printed circuit boards, wind turbines, lightweight vehicles, coatings, sheathing, flooring, adhesives, aerospace applications and a variety of other applications. This wide range of applications is facilitated by the availability of various curing reactions—and associated chemical compositions and structures—that provide for desired properties of hardness, flexibility, adhesion, degree of crosslinking, the nature of the interchain bond, high strength (tensile, compressive and flexural), chemical resistance, fatigue resistance, corrosion resistance and electrical resistance. Properties of uncured epoxy resins, such as viscosity, facilitate processability by appropriate selection of the monomer, the curing agents, and catalyst. Depending on the source, it is estimated that the worldwide epoxy market could increases from 6.0 to 7.1 USD billion in 2015 to 9.2 to 10.5 USD billion in 2024 with an average production of 2.5 million metric tons per year.

Traditionally, many of the remarkable properties of epoxy systems come at the cost of significant volatile organic compound (VOC) emissions and pose health risks to human operators. As such, traditional epoxies cannot be considered a green technology and require Environmental Protection Agency (EPA) regulation (e.g., the EPA require that at least 80% of all VOCs are captured in industrial processes), resulting in a significant impact on overall operational cost together with health risks for human operators involved in manufacturing.

SUMMARY

Disclosed are low or solvent free ionic epoxy systems that include a hardener compound H and an epoxy compound E. In some embodiments, the hardener compound comprises a molecular structure ($Y^1$—$R_1$—$Y^2$), wherein $R_1$ is an ionic moiety, $Y^1$ is a nucleophilic group and $Y^2$ nucleophilic group; and an ionic moiety A acting as a counter ion to $R_1$. In some embodiments, the epoxy compound comprises a molecular structure ($Z^1$—$R_2$—$Z^2$), where $R_2$ is an ionic moiety, $Z^1$ comprises an epoxide group, and $Z^2$ comprises an epoxide group; and an ionic moiety B acting as a counter ion to $R_2$. In some embodiments, a low or solvent free epoxy system comprises a hardener compound H comprising: a molecular structure ($R_1$—($Y^1$)$_n$), wherein $R_1$ is an ionic moiety, $Y^1$ is a nucleophilic group, n is a between 2 and 10; and an ionic moiety A acting as a counter ion to $R_1$; and an epoxy compound E comprising: a molecular structure ($R_2$—$Z^1$)$_n$), wherein $R_2$ is an ionic moiety, $Z^1$ comprises an epoxide group, n is a between 2 and 10, and an ionic moiety B acting as a counter ion to $R_2$. In some embodiments, $Y^1$ comprises a nucleophile independently selected from: a $NH_2$ group, a SH group, an OH group, a SeH group, and a $PH_2$ group.

In some embodiments, the epoxy compound E and/or the hardener H is comprised in a solvent-less ionic liquid, which significantly addresses the issue of VOC in traditional epoxies. In some embodiments, the hardener compound is 1,3,5-tris[1-(2'-aminoethyl)-2-methyl-1H-imidazol-3-iummethylene]benzene tribromide. In some embodiments, the epoxy compound is tetrakis[1-(2'-aminoethyl)-2-methyl-1H-imidazol-3-iummethyl]methane tetrabromide.

In some embodiments, a low or solvent free ionic thermosetting epoxy system is disclosed that comprises a hardener crosslinker compound H comprising: a molecular structure ($R_1$—($Y^{1,2,3}$)$_3$), wherein $R_1$ is an ionic moiety, $Y^1$ is a nucleophilic group, $Y^2$ is a nucleophilic group and $Y^3$ nucleophilic group; and an ionic moiety A acting as a counter ion to $R_1$; and an epoxy crosslinker compound E comprising: a molecular structure ($R_2$—($Z^{1,2,3}$)$_3$), wherein $R_2$ is an ionic moiety, $Z^1$ comprises an epoxide group, $Z^2$ comprises an epoxide group and $Z^3$ comprises an epoxide group; and an ionic moiety B acting as a counter ion to $R_2$. In some embodiments, the epoxy crosslinker compound E is a solvent-less ionic thermosetting crosslinker resin. In some embodiments, $Y^1$, $Y^2$, and $Y^3$ comprise a nucleophile independently selected from: a $NH_2$ group, a SH group, an OH group, a SeH group, and a $PH_2$ group. In some embodiments, the hardener crosslinker compound H is a solvent-less Ionic Thermosetting Crosslinker Hardener. In some embodiments, the hardener crosslinker compound is 1,3,5-tris[1-(2'-aminoethyl)-2-methyl-1H-imidazol-3-iummethylene]benzene tribromide. In some embodiments, the epoxy crosslinker compound is tetrakis[1-(2'-aminoethyl)-2-methyl-1H-imidazol-3-iummethyl]methane tetrabromide.

In some embodiments, the disclosed systems further include accelerators, crosslinkers, plasticizers, inhibitors, ionic hydrophobic and/or super-hydrophobic compounds, ionic hydrophilic compounds, ionic transitional hydrophobic/hydrophilic compounds, and/or biological active (BAIL, Biological Active Ionic Liquid) compounds.

Also disclosed are polymers made from the disclosed epoxy systems and their methods of use. In certain embodiments, the polymer produced upon polymerization of hardener compound H and epoxy compound E may have self-healing properties due to the presence of stable electrical charges along to the polymeric chains that drive the healing process through electrostatic attraction. In embodiments, a polymer produced upon polymerization of hardener compound H and epoxy compound E forms a highly and regular porous system, which can be used, but not limited to: a filtration membrane, solid electrolyte after replacing the secondary ionic liquid, exchange membrane, etc. In certain embodiments, the polymer comprises a solid electrolyte, which may be used as an electronic component, such as a component of a battery, a capacitor, a piezoelectric material and/or an electro-actuator.

The foregoing and other features of the disclosure will become more apparent from the following detailed description, which proceeds with reference to the accompanying figures.

BRIEF DESCRIPTION OF THE DRAWINGS

FIG. 4 shows the chemical structures of examples of solvent-less ionic liquid epoxy resin and hardener, in accordance with embodiments disclosed herein.

FIGS. 10A-10I show the chemical structures of exemplary ionic liquid examples FIG. 10A) and FIG. 10B) ionic liquid hardeners, FIG. 10C) self-catalyzed ionic liquid hardener, FIG. 10D) ionic liquid accelerator, FIG. 10E) ionic liquid epoxy resin, FIG. 10F) ionic liquid accelerator, FIG. 10G) and FIG. 10H) ionic liquid crosslinker, and FIG. 10I) ionic liquid accelerator, in accordance with embodiments disclosed herein.

FIG. 12 shows the chemical structures of examples of hydrophobic cations usable for the synthesis of ionic liquid epoxides and hardeners, in accordance with embodiments disclosed herein.

FIG. 13 shows the chemical structures of examples of hydrophilic anions usable for the synthesis of ionic liquid epoxides and hardeners.

FIG. 15B) cholinium pyrazinate, cytotoxicity; FIG. 15C) Tris(2-hydroxyethyl)methylammonium salicylate, anticoagulant-antiinflammatory; FIG. 15D) ranitidinium docusate, histaminic-emollient; FIG. 15E) lidocainium docusate, pain reliever-emollient; and FIG. 15F) didecyldimethylammonium ibunoprofenate, antibacterial-anti-inflammatory, in accordance with embodiments disclosed herein.

FIGS. 16A-16F show the chemical structures of examples of ionic liquids used as plasticizers in polymer and epoxides systems. FIG. 16A) 1-butyl-3-methylimidazolium tetrafluoroborate, FIG. 16B) 1-butyl-3-methylimidazolium bis(trifluoromethylsulfonyl)imide, FIG. 16C) tetrahexylphosphonium decanoate, FIG. 16D) 1-ethylpyridinium bis(2-ethylhexyl)sulfosuccinate, FIG. 16E) 1-butyl-3-methylimidazolium hexafluorophosphate, and FIG. 16F) 1-octyl-3-methylimidazolium chloride, in accordance with embodiments disclosed herein.

DETAILED DESCRIPTION

Overview

Figure 1:
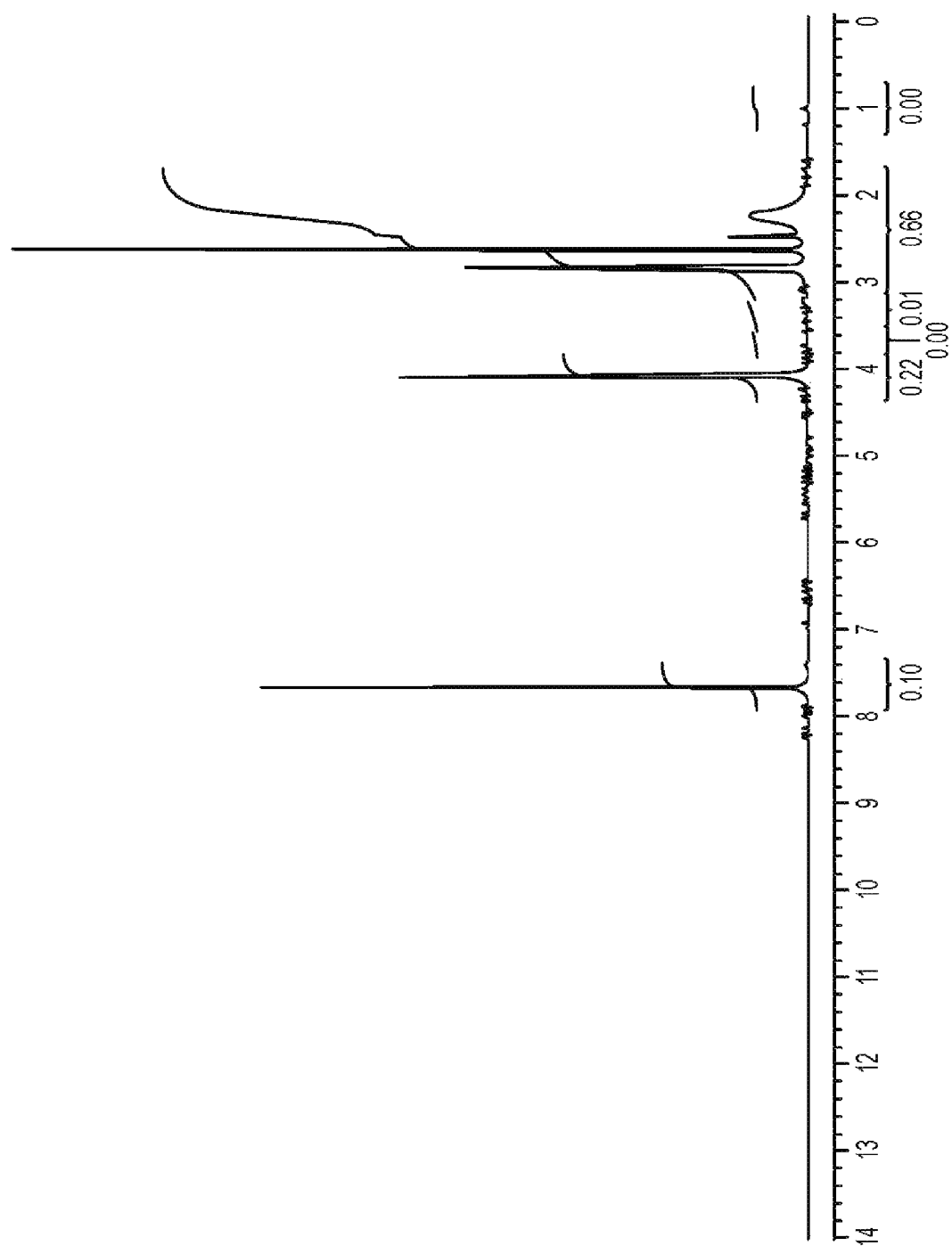
FIG. 1 is an example of a typical NMR spectra of 1,3-di(2'-aminoethylene)-2-methylimidazolium bromide.

Various embodiments are based on a realization by the inventors of an improved epoxy chemistry that limits VOC emissions—e.g., at low vapor pressure while retaining the broad applicability of current systems—to dramatically reduce processing costs and mitigate associated health hazards. The present disclosure relates generally to techniques and mechanisms that, according to different embodiments, variously provide a system of reactive ionic liquids that, when combined, react to form high-strength, versatile and/or added-functionality epoxy-based thermosets. These epoxy systems solve the aforementioned issue of VOC outgassing.

Some embodiments include synthesizing ionic liquids that, for example, incorporate anions substituted with epoxides (glycidyl groups) on the anion. Another such ionic liquid can contain cations of both diamines and triamines. Still another such ionic liquids can contain alkylated-DABCO cation catalysts. Room-temperature ionic liquids are organic salts that melt below standard conditions and form solvent-less liquids with a number of unique physical properties, including zero vapor pressure. There are estimated to be approximately $10^6$ likely ion-pair combinations that form ionic liquids. Synthesizing organic salts that incorporate reactive moieties enable solvent-free and volatile-free chemistry. What follows are a set of example reductions to practice.

To illustrate certain features of various embodiments, solvent-less ionic liquid epoxy systems are variously described with respect to an ionic moiety group $R_1$ and an ionic portion B having respective positive charges, and further with respect an ionic moiety group $R_2$ and an ionic portion A having respective negative charges. For example, scheme 1 shows a positive $R_1^+$ substituent in a hardener ionic liquid (IL) and the negative $R_2$ in the resin IL as one illustrative embodiment. However, in other embodiments, the respective charge signs of ionic moiety groups $R^1$, $R_2$ could be reversed (i.e., wherein the respective charge signs of ionic portions A, B are also reversed).

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

The singular terms "a," "an," and "the" include plural referents unless context clearly indicates otherwise. Similarly, the word "or" is intended to include "and" unless the context clearly indicates otherwise. It is further to be understood that all molecular weight or molecular mass values, are approximate, and are provided for description. Although methods and materials similar or equivalent to those described herein can be used in the practice or testing of this disclosure, suitable methods and materials are described below. All publications, patent applications, patents, and other references mentioned herein are incorporated by reference in their entirety. In case of conflict, the present specification, including explanations of terms, will control. In addition, the materials, methods, and examples are illustrative only and not intended to be limiting.

As used herein, the following terms shall apply unless otherwise indicated. For purposes of this invention, the chemical elements are identified in accordance with the Periodic Table of the Elements, CAS version, Handbook of Chemistry and Physics, $75^{th}$ Ed. Additionally, general principles of organic chemistry are described in "Organic Chemistry" Thomas Sorrell, University Science Books, Sausalito: 1999, and "March's Advanced Organic Chemistry", $5^{th}$ Ed., Ed.: Smith, M. B. and March, J., John Wiley & Sons, New York: 2001, the entire contents of which are hereby incorporated by reference.

The term "aliphatic" or "aliphatic group", as used herein, means a straight-chain (i.e., unbranched) or branched, substituted or unsubstituted hydrocarbon chain that is completely saturated or that contains one or more units of unsaturation, or a monocyclic hydrocarbon or bicyclic hydrocarbon that is completely saturated or that contains one or more units of unsaturation, but which is not aromatic (also referred to herein as "carbocycle," "cycloaliphatic" or "cycloalkyl"), that has a single point of attachment to the rest of the molecule. Unless otherwise specified, aliphatic groups contain 1-6 aliphatic carbon atoms. In some embodiments, aliphatic groups contain 1-5 aliphatic carbon atoms. In other embodiments, aliphatic groups contain 1-4 aliphatic carbon atoms. In still other embodiments, aliphatic groups contain 1-3 aliphatic carbon atoms, and in yet other embodiments, aliphatic groups contain 1-2 aliphatic carbon atoms. In some embodiments, "cycloaliphatic" (or "carbocycle" or "cycloalkyl") refers to a monocyclic $C_3$-$C_6$ hydrocarbon that is completely saturated or that contains one or more units of unsaturation, but which is not aromatic, that has a single point of attachment to the rest of the molecule. Suitable aliphatic groups include, but are not limited to, linear or branched, substituted or unsubstituted alkyl, alkenyl, alkynyl groups and hybrids thereof such as (cycloalkyl)alkyl, (cycloalkenyl)alkyl or (cycloalkyl)alkenyl.

The term "lower alkyl" refers to a $C_{1-4}$ straight or branched alkyl group. Exemplary lower alkyl groups are methyl, ethyl, propyl, isopropyl, butyl, isobutyl, and tert-butyl.

The term "lower haloalkyl" refers to a $C_{1-4}$ straight or branched alkyl group that is substituted with one or more halogen atoms.

The term "heteroatom" means one or more of oxygen, sulfur, nitrogen, phosphorus, or silicon (including, any oxidized form of nitrogen, sulfur, phosphorus, or silicon; the quaternized form of any basic nitrogen or; a substitutable nitrogen of a heterocyclic ring, for example N (as in 3,4-dihydro-2H-pyrrolyl), NH (as in pyrrolidinyl) or NR$^+$ (as in N-substituted pyrrolidinyl)).

The term "unsaturated," as used herein, means that a moiety has one or more units of unsaturation.

As used herein, the term "bivalent $C_{1-8}$ (or $C_{1-6}$) saturated or unsaturated, straight or branched, hydrocarbon chain", refers to bivalent alkylene, alkenylene, and alkynylene chains that are straight or branched as defined herein.

The term "alkylene" refers to a bivalent alkyl group. An "alkylene chain" is a polymethylene group, i.e., $-(CH_2)_n-$, wherein n is a positive integer, preferably from 1 to 6, from 1 to 4, from 1 to 3, from 1 to 2, or from 2 to 3. A substituted alkylene chain is a polymethylene group in which one or more methylene hydrogen atoms are replaced with a substituent. Suitable substituents include those described below for a substituted aliphatic group.

The term "alkenylene" refers to a bivalent alkenyl group. A substituted alkenylene chain is a polymethylene group containing at least one double bond in which one or more hydrogen atoms are replaced with a substituent. Suitable substituents include those described below for a substituted aliphatic group.

"Alkoxy" refers to the group "alkyl-O—". Examples of alkoxy groups include methoxy, ethoxy, n-propoxy, iso-propoxy, n-butoxy, tert-butoxy, sec-butoxy, n-pentoxy, n-hexoxy, and 1,2-dimethylbutoxy.

The term "halogen" means F, Cl, Br, or I.

The term "ring" means a cycloalkyl group or heterocyclic ring as defined herein.

The term "aryl" used alone or as part of a larger moiety as in "aralkyl," "aralkoxy," or "aryloxyalkyl," refers to monocyclic or bicyclic ring systems having a total of five to fourteen ring members, wherein at least one ring in the system is aromatic and wherein each ring in the system contains 3 to 7 ring members. The term "aryl" may be used interchangeably with the term "aryl ring."

The term "aryl" used alone or as part of a larger moiety as in "aralkyl," "aralkoxy," or "aryloxyalkyl," refers to monocyclic and bicyclic ring systems having a total of five to 10 ring members, wherein at least one ring in the system is aromatic and wherein each ring in the system contains three to seven ring members. The term "aryl" may be used interchangeably with the term "aryl ring". In certain embodiments of the present invention, "aryl" refers to an aromatic ring system which includes, but not limited to, phenyl, biphenyl, naphthyl, anthracyl and the like, which may bear one or more substituents. Also included within the scope of the term "aryl," as it is used herein, is a group in which an aromatic ring is fused to one or more non-aromatic rings, such as indanyl, phthalimidyl, naphthimidyl, phenanthridinyl, or tetrahydronaphthyl, and the like.

The term "aralkyl" refers to aryl-alkylene, wherein aryl and alkylene are as defined herein.

The term "aralkoxy" refers to aryl-alkoxy, wherein aryl and alkoxy are as defined herein.

The term "aryloxyalkyl" refers to aryl-O-alkylene, wherein aryl and alkylene are as defined herein.

The terms "heteroaryl" and "heteroar-," used alone or as part of a larger moiety, e.g., "heteroaralkyl," or "heteroaralkoxy," refer to groups having 5 to 10 ring atoms, preferably 5, 6, or 9 ring atoms; having 6, 10, or 14 π electrons shared in a cyclic array; and having, in addition to carbon atoms, from one to five heteroatoms. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring," "heteroaryl group," or "heteroaromatic," any of which terms include rings that are optionally substituted. The term "heteroaralkyl" refers to an alkyl group substituted by a heteroaryl, wherein the alkyl and heteroaryl portions independently are optionally substituted.

As used herein, the terms "heterocycle," "heterocyclyl," "heterocyclic radical," and "heterocyclic ring" are used interchangeably and refer to a stable 5- to 7-membered monocyclic or 7 to 10-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or +NR (as in N-substituted pyrrolidinyl).

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothiophenyl pyrrolidinyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle," "heterocyclyl," "heterocyclyl ring," "heterocyclic group," "heterocyclic moiety," and "heterocyclic radical," are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond.

The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein.

Suitable monovalent substituents on a substitutable carbon atom of an "optionally substituted" group are independently halogen; —$(CH_2)_{0-4}R°$; —$(CH_2)_{0-4}OR°$; —$O(CH_2)_{0-4}R°$, —O—$(CH_2)_{0-4}C(O)OR°$; —$(CH_2)_{0-4}CH(OR°)_2$; —$(CH_2)_{0-4}SR°$; —$(CH_2)_{0-4}Ph$, which may be substituted with $R°$; —$(CH_2)_{0-4}O(CH_2)_{0-4}Ph$ which may be substituted with $R°$; —CH=CHPh, which may be substituted with $R°$; —$(CH_2)_{0-4}O(CH_2)_{0-1}$-pyridyl which may be substituted with $R°$; —$NO_2$; —CN; —$N_3$; —$(CH_2)_{0-4}N(R°)_2$; —$(CH_2)_{0-4}N(R°)C(O)R°$; —$N(R°)C(S)R°$; —$(CH_2)_{0-4}N(R°)C(O)NR°_2$; —$N(R°)C(S)NR°_2$; —$(CH_2)_{0-4}N(R°)C(O)OR°$; —$N(R°)N(R°)C(O)R°$; —$N(R°)N(R°)C(O)NR°_2$; —$N(R°)N(R°)C(O)OR°$; —$(CH_2)_{0-4}C(O)R°$; —$C(S)R°$; —$(CH_2)_{0-4}C(O)OR°$; —$(CH_2)_{0-4}C(O)SR°$; —$(CH_2)_{0-4}C(O)OSiR°_3$; —$(CH_2)_{0-4}OC(O)R°$; —$OC(O)(CH_2)_{0-4}SR°$—; —$(CH_2)_{0-4}SC(O)R°$; —$(CH_2)_{0-4}C(O)NR°_2$; —$C(S)NR°_2$; —$C(S)SR°$; —$SC(S)SR°$, —$(CH_2)_{0-4}OC(O)NR°_2$; —$C(O)N(OR)R°$; —$C(O)C(O)R°$; —$C(O)CH_2C(O)R°$; —$C(NOR)R°$; —$(CH_2)_{0-4}SSR°$; —$(CH_2)_{0-4}S(O)_2R$; —$(CH_2)_{0-4}S(O)_2OR°$; —$(CH_2)_{0-4}OS(O)_2R°$; —$S(O)_2NR°_2$; —$(CH_2)_{0-4}S(O)R°$; —$N(R°)S(O)_2NR°_2$; —$N(R°)S(O)_2R°$; —$N(OR°)R°$; —$C(NH)NR°_2$; —$P(O)_2R°$; —$P(O)R°_2$; —$OP(O)R°_2$; —$OP(O)(OR°)_2$; $SiR°_3$; —($C_{1-4}$ straight or branched alkylene)O—$N(R°)_2$; or —($C_{1-4}$ straight or branched alkylene)C(O)O—$N(R°)_2$, wherein each $R°$ may be substituted as defined below and is independently hydrogen, $C_{1-6}$ aliphatic, —$CH_2Ph$, —$O(CH_2)_{0-1}Ph$, —$CH_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of $R°$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on $R°$ (or the ring formed by taking two independent occurrences of $R°$ together with their intervening atoms), are independently halogen, —$(CH_2)_{0-2}R^•$, -(haloR$^•$), —$(CH_2)_{0-2}OH$, —$(CH_2)_{0-2}OR^•$, —$(CH_2)_{0-2}CH(OR^•)_2$, —$O(haloR^•)$, —CN, —$N_3$, —$(CH_2)_{0-2}C(O)R^•$, —$(CH_2)_{0-2}C(O)OH$, —$(CH_2)_{0-2}C(O)OR^•$, —$(CH_2)_{0-2}SR^•$, —$(CH_2)_{0-2}SH$, —$(CH_2)_{0-2}NH_2$, —$(CH_2)_{0-2}NHR^•$, —$(CH_2)_{0-2}NR^•_2$, —$NO_2$, —$SiR^•_3$, —$OSiR^•_3$, —$C(O)SR^•$, —($C_{1-4}$ straight or branched alkylene)C(O)OR$^•$, or —SSR$^•$; wherein each R$^•$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R°$ include =O and =S.

Suitable divalent substituents on a saturated carbon atom of an "optionally substituted" group include the following: =O, =S, =$NNR^*_2$, =$NNHC(O)R^*$, =$NNHC(O)OR^*$, =$NNHS(O)_2R^*$, =$NR^*$, =$NOR^*$, —$O(C(R^*)_2)_{2-3}O$—, or —$S(C(R^*)_2)_{2-3}S$—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —$O(CR^*2)_{2-3}O$—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R$^•$, -(haloR$^•$), —OH, —OR, —O(haloR$^•$), —CN, —C(O)OH, —C(O)OR$^•$, —$NH_2$, —NHR$^•$, —NR$^•_2$, or —$NO_2$, wherein each R$^•$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R$^†$, —NR$^†_2$, —C(O)R$^†$, —C(O)OR$^†$, —C(O)C(O)R$^†$, —C(O)$CH_2$C(O)R$^†$, —$S(O)_2R^†$, —$S(O)_2NR^†_2$, —C(S)NR$^†_2$, —C(NH)NR$^†_2$, or —N(R$^†$)$S(O)_2R^†$; wherein each R$^†$ is independently hydrogen, $C_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R$^†$, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R$^†$ are independently halogen, —R$^•$, -(haloR$^•$), —OH, —OR$^•$, —O(haloR$^•$), —CN, —C(O)OH, —C(O)OR$^•$, —$NH_2$, —NHR$^•$, —NR$^•_2$, or —$NO_2$, wherein each R$^•$ is unsubstituted or where preceded by "halo" is substituted only with one or more halogens, and is independently $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur.

Unless otherwise stated, structures depicted herein are also meant to include all isomeric (e.g., enantiomeric, diastereomeric, and geometric (or conformational)) forms of the structure; for example, the R and S configurations for each asymmetric center, Z and E double bond isomers, and Z and E conformational isomers. Therefore, single stereochemical isomers as well as enantiomeric, diastereomeric, and geometric (or conformational) mixtures of the present compounds are within the scope of the invention. Unless otherwise stated, all tautomeric forms of the compounds of the invention are within the scope of the invention.

The term "accelerator" is intended to refer to a substance that initiates or accelerates (e.g., speeds up) a chemical reaction without itself being affected.

The term "crosslinker" is intended to refer to an additive which links two polymer chains by a covalent or ionic bond. Crosslinkers are generally selected based on their reactivity, length, and solubility. Crosslinkers can also be spontaneously reactive upon addition to a sample or be activated at a specific time, such as through photo-reactive groups. In traditional epoxy resins systems, crosslinkers are a group of compounds with more than two electrophilic groups capable of opening epoxide rings. The introduction of a tri- or tetra-functionalized crosslinker, in addition to the common, linear hardeners, creates a multidimensional polymer network that increases hardness, strength, and chemical resistance over linear epoxies, and produces a thermoset polymer with higher melting temperatures. In some embodiments, ion liquids are modified to function as ionic thermosetting crosslinkers (IT-Crosslinkers).

The term "plasticizer" is intended to refer to a substance that modifies the mechanical properties of a material. A plasticizer alters the physical properties of the material to which they are added. For example, a plasticizer can decrease the attraction between polymer chains to make them more flexible. Plasticizers can impart flexibility, workability, durability or stretchability. Plasticizers can change the rigidity, deformability, elongation; toughness, process viscosity, service temperature and/or the like of a material, such as a polymer. Plasticizers are typically liquids with low volatility or solids. Some of the ionic liquids used as plasticizers are shown in FIGS. 16A-16F and all of them can be used as the secondary ionic liquid in the ionic liquid epoxides systems.

The term "inhibitor" is intended to refer to a substance that decreases the rate of, or prevents, a chemical reaction.

The term "ionic liquid" is a salt in the liquid state. Ionic liquids are largely made of ions and short-lived ion pairs. Ionic liquids have no vapor pressure by definition. These substances are variously called liquid electrolytes, ionic melts, ionic fluids, fused salts, liquid salts, or ionic glasses. Any salt that melts without decomposing or vaporizing usually yields an ionic liquid. Room-temperature ionic liquids are organic salts that melt below 100° C. and form solvent-less liquids with some unique physical properties, including zero vapor pressure. There are an estimated 106 to 1014 possible ion-pair combinations that form ionic liquids. In general, it is possible to synthesize ionic liquids that incorporate reactive moieties enabling solvent-free and volatile-free chemistry for a wide range of purposes. Specifically, disclosed herein in some embodiments are synthesized ionic liquids that incorporate anions/cations substituted with epoxides (glycidyl groups), and the corresponding anion/cation-substituted with diamines moieties designed for epoxide polymerization reactions.

"Biological active ionic liquid" (BAIL) is a type of ionic liquid that has biological activity. Exemplary BAILs are provided in FIGS. 8, 9A-9F and 15A-15F.

The term "ionic hydrophobic compound" is to refer to a compound that is made of positive and negative ion pairs and is immiscible with water, while having some solubility for and solubility in water.

The term "super-hydrophobic compound" is to refer to a compound that is immiscible in water and has a solubility for water of no more than 10% by weight.

The term "ionic hydrophilic compound" is to refer to a compound that that is made of positive and negative ion pairs, is soluble in water, and shows an ability to accumulate solubilized water from the vapor phase.

The term "ionic transitional hydrophobic/hydrophilic compound" is to refer to a compound that is composed of positive and negative ion pairs whose hydrophobic or hydrophilic character, as described above, can be transitioned from one to the other depending on chemical or environmental inputs, such as (but not limited to) pH, CO2 partial pressure, relative humidity, or temperature.

The term "reaction conditions" is intended to refer to the physical and/or environmental conditions under which a chemical reaction proceeds. The term "under conditions sufficient to" or "under reaction conditions sufficient to" is intended to refer to the reaction conditions under which the desired chemical reaction can proceed. Examples of reaction conditions include, but are not limited to, one or more of following: reaction temperature, solvent, pH, pressure, reaction time, mole ratio of reactants, the presence of a base or acid, or catalyst, radiation, concentration, etc. Reaction conditions may be named after the particular chemical reaction in which the conditions are employed, such as, coupling conditions, hydrogenation conditions, acylation conditions, reduction conditions, etc. Reaction conditions for most reactions are generally known to those skilled in the art or can be readily obtained from the literature. Exemplary reaction conditions sufficient for performing the chemical transformations provided herein can be found throughout, and in particular, the examples below. It is also contemplated that the reaction conditions can include reagents in addition to those listed in the specific reaction.

Description of Several Embodiments

Disclosed herein is an epoxy system that includes a hardener compound (H) and an epoxy compound (E). Typically, the hardener compound and the epoxy compound are provided separately and then mixed to form a polymer when used. In embodiments, the hardener compound has the molecular structure according to:

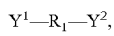

$$Y^1-R_1-Y^2,$$

wherein $R_1$ is an ionic moiety and $Y^1$ and $Y^2$ are bonded to $R_1$. In certain embodiments $Y^1$ is, or includes, a nucleophilic group. In certain embodiments $Y^2$ is, or includes, a nucleophilic group. In certain embodiments, $Y^1$ and $Y^2$ are identical. In certain embodiments, $Y^1$ and $Y^2$ are non-identical. In specific examples, $Y^1$ and $Y^2$ comprise a nucleophile independently selected from: a $NH_2$ group, a SH group, an OH group, a SeH group, and a $PH_2$ group. In certain embodiments, the hardener compound (H) is part of, such as a component of, a solvent-less ionic liquid, for example as a molecular complex with an ionic moiety A acting as a counter ion to $R_1$. Examples of $Y^1-R_1-Y^2$ are shown in Table 1 and FIGS. 4, 5, 6, 7, 8, 10A-10I and 17A-17D. Examples of ionic counter ions are shown in FIGS. 4, 5, 6, 7, 8, 9, 10A-10I, 13A-17D.

In embodiments, the hardener compound has the molecular structure according to:

wherein $R_1$ is an ionic moiety and $Y^1$ is are bonded to $R_1$. In certain embodiments $Y^1$ is, or includes, a nucleophilic group. In certain embodiments, the individual $Y^1$ groups are identical. In embodiments n is a whole number between 2 and 10, such as 2, 3, 4, 5, 6, 7, 8, 9, or 10 or any subset therein. In certain embodiments, the individual $Y^1$ groups are non-identical. In specific examples, the individual $Y^1$ groups comprise a nucleophile independently selected from: a $NH_2$ group, a SH group, an OH group, a SeH group, and a $PH_2$ group. In certain embodiments, the hardener compound (H) is part of, such as a component of, a solvent-less ionic liquid, for example as a molecular complex with an ionic moiety A acting as a counter ion to $R_1$. Examples of $R_1-(Y^1)_n$ are shown in Table 1 and FIGS. 4, 5, 6, 7, 8, 10A-10I and 17A-17D. Examples of ionic counter ions are shown in FIGS. 4, 5, 6, 7, 8, 9, 10A-10I, 13A-17D.

The disclosed epoxy system further incudes an epoxy compound E. In embodiments the epoxy compound has the molecular structure according to:

$$Z^1-R_2-Z^2,$$

where $R_2$ is an ionic moiety, $Z^1$ is or includes an epoxide group, and $Z^2$ is or includes an epoxide group. In certain embodiments, $Z^1$ and $Z^2$ are identical. In certain embodiments, $Z^1$ and $Z^2$ are non-identical. In certain embodiments, the epoxy compound (E) is part of, such as a component of a solvent-less ionic liquid, for example as a molecular complex with an ionic moiety B acting as a counter ion to $R_2$. Examples of $Z^1-R_1-Z^2$ are shown in Table 1 and FIGS. 4, 5, 6, 7, 8, 10A-10I and 17A-17D. Examples of ionic counter ions are shown in FIGS. 4, 5, 6, 7, 8, 9, 10A-10I, 13A-17D.

In embodiments the epoxy compound has the molecular structure according to:

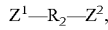

where $R_2$ is an ionic moiety, $Z^1$ is or includes an epoxide group. In certain embodiments, the individual $Z^1$ groups are identical. In certain embodiments, the individual $Z^1$ groups are non-identical. In embodiments n is a whole number between 2 and 10, such as 2, 3, 4, 5, 6, 7, 8, 9, or 10 or any subset therein. In certain embodiments, the epoxy compound (E) is part of, such as a component of a solvent-less ionic liquid, for example as a molecular complex with an ionic moiety B acting as a counter ion to $R_2$. Examples of $R_2-(Z^1)_n$ are shown in Table 1 and FIGS. 4, 5, 6, 7, 8, 10A-10I and 17A-17D. Examples of ionic counter ions are shown in FIGS. 4, 5, 6, 7, 8, 9, 10A-10I, 13A-17D.

In certain embodiments the epoxy system further includes one or more of an accelerator, a crosslinker, a plasticizer, or an inhibitor, The accelerator, crosslinker, plasticizer, and/or inhibitor can be included with the hardener compound, the epoxy compound, or even as a separate component of the system. Examples of accelerators, crosslinkers, plasticizers, and inhibitors ions are shown in FIGS. 10A-10I and 16A-16F.

In certain embodiment, the epoxy system further includes an ionic hydrophobic and/or super-hydrophobic compound. In embodiments, the ionic hydrophobic and/or super-hydrophobic compound can be provided with either or both of the epoxy and hardener compound, for example as counter ion A, the epoxy compound, for example as a counter ion B, or both for example as a counter ion A and a counter ion B. In embodiments, the ionic hydrophobic and/or super-hydrophobic compound is released as an ionic liquid upon polymerization of hardener compound H and epoxy compound E to modify the properties of a polymer produced. Such ionic hydrophobic and/or super-hydrophobic compounds are known in the art and representative examples can found in FIGS. 5 and 6.

In certain embodiment, the epoxy system further includes an ionic hydrophilic compound. In embodiments, the ionic hydrophilic compound can provided with either or both of the hardener compound, for example as counter ion A, the epoxy compound, for example as a counter ion B, or both for example as a counter ion A and a counter ion B. In embodiments, the ionic hydrophilic compound is released as an ionic liquid upon polymerization of hardener compound H and epoxy compound E to modify the properties of a polymer produced. Such ionic hydrophilic compounds are known in the art.

In certain embodiment, the epoxy system further includes an ionic transitional hydrophobic/hydrophilic compound. In embodiments, the ionic transitional hydrophobic/hydrophilic compound can provided with either or both of the hardener compound, for example as counter ion A, the epoxy compound, for example as a counter ion B, or both for example as a counter ion A and a counter ion B. In embodiments, the ionic transitional hydrophobic/hydrophilic compound is released as an ionic liquid upon polymerization of hardener compound H and epoxy compound E to modify the properties of a polymer produced. Such ionic transitional hydrophobic/hydrophilic compounds are known in the art and representative examples can found in FIG. 7.

In certain embodiment, the epoxy system further includes a biological active (BAIL, Biological Active Ionic Liquid) compound. In embodiments, the biological active (BAIL, Biological Active Ionic Liquid) compound can provided with either or both of the hardener compound, for example as counter ion A, the epoxy compound, for example as a counter ion B, or both for example as a counter ion A and a counter ion B. In embodiments, the biological active (BAIL, Biological Active Ionic Liquid) compound is released as an ionic liquid upon polymerization of hardener compound H and epoxy compound E to modified the properties of a polymer produced. Such biological active (BAIL, Biological Active Ionic Liquid) compounds are known in the art and representative examples can found in FIGS. 8, 9A-9F, and 15A-15F.

In certain embodiment, the epoxy system further includes a plasticizer compound. In embodiments, the plasticizer compound can provided with either or both of the hardener compound, for example as counter ion A, the epoxy compound, for example as a counter ion B, or both for example as a counter ion A and a counter ion B. In embodiments, the plasticizer compound is released as an ionic liquid upon polymerization of hardener compound H and epoxy compound E to modify the properties of a polymer produced. Such plasticizer compounds are known in the art and representative examples can found in FIGS. 16A-16F. In certain embodiments, the plasticizer compound has a low (under 10-7 bar vapor pressure) to zero volatility.

Scheme 1

Scheme 1 shows examples of polymerization reactions between a first compound and a second compound each including a respective ionic moiety group and a corresponding counter-ion, in accordance with disclosed embodiments.

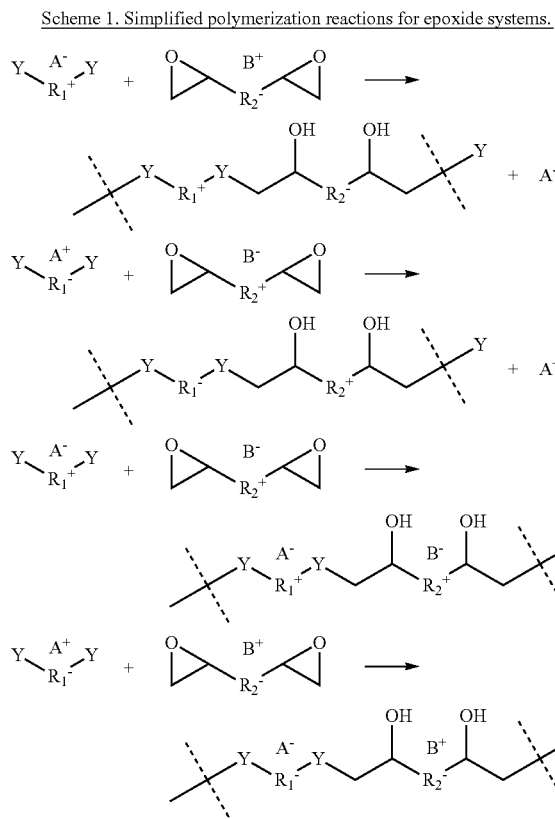

Scheme 1. Simplified polymerization reactions for epoxide systems.

More particularly, scheme 1 illustrates examples of a disclosed epoxy system according to an embodiment. As shown, the epoxy system includes a hardener compound H and an epoxy compound E. As depicted, the hardener compound H includes a cationic molecular structure ($Y^1$—$R_1$—$Y^2$) containing an ionic moiety group $R_1$ and the $Y^1$ and $Y^2$ groups bonded, for example chemically bonded to $R_1$. As shown in the first reaction, the hardener compound H further includes an anionic portion $A^-$, for example, a counter ion, in conjunction with the cationic molecular structure ($Y^1$—$R_1$—$Y^2$) at $R_1$. As shown, the epoxy compound E has an anionic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes a cationic portion $B^+$ in conjunction with the anionic molecular structure ($Z^1$—$R_2$—$Z^2$), for example, acting as a counter ion to at $R_2$. As shown in the second reaction, the hardener compound H further includes an anionic portion $A^+$, for example, a counter ion, in conjunction with the anionic molecular structure ($Y^1$—$R_1$—$Y^2$) at $R^1$. As shown, the epoxy compound E has a cationic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes an anionic portion $B^-$ in conjunction with the anionic molecular structure ($Z^1$—$R_2$—$Z^2$), for example, acting as a counter ion to at $R_2$. As shown in the third reaction, the hardener compound H further includes an anionic portion $A^-$, for example, a counter ion, in conjunction with the cationic molecular structure ($Y^1$—$R_1$—$Y^2$) at $R_1$. As shown, the epoxy compound E has a cationic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes an anionic portion $B^-$ in conjunction with the anionic molecular structure (Z—$R_2$—Z), for example, acting as a counter ion to at $R_2$. As shown in the fourth reaction, the hardener compound H further includes a cationic portion $A^+$, for example, a counter ion, in conjunction with the cationic molecular structure ($Y^1$—$R^1$—$Y^2$) at $R_1$. As shown, the epoxy compound E has a cationic molecular structure ($Z^1$—$R_2$—$Z^2$) that includes an ionic moiety group $R_2$ and two epoxide/electrophilic (represented herein by "Z") groups bonded to $R_2$. In addition, the epoxy compound E includes a cationic portion $B^+$ in conjunction with the anionic molecular structure ($Z^1$—$R_2$—$Z^2$), for example, acting as a counter ion to at $R_2$.

Unless otherwise indicated, "anionic"—as used as used in the particular context of "anionic molecular structure," "anionic portion," "anionic moiety group," or the like—refers to the characteristic of an atom or molecular structure (e.g., a molecule or portion thereof) providing a negative charge to facilitate bonding with a positive charge of a counterpart "cationic" structure/portion/group. For example, an anionic portion $A^-$ can be bonded to ionic moiety group $R_1$ by an ionic bond (e.g., where $A^-$ is a single atom) or by an intermolecular bond, for example. Alternatively or in addition, a cationic portion $B^+$ can be bonded to ionic moiety group $R_2$ by an ionic bond (e.g., where $B^+$ is a single atom) or by an intermolecular bond. In some examples, an cationic portion $A^+$ can be bonded to ionic moiety group $R_1$ by an ionic bond (e.g., where $A^+$ is a single atom) or by an intermolecular bond, for example. Alternatively or in addition, an anionic portion $B^-$ can be bonded to ionic moiety group $R_2$ by an ionic bond (e.g., where $B^-$ is a single atom) or by an intermolecular bond.

In the example reaction pathway shown in scheme 1, $Y^1$ and/or $Y_2$ can be a nucleophilic group—e.g., including but not limited to, —$NH_2$, —SH, —OH, —SeH, —$PH_2$ or other nucleophilic substituent. In a molecular structure ($Y^1$—$R_1$—$Y^2$), at least one such Y group can be reactive with an epoxide group of molecular structure ($Z^1$—$R_2$—$Z^2$) to for a stable chemical bond—e.g., a dimer formation—in a completed polymerization reaction.

Table 1 shows examples of molecular structures that can be variously utilized in respective ionic liquid epoxy systems. It is noted that superscripted numbers (e.g., $R^1$, $R^2$, $R^3$, $R^4$, etc.) are used herein to indicate component structure of a moiety group that, for example, is instead identified using subscripted numbers (e.g., $R_1$, $R_2$).

TABLE 1

Examples of possible structures for $R_1$ and $R_2$ in scheme 1

| Possible $(Y^1—R_1—Y^2)$ structures | Possible $(Z^1—R_2—Z^2)$ structures |
|---|---|

TABLE 1-continued

Examples of possible structures for $R_1$ and $R_2$ in scheme 1

| Possible ($Y^1$—$R_1$—$Y^2$) structures | Possible ($Z^1$—$R_2$—$Z^2$) structures |
|---|---|

TABLE 1-continued

Examples of possible structures for $R_1$ and $R_2$ in scheme 1

| Possible ($Y^1$—$R_1$—$Y^2$) structures | Possible ($Z^1$—$R_2$—$Z^2$) structures |
|---|---|
| 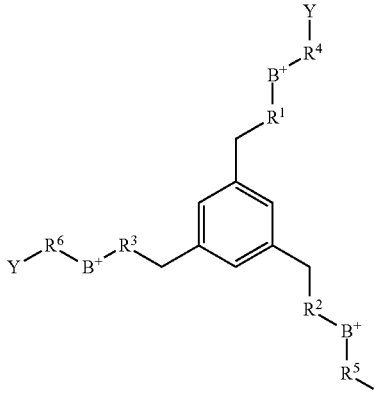 | 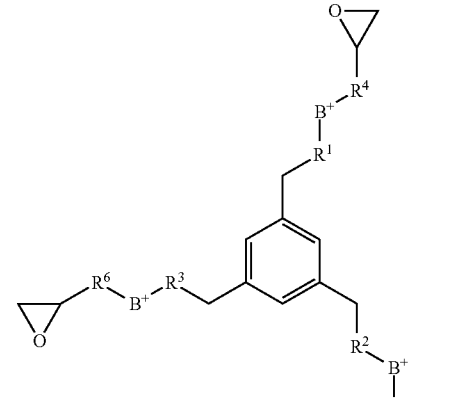 |

$R^1, R^2, R^3, R^4, R^5, R^6, R^7$ and $R^8$ can be any suitable chain, $Y^1$ and/or $Y^2$ can be a nucleophilic group—e.g., including but not limited to —$NH_2$, —SH, —OH, —SeH, —$PH_2$. $Y^1$ and/or $Y^2$ and epoxy moieties (epoxy group is an example of Z group that could be any electrophilic group suitable to react with $Y^1$ and/or $Y^2$ and form a permanent chemical bond) can be exchanged between $R_1$ and $R_2$. Anionic moieties can be any suitable anionic substituent.

As illustrated by the embodiment shown in scheme 1, the $Y^1$ and/or $Y^2$ groups bonded to ionic moiety group $R_1$ can be amine groups (e.g., where $Y^1$ and/or $Y^2$ is a primary amine group). The hardener compound H can function as a hardener to react with the epoxy compound E. A reaction of compounds H, E can result in at one of the epoxide groups forming a chain with one of the $Y^1$ and/or $Y^2$ groups—e.g., wherein a separate by-product molecule is formed by anionic portion $A^-$ and cationic portion $B^+$. Certain embodiments variously facilitate a wide variety of combinations of $R_1, R_2, Z^1$ and/or $Z^2, Y^1$ and/or $Y^2, A^-, A^+,$ and $B^-,$ and $B^+$ to be chosen from to achieve desired material characteristics, while providing significantly reduced VOC byproducts.

In the example embodiments shown in scheme 1, the first compound includes an ionic moiety group $R_1$ and a corresponding counter-ion A, while the second compound includes an ionic moiety group $R_2$ and a corresponding counter-ion B. The illustrative reaction pathway shown in scheme 1 represents examples of dimer formation from a polymerization reaction.

Various combinations of ionic moieties $R_1$ and $R_2$ groups are possible, and if the corresponding counter-ions (A and B) are carefully selected, the two compounds can form a secondary ionic liquid ($A^-B^+$), limiting or even avoiding the possibility of VOC emissions from an ionic liquid epoxy system. Also it is contemplated to use the same charge ionic liquid resin and ionic liquid hardener where a secondary ionic liquid will not be produced, but permanent charges remain in the polymeric chains to compensate for the corresponding counter ions, as is shown in the last two examples in scheme 1. In the last four examples shown in Table 1, the $B^+$ is to indicate the $R_1$ and $R_2$ groups are ionic in nature.

Aspects of the present disclosure also concern a polymer produced by the polymerization of the epoxide system disclosed herein. In embodiments, a polymer produced upon polymerization of hardener compound H and epoxy compound E comprises self-healing properties due to the presence of stable electrical charges along to the polymeric chains that drive the healing process through electrostatic attraction. In embodiments, a polymer produced upon polymerization of hardener compound H and epoxy compound E forms a highly and regular porous system, which could be used but not limited to as filtration membrane, solid electrolyte after replacing the secondary ionic liquid, exchange membrane, etc. In embodiments, a polymer comprises a solid electrolyte. An electronic component comprising the polymers is disclosed herein. In embodiments, the electronic component is a component of a battery, a capacitor, a piezoelectric material and/or an electro-actuator.

Synthetic Methods

Scheme 2

Scheme 2 shows an example reaction to synthesize a hardener compound of an epoxy system according to embodiments disclosed herein. Such reactions can contribute to the manufacture of some or all of the hardener compounds H, for example, as shown in scheme 1.

As shown in scheme 2, the class of diamine imidazolium ionic liquids provide amine chemistry that can be used as a hardener in an epoxy polymer system, such as those disclosed herein. For example, the illustrative reactions of scheme 2 provide for synthesis of 1,3-di(2'-aminoethylene)-2-methylimidazolium bromide.

The first step of the synthesis is the protection of the amino group in bromo-ethylamine (1) using tritylchloride (2), and substituting the resulting compound (3) in 2-methylimidazole (4) under basic conditions (refluxing in dimethylformamide (DMF) for 12 hours) in order to obtain the bi-substituted intermediate (5). Deprotection of amine groups is carried out in acidic media in dioxane to obtain the hydrochloride derivative (6) and careful neutralization is accomplished by using NaOH in order to obtain the target compound (7).

Scheme 2.
Synthesis of 1,3-di(2'-aminoethylene)-2-methylimidazolium bromide.

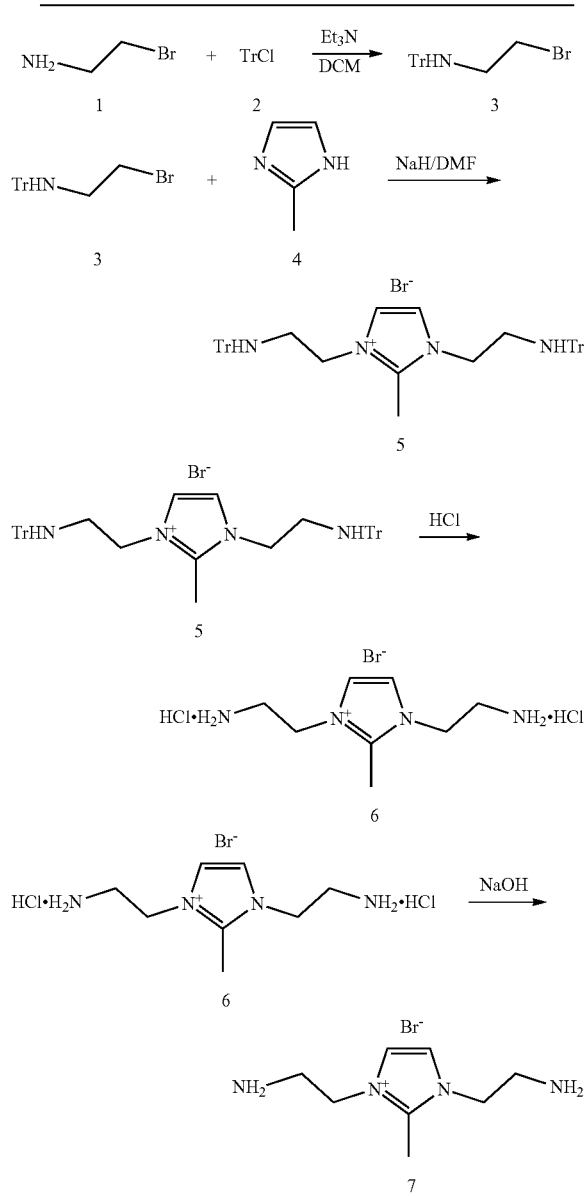

Full proton NMR spectroscopic characterization was obtained for the target compound (7) (see FIG. 1) showing proper peaks that correlate with expected characteristics. The material obtained is a highly viscous brown liquid. Additional studies indicate that stability of this hardener in a time window of at least 6 months (storage without inert atmosphere in a lab shelf, closed container) without signs of decomposition. An ionic liquid hardener including compound (7) was tested against commercially available resins (1:1 mass ratio), without accelerators or modifiers of the polymerization reaction. The testing revealed that the hardener was effective with a curing temperature of 120° C. for two hours producing a brown solid material.

Scheme 3

Scheme 3 shows an example of a reaction in a process to synthesize an epoxy compound including the anionic molecular structure ($Z^1$—$R_2$—$Z^2$) as shown in scheme 1 according to embodiments disclosed herein. As shown, synthesis of phosphinate di-epoxy acid can be produced using a modified Arbuzov reaction. In the example reaction shown in scheme 3, acidic compound (9) is neutralized with tetraakyl phosphonium hydroxide in order to obtain the corresponding phosphonium ionic liquid, where $R^5$ can be an alkyl, such as an alkyl having between 1 and 16 carbon atoms, such as 1, 2, 3, 4, 5, 6, 7, 8, 9, 10, 11, 12, 13, 14, 15, or 16.

Scheme 3. Synthesis of phosphinate di-epoxy acid, where $R^5$ is an alkyl.

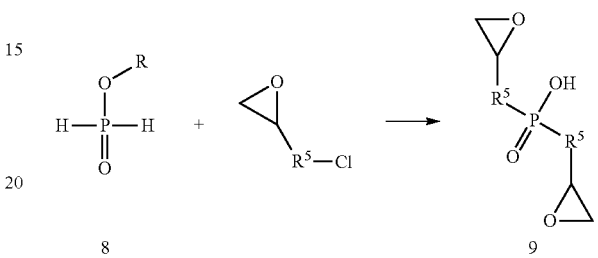

Scheme 4

Scheme 4 shows another example of a reaction in a process to synthesize an epoxy compound including the anionic molecular structure ($Z^1$—$R_2$—$Z^2$) as shown in scheme 1 according to embodiments disclosed herein. More particularly, scheme 4 shows a synthesis of a bisphenol A diglycidyl ether (2,2-bis[4-(glycidyloxy)phenyl]propane) analog by addition of an ionic moiety into the monomer structure (scheme 4).

Scheme 4. General bisphenol A diglycidyl ether ionic liquid structure.

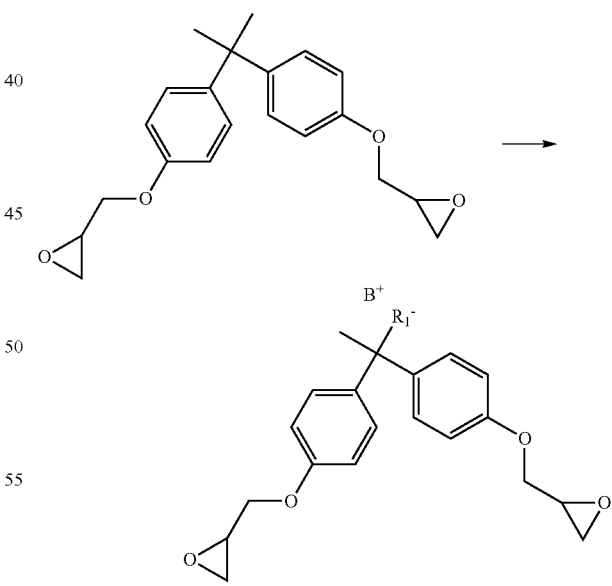

Scheme 5

Figure 2:
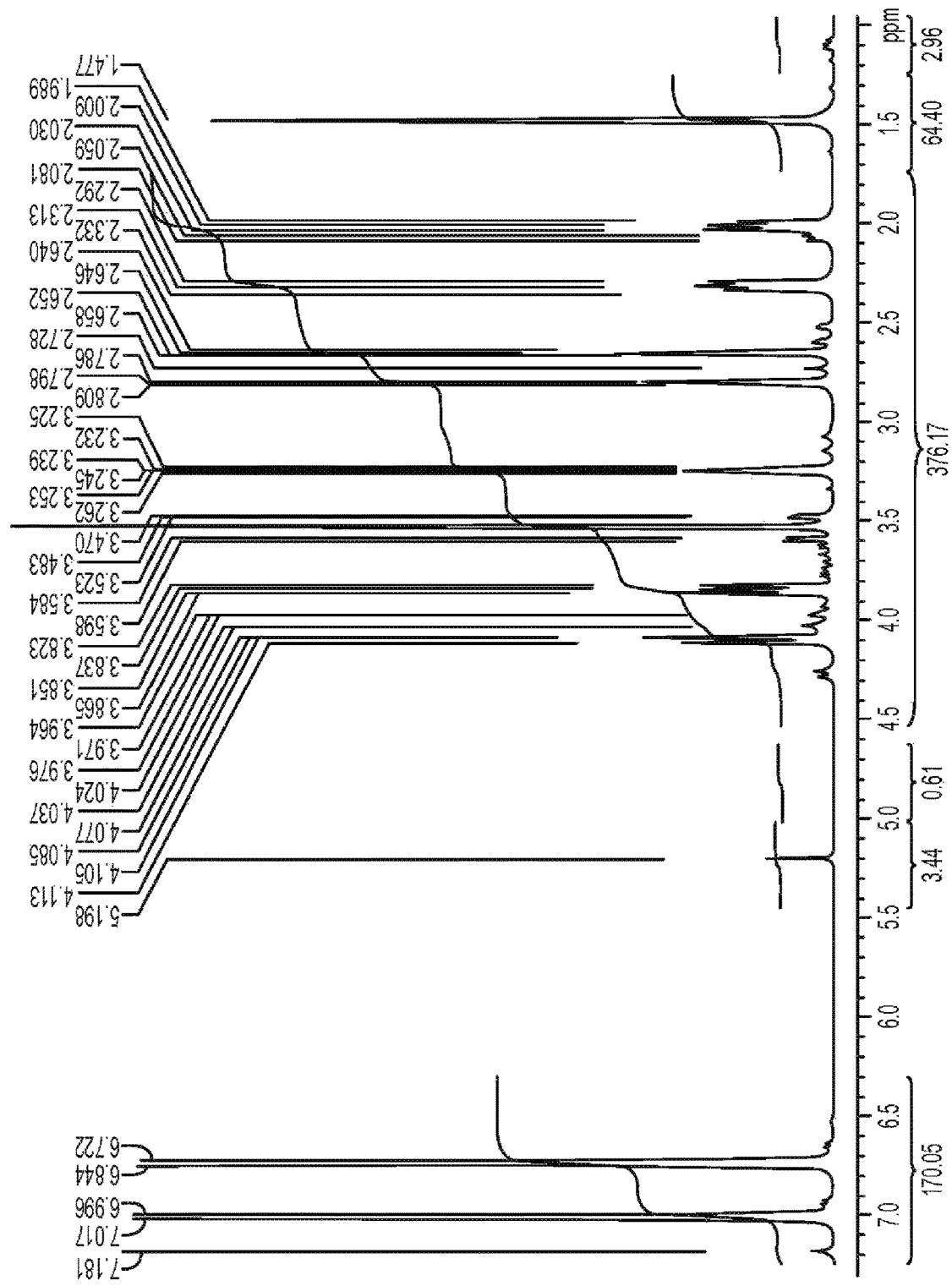
FIG. 2 is an example of a typical NMR spectra of, γ-methyl-4-(2-oxiranylmethoxy)-γ-[4-(2-oxiranylmethoxy) phenyl]-, methyl ester benzenebutanoic acid.

Scheme 5 shows another example of a reaction in a process to synthesize an epoxy compound including the anionic molecular structure ($Z^1$—$R_2$—$Z^2$) as shown in scheme 1 according to embodiments disclosed herein. In the illustrative di-glycidylation reaction of scheme 5, 4-hydroxy-γ-(4-hydroxyphenyl)-γ-methyl-methyl ester benzenebutanoic acid (10) reacts with epichlorohydrin (11) in basic conditions at 100° C. for 15 minutes. Such a reaction can result in a yield above 90% of γ-methyl-4-(2-oxiranyl-methoxy)-γ-[4-(2-oxiranylmethoxy) phenyl]-, methyl ester benzenebutanoic acid (12). A proton NMR analysis of a material resulting from one such reaction is shown in FIG. 2. FIG. 2 shows characteristic peaks indicating that compound (12) is the main component.

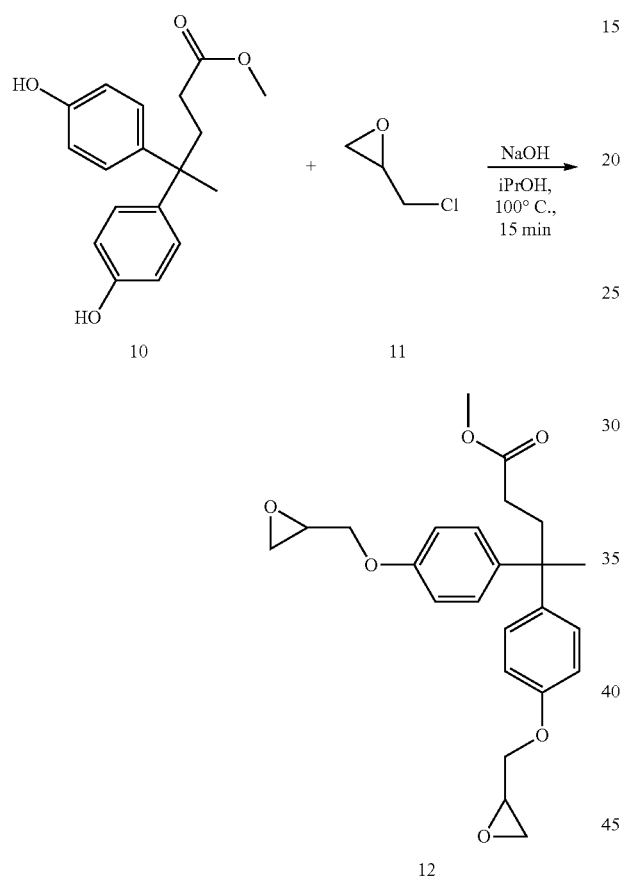

Scheme 5. General procedure for di-glycidylation of 4-hydroxy-γ-(4-hydroxyphenyl)-γ-methyl-methyl ester benzenebutanoic acid.

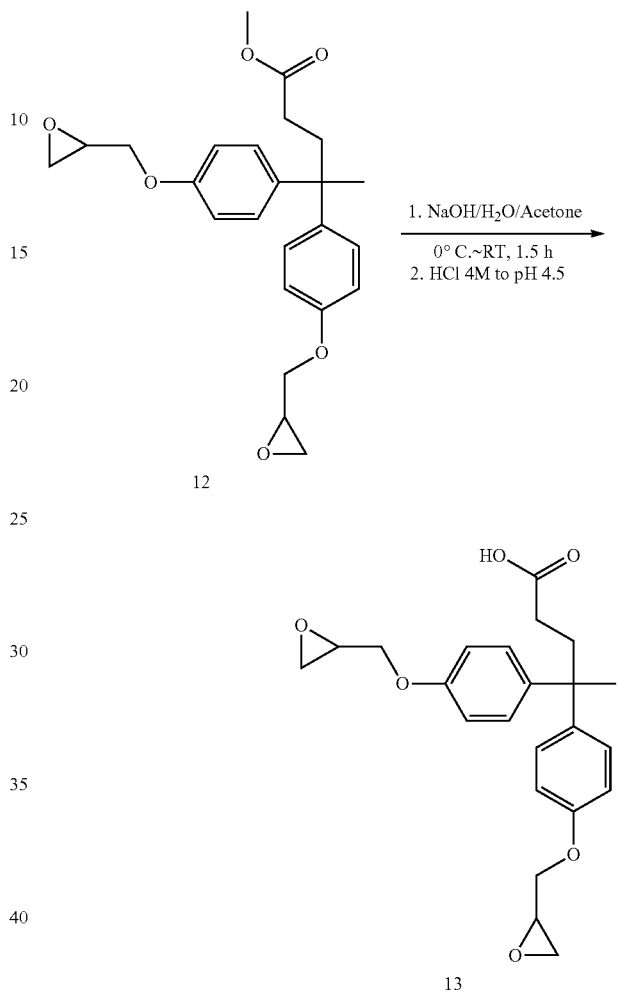

Scheme 6. General procedure for hydrolysis of ——OMe group of γ-methyl-4-(2-oxiranylmethoxy)-γ-[4-(2-oxiranylmethoxy) phenyl]-, methyl ester benzenebutanoic acid.

Scheme 6

Scheme 6 shows another example of a reaction in a process to synthesize an epoxy compound including the anionic molecular structure ($Z^1$—$R_2$—$Z^2$) as shown in scheme 1 according to embodiments disclosed herein. The reactions shown in scheme 6 can be continued from those shown in scheme 5, for example.

As shown in scheme 6, the —OMe (oxygen/methyl group) moiety can be hydrolyzed—e.g., without requiring further purification—using a NaOH (3 eq)/acetone/water mixed at 0° C. and allowed to warm up to room temperature for 1.5 hours, (scheme 6). Extended reaction time does not show deviation from the desired product when the reaction was followed by TLC. The free acid derivative (13), γ-methyl-4-(2-oxiranylmethoxy)-γ-[4-(2-oxiranylmethoxy) phenyl]-benzenebutanoic acid was obtained in a quantitative yield and fully characterized by proton NMR in $CDCl_3$.

Figure 3:
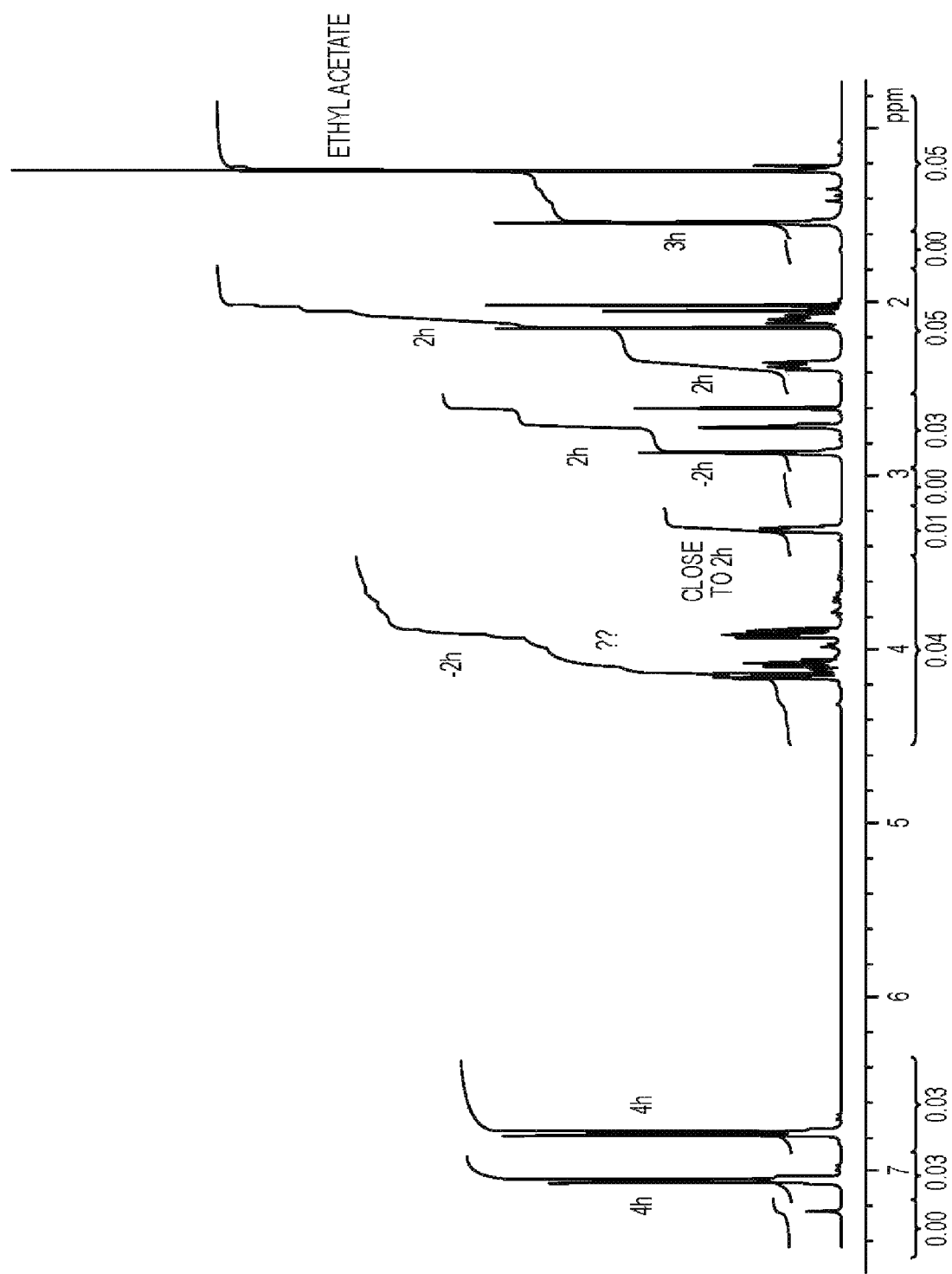
FIG. 3 is an example of a typical NMR spectra of γ-methyl-4-(2-oxiranylmethoxy)-γ-[4-(2-oxiranylmethoxy) phenyl]-Benzenebutanoic acid.

An example of a typical spectra obtained for compound (13) is shown in FIG. 3. FIG. 3 reveals all the characteristic features of compound (13). The NMR of the reaction product also shows the presence of the solvent (ethyl acetate) used during the purification process.

Scheme 7

Scheme 7 shows another example of a reaction in a process to synthesize an epoxy compound including the anionic molecular structure ($Z^1$—$R_2$—$Z^2$) as shown in scheme 1 according to embodiments disclosed herein. The reaction shown in scheme 7 can be continued from those shown in scheme 6, for example. In order to mitigate the possible of damaging the epoxy groups in compound (13), the ionic liquid formation can be carried out in methanol, using equimolar amounts of tetrabutyl phosphonium hydroxide (14) to neutralized the benzenebutanoic acid proton (scheme 7), and quickly removing the MeOH (15 minutes mixing time) and produced water under vacuum (30 mmHg) at 45° C. for 4 hours and dried at room temperature and full vacuum for 24 hours. In a test run of such a process, a dark yellow viscous liquid was obtained.

Scheme 7. General procedure for synthesis of Tetrabutylphosphonium γ-methyl-4-(2-oxiranylmethoxy)-γ-[4-(2-oxiranylmethoxy)phenyl]-benzenebutanoate.

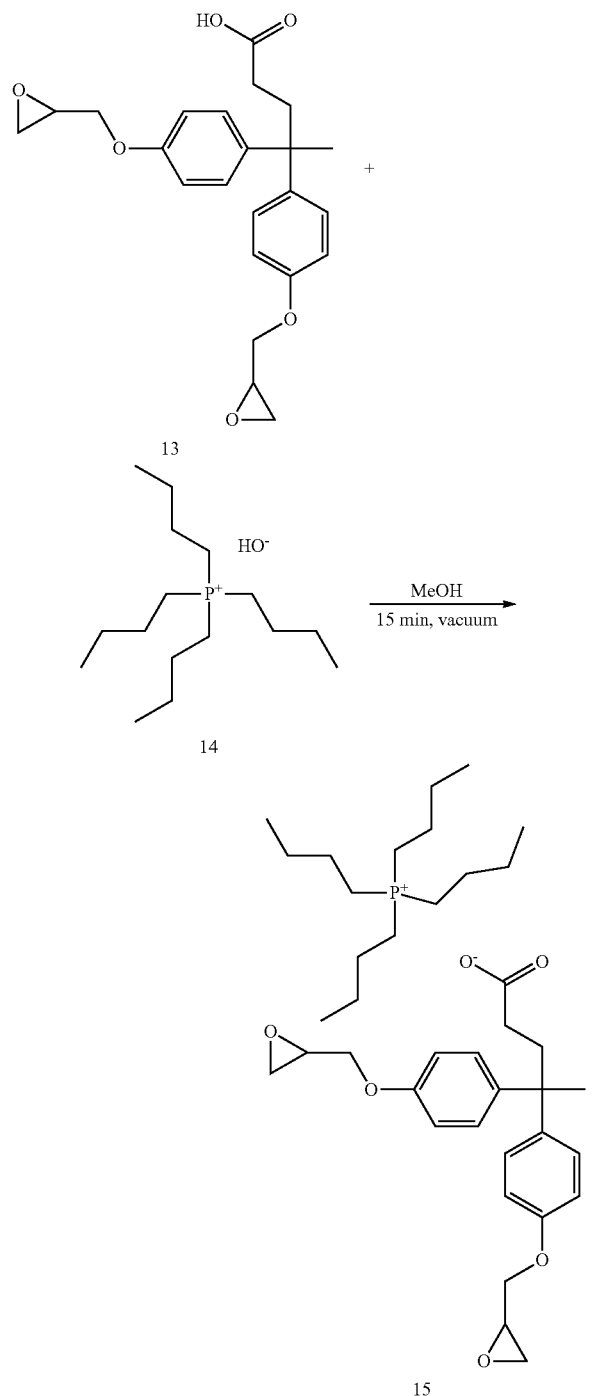

to relatively low amounts of crosslinking agents in the epoxy system. In order to probe this assumption, a new ionic liquid hardener was prepared. Secondary ionic liquid produce during the polymerization process is tetrabutylphosphonium bromide Scheme 8

Scheme 8 shows an example of a reaction in a process to synthesize an epoxy compound of aliphatic nature: tetrabutylphosphonium salt of 2,2-bis(glycidyloxymethyl)propionic acid (21). The synthetic route includes 3 steps: alkylation of commercially available 2,2-bis(hydroxymethyl)propionic acid (16) with allyl bromide (17) in toluene with NaOH. This reaction requires overnight reflux for completion and produce diallyl intermediate (18) in 90% yield. The product is quite pure and does not require further purification for the next step. Oxidation the olefinic intermediate (18) to epoxide (20) was conducted by a standard method with m-chloroperbenzoic acid (19) at room temperature overnight. This method requires tedious column purification, but gives 90% yield of epoxidized product (20). Formation of the target ionic liquid epoxy resin (21) was carried out in methanol with equimolar amounts of tetrabutylphosphonium hydroxide (14), by a similar method described for compound (15) on Scheme 7.

Scheme 8.
Synthesis of tetrabutylphosphonium 2,2-bis(glycidyloxymethyl)propionate

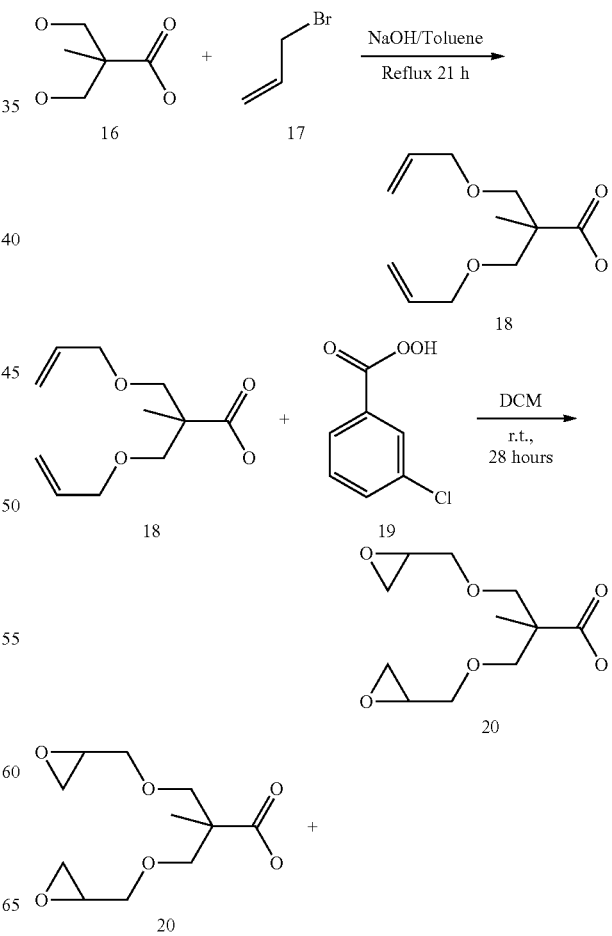

In embodiments, equimolar amounts of the compound (15) ionic liquid resin and the compound (7) ionic liquid hardener can be combined—e.g., mixed manually at room temperature and poured into a 1.5 ml silicon mold, and placed overnight in a vacuum oven at 120° C. for 12 hours. Reaction of the combined compounds (7) and (15) result in a solid material with a greasy feature and rubber-like toughness. It was theorized that such properties might be related -continued

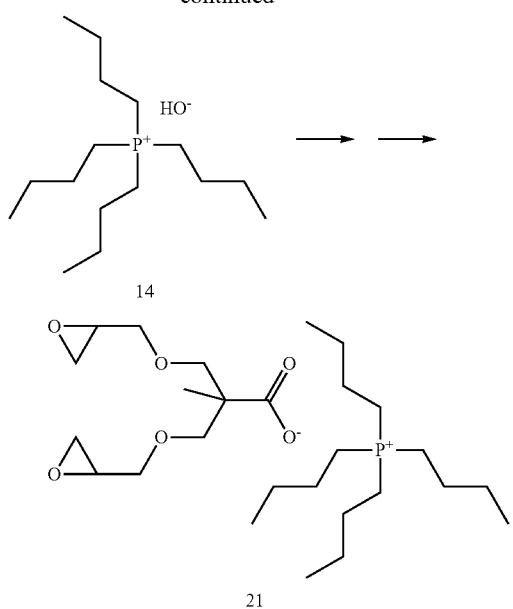

Scheme 9

Scheme 9 shows an example of a reaction in a process to synthesize an epoxy compound with positively charged heterocyclic core. Such epoxy ionic resin can react either with a negatively charged hardener (second line in Scheme 1) or with similarly positive hardener (third line in Scheme 1). In the case of both positively charged components (third line), no additional ionic liquid of AB type is formed, which can be useful for certain properties.

Scheme 9. Example: synthesis of 1,3-bis(2-oxiranylethyl) imidazolium bis(trifluoromethane)sulfonimide

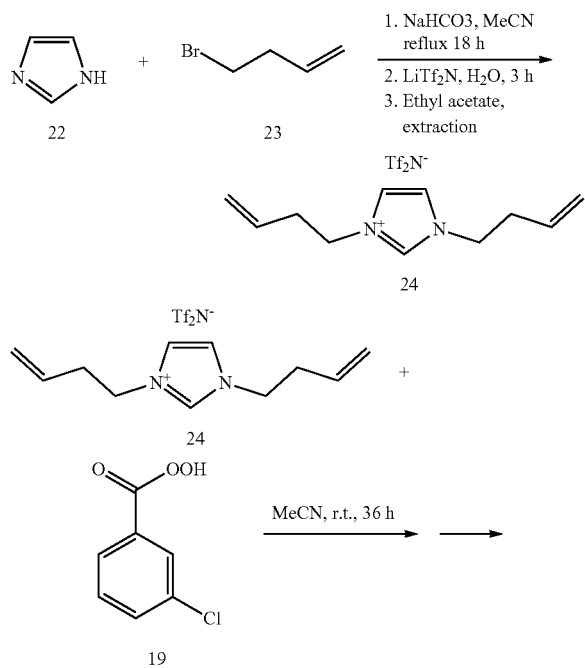

-continued

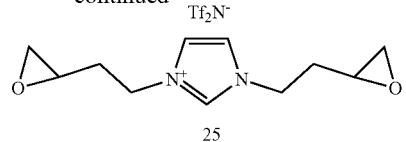

The synthetic route includes 2 steps: alkylation and quaternization of commercially available imidazole (22) with 4-bromo-1-butene (23) in usual alkylation conditions (NaHCO$_3$-acetonitrile, reflux overnight). The quaternized intermediate (24) was obtained in 99%. The crude product was pure enough and was used for the next step without additional purification. Epoxidation of the olefinic quaternized intermediate (24) was conducted under a standard method with m-chloroperbenzoic acid (19) at room temperature overnight. As in the analogous case with aliphatic epoxy ionic resin (Scheme 8, compound 20), the product required tedious column purification. The final yield was about 50%.

Scheme 10

Scheme 10 shows an example of reactions in a process to synthesize a hardener compound of an epoxy system according to an embodiment. In this example embodiment, the new hardener is intended to have a multi-branch structure in order to promote crosslinking between the polymeric chains. N1,N1-bis(2-aminoethyl)-1,2-ethanediamine (compound 26, scheme 10) was protected using a BOC (e.g., tert-butyloxycarbonyl) protecting group under room temperature conditions and overnight stirring. Protected compound (28) was then alkylated using methyl iodide at 120° C. in acetonitrile reflux with overnight stirring, the alkylation reaction was followed by TLC until the complete consumption of (28), solvent and MeI (methyl iodide) excess were remove by rotary evaporation at 45°–50° C. and 30 mmHg during 4 hours, followed by drying at room temperature and full vacuum. It is important to mention that MeI alkylation agent was selected due to facile access to the reagent, but there are several options to choose from and the final selection could be used to modify the properties of the whole epoxy resin system. BOC protection was removed using HCl-dioxane solution and the remaining acid was neutralized using NaOH. After this step the final ionic liquid was obtained by metathesis of the ionic liquid in an aqueous solution of LiTFSI, inorganic salts were removed by several washes with nanopure water and rotary evaporation at 50° C. and 15 mmHg for 4 hours. Compound (30) 2-amino-N, N-bis(2-aminoethyl)-N-methyl-ethanaminium bis(trifluoromethane)sulfonamide was obtained as a viscous white liquid, dried for 24 hours at room temperature and full vacuum.

Scheme 10. Example: synthesis of 2-amino-N,N-bis(2-aminoethyl)-N-methyl-ethanaminium bis (trifluoromethane)sulfonimide.

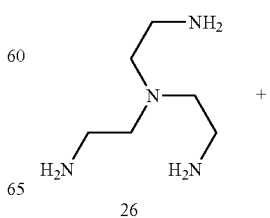

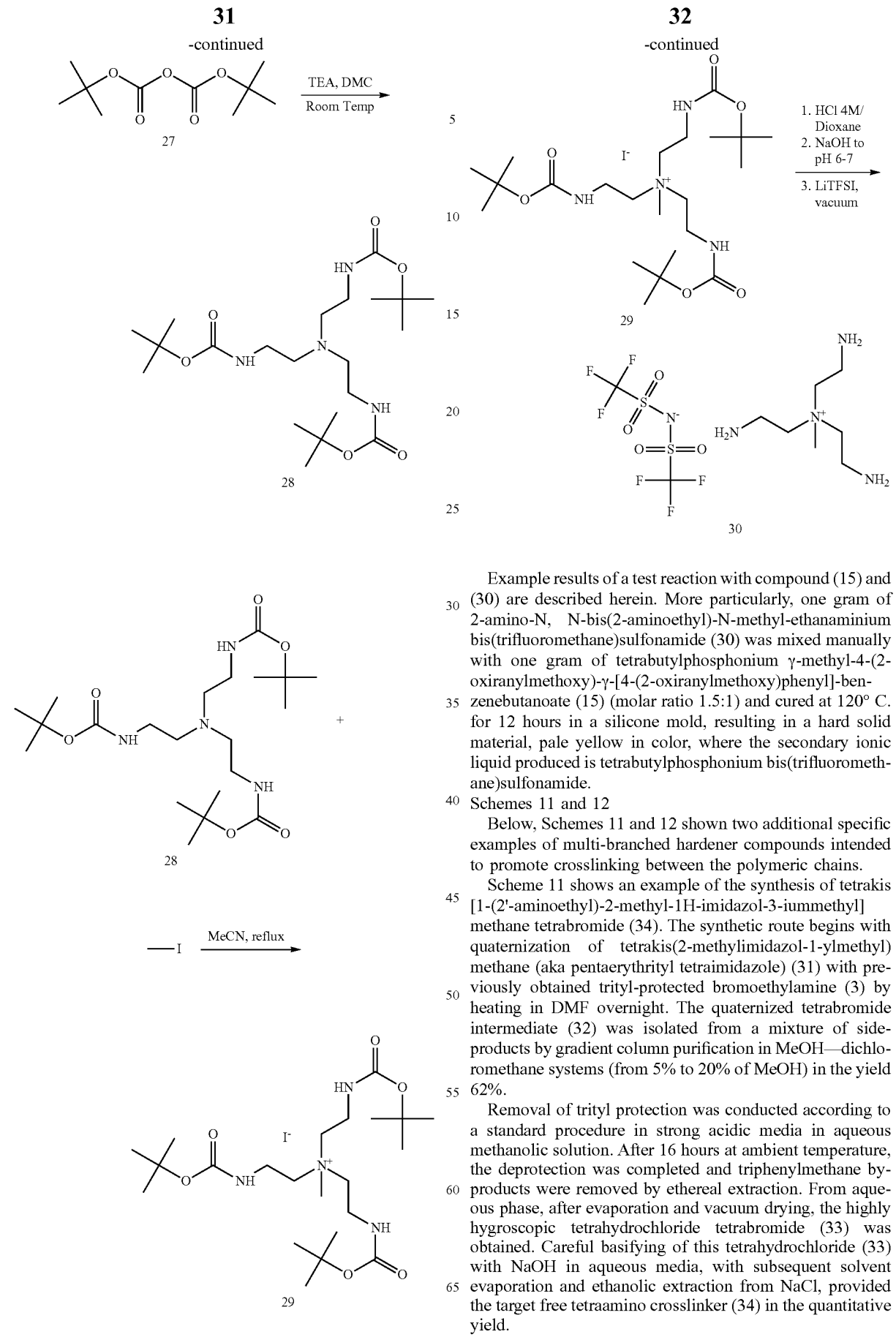

Example results of a test reaction with compound (15) and (30) are described herein. More particularly, one gram of 2-amino-N, N-bis(2-aminoethyl)-N-methyl-ethanaminium bis(trifluoromethane)sulfonamide (30) was mixed manually with one gram of tetrabutylphosphonium γ-methyl-4-(2-oxiranylmethoxy)-γ-[4-(2-oxiranylmethoxy)phenyl]-benzenebutanoate (15) (molar ratio 1.5:1) and cured at 120° C. for 12 hours in a silicone mold, resulting in a hard solid material, pale yellow in color, where the secondary ionic liquid produced is tetrabutylphosphonium bis(trifluoromethane)sulfonamide.

Schemes 11 and 12

Below, Schemes 11 and 12 shown two additional specific examples of multi-branched hardener compounds intended to promote crosslinking between the polymeric chains.

Scheme 11 shows an example of the synthesis of tetrakis [1-(2'-aminoethyl)-2-methyl-1H-imidazol-3-iummethyl] methane tetrabromide (34). The synthetic route begins with quaternization of tetrakis(2-methylimidazol-1-ylmethyl) methane (aka pentaerythrityl tetraimidazole) (31) with previously obtained trityl-protected bromoethylamine (3) by heating in DMF overnight. The quaternized tetrabromide intermediate (32) was isolated from a mixture of side-products by gradient column purification in MeOH—dichloromethane systems (from 5% to 20% of MeOH) in the yield 62%.

Removal of trityl protection was conducted according to a standard procedure in strong acidic media in aqueous methanolic solution. After 16 hours at ambient temperature, the deprotection was completed and triphenylmethane by-products were removed by ethereal extraction. From aqueous phase, after evaporation and vacuum drying, the highly hygroscopic tetrahydrochloride tetrabromide (33) was obtained. Careful basifying of this tetrahydrochloride (33) with NaOH in aqueous media, with subsequent solvent evaporation and ethanolic extraction from NaCl, provided the target free tetraamino crosslinker (34) in the quantitative yield.

Scheme 11. Synthesis of tetrakis[1-(2'-aminoethyl)-2-methyl-1H-imidazol-3-iummethyl]methane tetrabromide

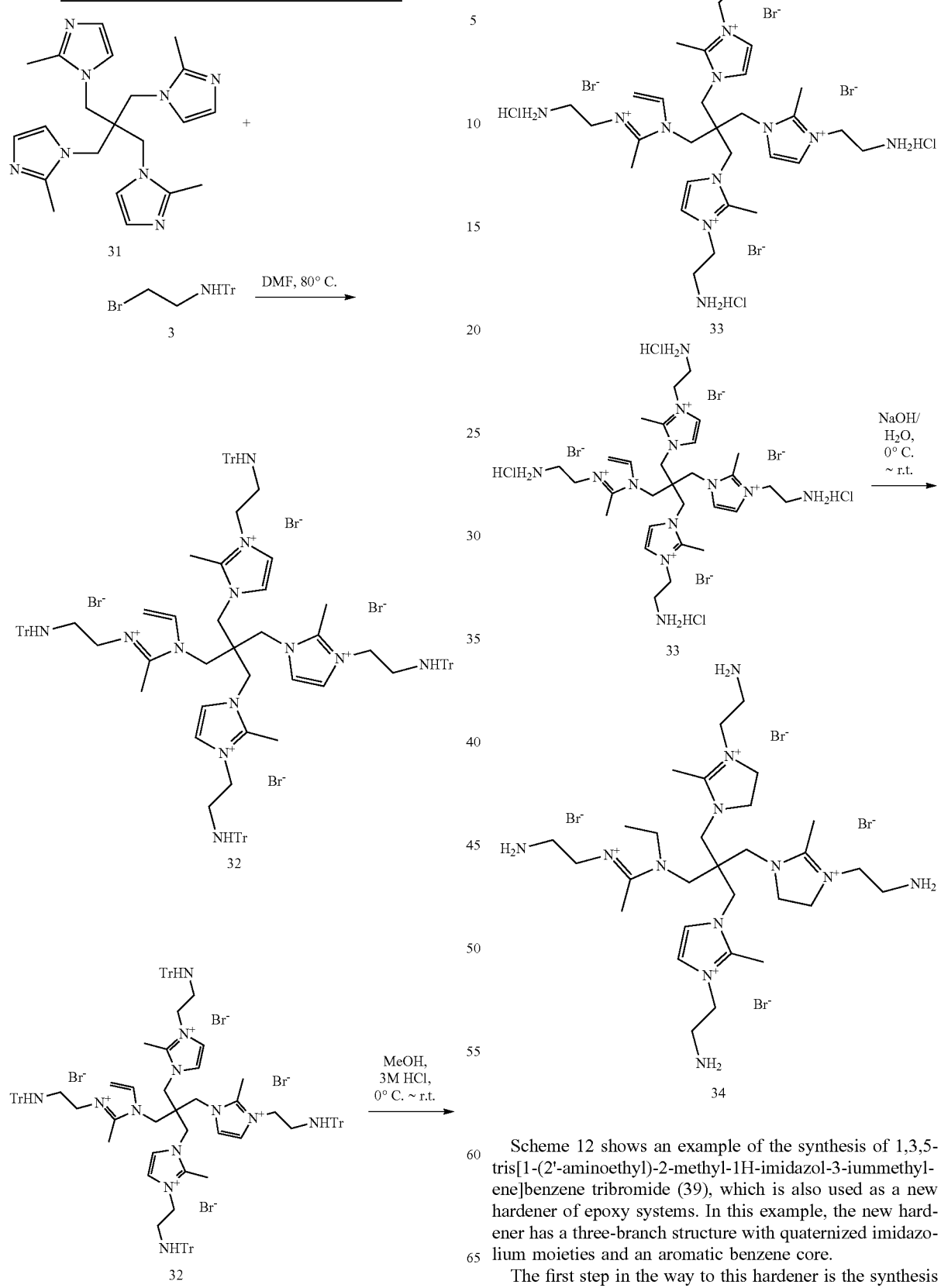

Scheme 12 shows an example of the synthesis of 1,3,5-tris[1-(2'-aminoethyl)-2-methyl-1H-imidazol-3-iummethyl-ene]benzene tribromide (39), which is also used as a new hardener of epoxy systems. In this example, the new hardener has a three-branch structure with quaternized imidazolium moieties and an aromatic benzene core.

The first step in the way to this hardener is the synthesis of mono-alkylated 2-methylimidazole (35), which is considered as a new building block for the synthesis of this class of molecules. This synthesis is, in fact, the first step of the preparation of the quaternized trityl-protected diamino intermediate (5), which was mentioned above. To achieve monoalkylated intermediate, the reaction between reactants (3) and (4) was conducted in equimolar ratio at room temperature. Inorganic side-product NaBr was easily removed by water-dichloromethane work-up, after that the target compound (35) was isolated as crystalline product from dichloromethane phase in the yield 78%. Obtained by this method, the product (35) was pure enough for further transformation, but could be recrystallized form hexane for analytical purposes.

The next step in this preparative pathway is quaternization of the intermediate (35) with a previously synthesized 1,2,3-tris(bromomethyl)benzene (36) under heating in DMF at 80° C. for 19 hours. After DMF removal, the quaternized tribromide intermediate (37) was isolated from impurities as a low soluble precipitate by subsequent treatment with ether and acetone. Obtained in the yield of 98%, the product (37) was quite pure (such as greater than 90% purity) for further use without additional purification. For analytical purposes, a sample of the product could be recrystallized from water.

Removal of trityl protection was conducted according to a standard procedure in strong acidic media in aqueous methanolic solution. After 18 hours at ambient temperature, the deprotection was completed and triphenylmethane by-products were removed by ethereal extraction. From aqueous phase, after evaporation and vacuum drying, the highly hygroscopic trihydrochloride tribromide (38) was obtained. Careful basifying of this trihydrochloride (38) with NaOH in aqueous media, with subsequent solvent evaporation and ethanolic extraction from NaCl, provided the target free triamine crosslinker (39) in the yield of 94%. One of the advantages of imidazolium-based multi-branch crosslinkers ionic liquids additives is the improve miscibility with imidazolium-based resins and hardeners.

Scheme 12. Synthesis of 1,3,5-tris[1-(2'-aminoethyl)-2-methyl-1H-imidazol-3-iummethylene]benzene tribromide

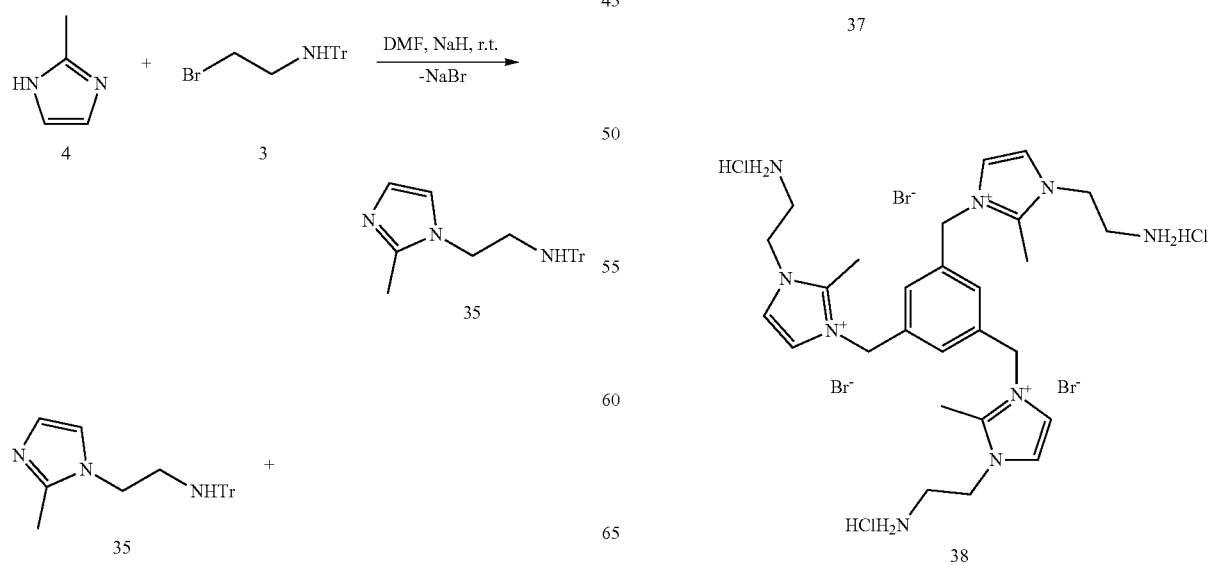

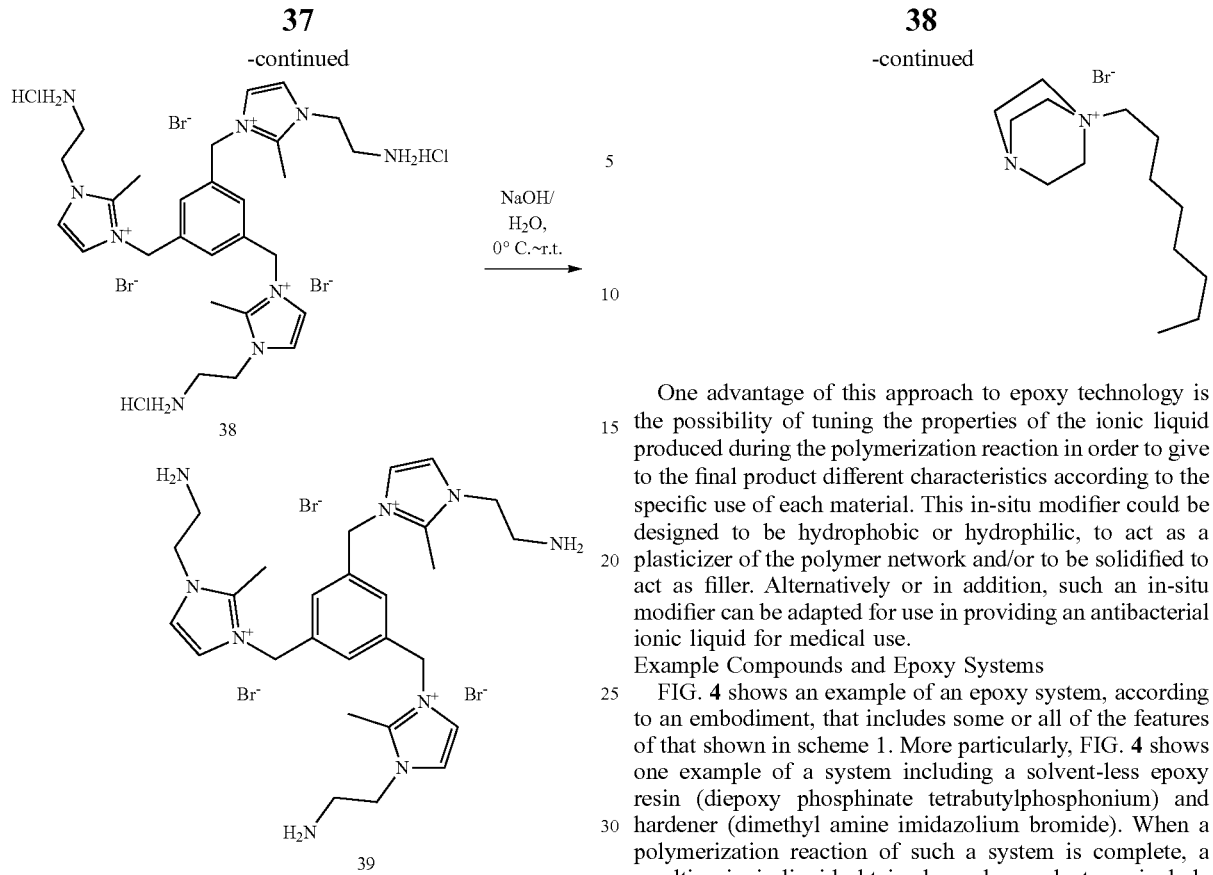

Scheme 13

Scheme 13 shows an example of a reaction to facilitate synthesis of a modifier (e.g., an accelerant or catalyst) for the epoxy system according to an embodiment. Such an accelerant/catalyst can expedite a reaction such as that shown in scheme 1.

It is possible to synthesize a modifier of the polymerization reaction as an ionic liquid or ionic compound that will mitigate or even void the possibility of VOC emissions. One of the most commonly used reaction modifiers is DABCO, whose catalytic effect in the polymerization reaction helps to accelerate the process of curing. Although synthesis of ionic DABCO compounds is known, its ionic form has been tested as an anti-microbial agent, but not as polymerization modifier. In one illustrative embodiment, a dabconium compound can be synthesized, for example, by direct alkylation of 1,4-diazabicyclo[2.2.2]octane with 1-Bromo octane in dichloromethane under reflux conditions and overnight stirring. Octyl Dabconium bromide can be obtained in quantitative yield.

Scheme 13.
General procedure for the synthesis of, N-octyldabconium bromide.

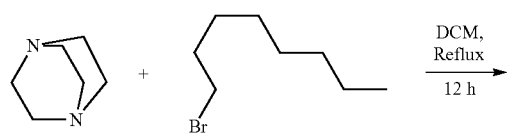

One advantage of this approach to epoxy technology is the possibility of tuning the properties of the ionic liquid produced during the polymerization reaction in order to give to the final product different characteristics according to the specific use of each material. This in-situ modifier could be designed to be hydrophobic or hydrophilic, to act as a plasticizer of the polymer network and/or to be solidified to act as filler. Alternatively or in addition, such an in-situ modifier can be adapted for use in providing an antibacterial ionic liquid for medical use.

Example Compounds and Epoxy Systems

FIG. 4 shows an example of an epoxy system, according to an embodiment, that includes some or all of the features of that shown in scheme 1. More particularly, FIG. 4 shows one example of a system including a solvent-less epoxy resin (diepoxy phosphinate tetrabutylphosphonium) and hardener (dimethyl amine imidazolium bromide). When a polymerization reaction of such a system is complete, a resulting ionic liquid obtained as a by-product can include tetrabutylphosphonium bromide, which in turn can be used—for example—as plasticizer of a polymerized phosphinate/dimethylamine imidazolium network.

Figure 5:
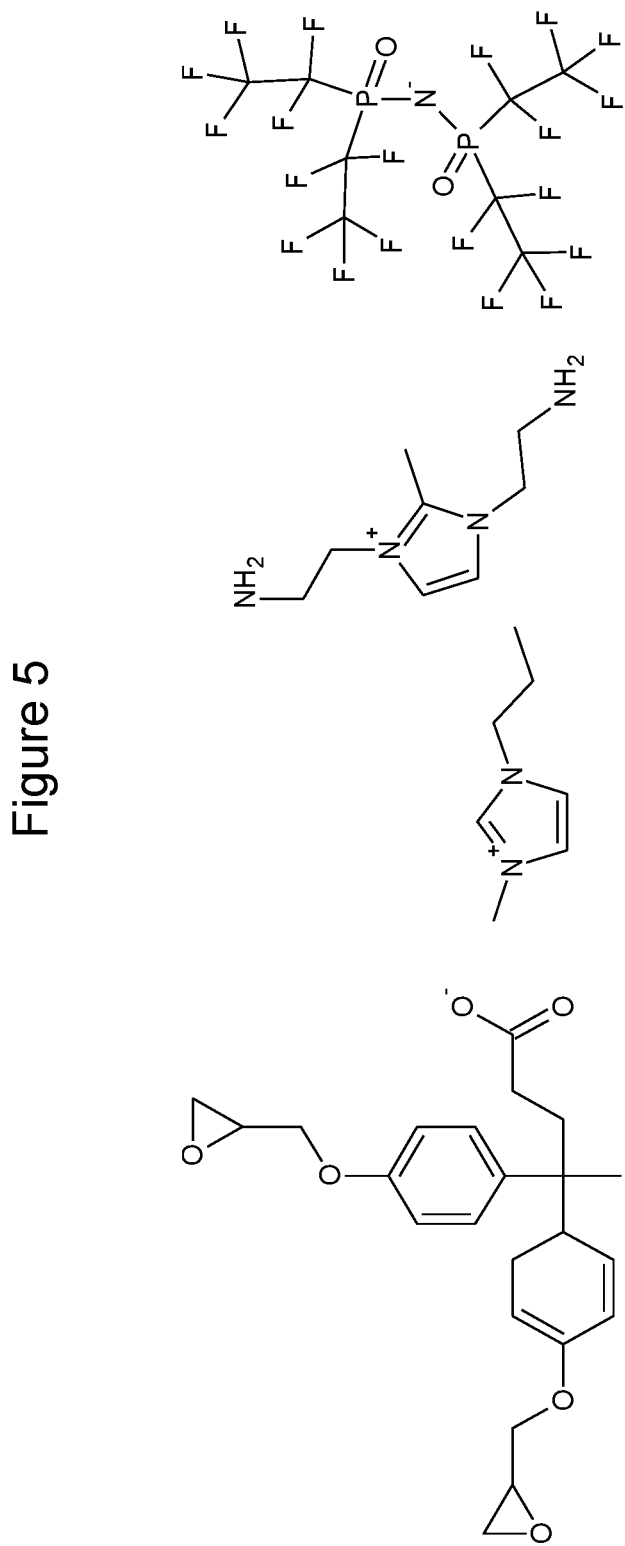
FIG. 5 shows the chemical structures of an example of an ionic liquid epoxy system including a super-hydrophobic anionic portion that produces a super-hydrophobic material after the polymerization reaction, in accordance with embodiments disclosed herein.

FIG. 5 shows an example of an epoxy system, according to an embodiment, that includes some or all of the features of that shown in scheme 1. More particularly, FIG. 5 shows one example of a possible solvent-less ionic liquid epoxy system. If, for example, a user requires a polymer with a super hydrophobic surface it is possible to design the hardener and resin to produce a super hydrophobic ionic liquid after the polymerization reaction happens, as the case of imidazolium bis[bis(pentafluoroethyl)phosphinyl]imide ionic liquids, where the anionic portion is the hydrophobic part of the ionic liquid. One such ionic liquid epoxy system is shown in FIG. 5.

Figure 6:
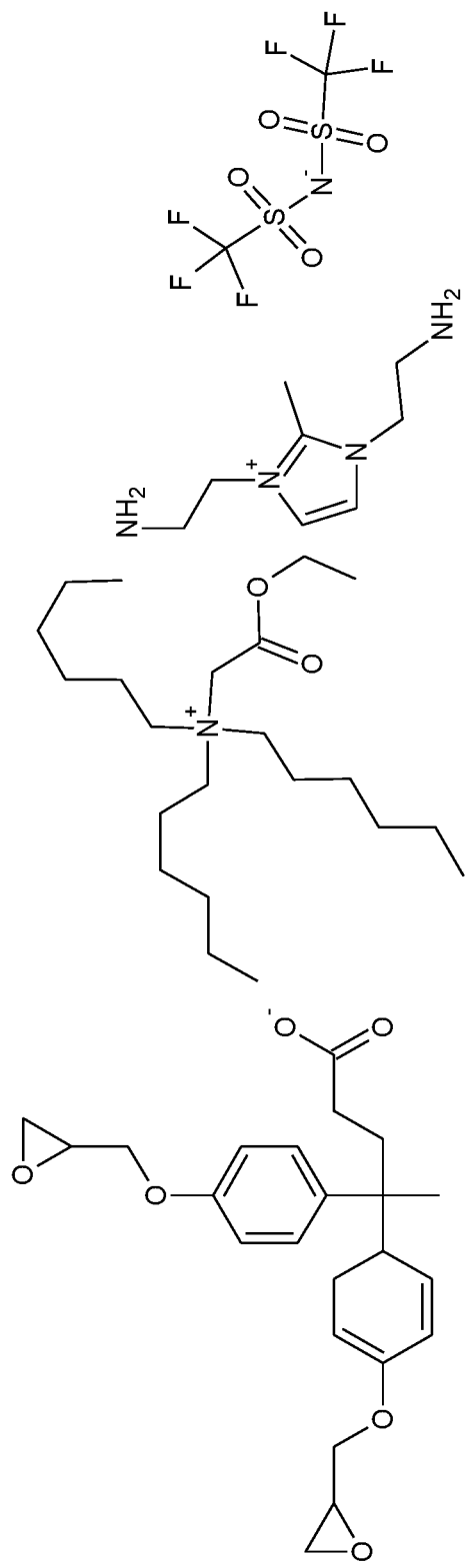
FIG. 6 shows the chemical structures of an example ionic liquid epoxy system including a super-hydrophobic cation that produces a super-hydrophobic material after the polymerization reaction, in accordance with embodiments disclosed herein.

FIG. 6 shows an example of an epoxy system, according to an embodiment, that includes some or all of the features of that shown in scheme 1. More particularly, FIG. 6 illustrates an alternative use of super-hydrophobic cations such as Tri(n-hexyl)[2-ethoxy-2-oxoethyl]ammonium.

Figure 7:
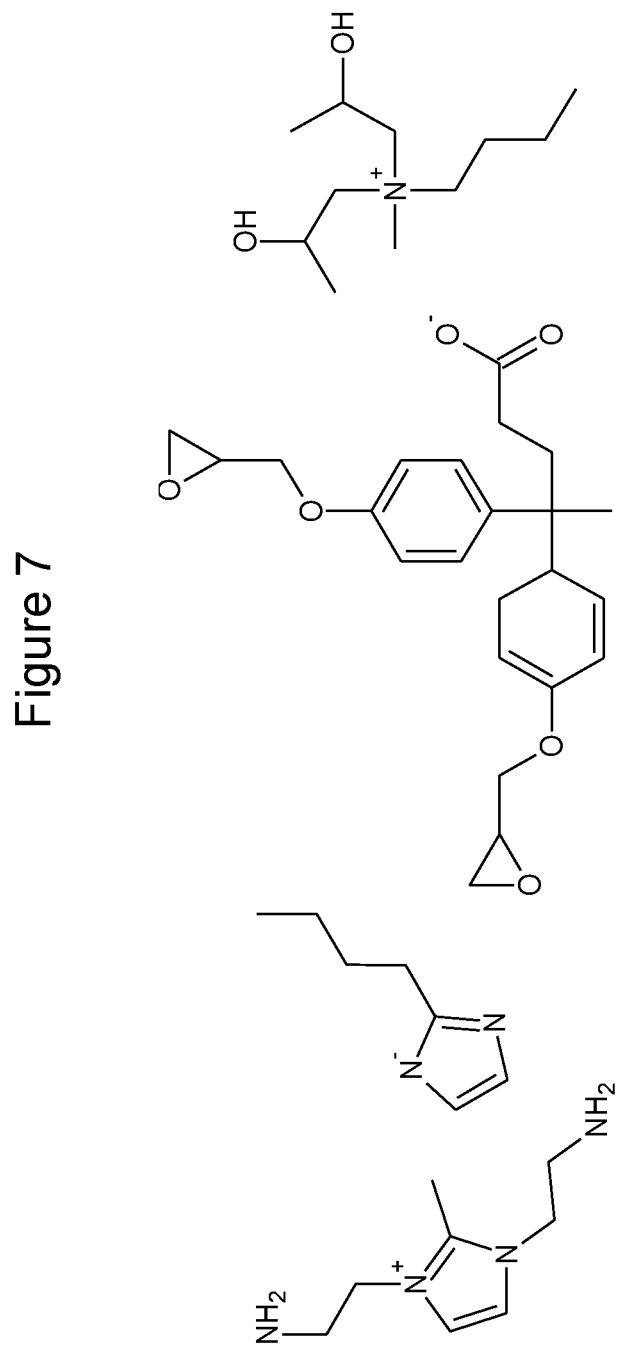
FIG. 7 shows the chemical structures of an ionic liquid epoxy system that produces a transitional hydrophobic-hydrophilic material after the polymerization reaction, in accordance with embodiments disclosed herein.

FIG. 7 shows an example of an epoxy system, according to an embodiment, that includes some or all of the features of that shown in scheme 1. In the case of the example embodiment shown in FIG. 7, the hydrophobic-hydrophilic character of the final product can be tuned and can be modified after the polymerization process using ionic liquids with a transitional hydrophobicity. In this case the hydrophobicity is modified by the presence of carbon dioxide. In $CO_2$ free environments this kind of ionic liquid has hydrophobic behavior. When the material is exposed to $CO_2$ the ionic liquid suffers a transition to a hydrophilic condition. This phenomenon is reversible and could provide a tunable material even after the curing of the epoxy resins. The same behavior has been observed in anionic portions derived from pyrazole, imidazole and triazole.

Figure 8:
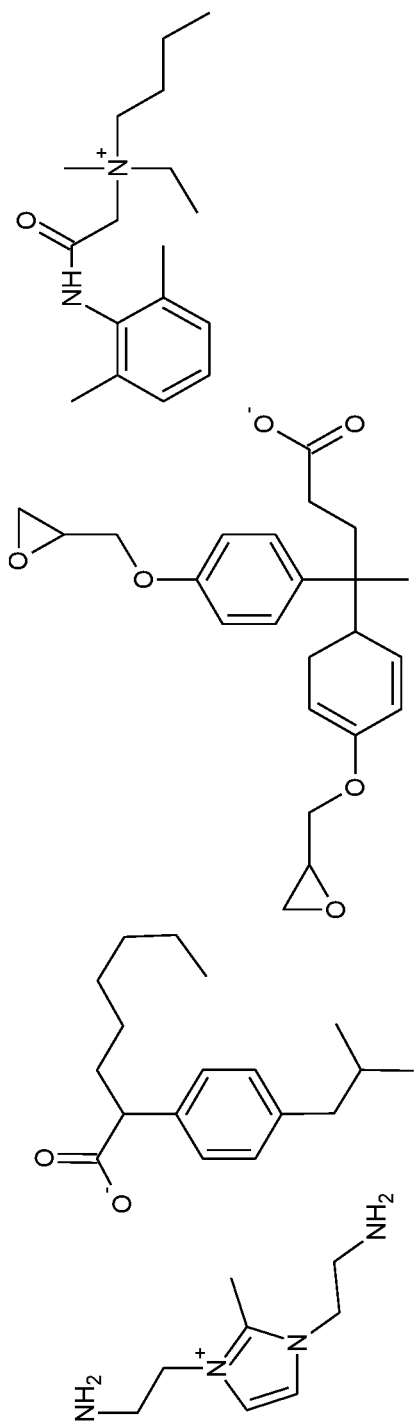
FIG. 8 shows the chemical structures of an ionic liquid epoxy system that includes a pharmaceutically active anion and cation and produces a medication release material after the polymerization reaction, in accordance with embodiments disclosed herein.
Figure 9A:
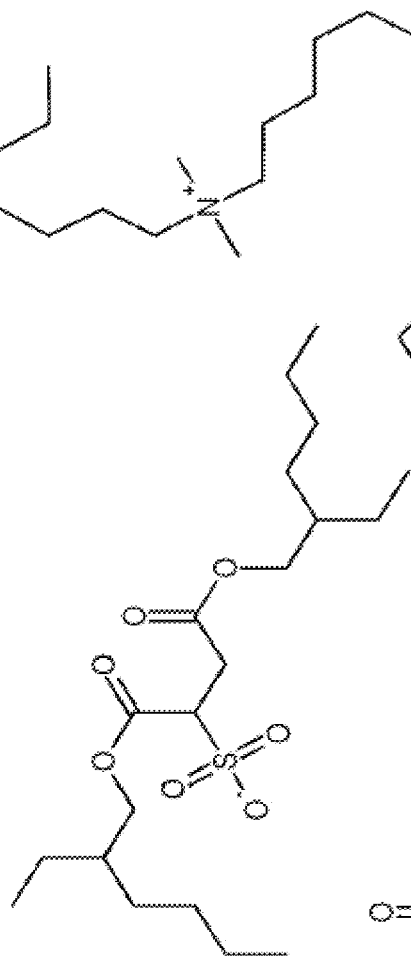
FIGS. 9A-9F show the chemical structures of exemplary pharmacological active ions for the solvent-less ionic liquid epoxy resins, FIG. 9A) anti-histamic, FIG. 9B) emollient, FIG. 9C) anti-inflammatory, FIG. 9D) pain reliever, FIG. 9E) anti-inflammatory and FIG. 9F) anti-cholinergic, in accordance with embodiments disclosed herein.
Figure 9B:
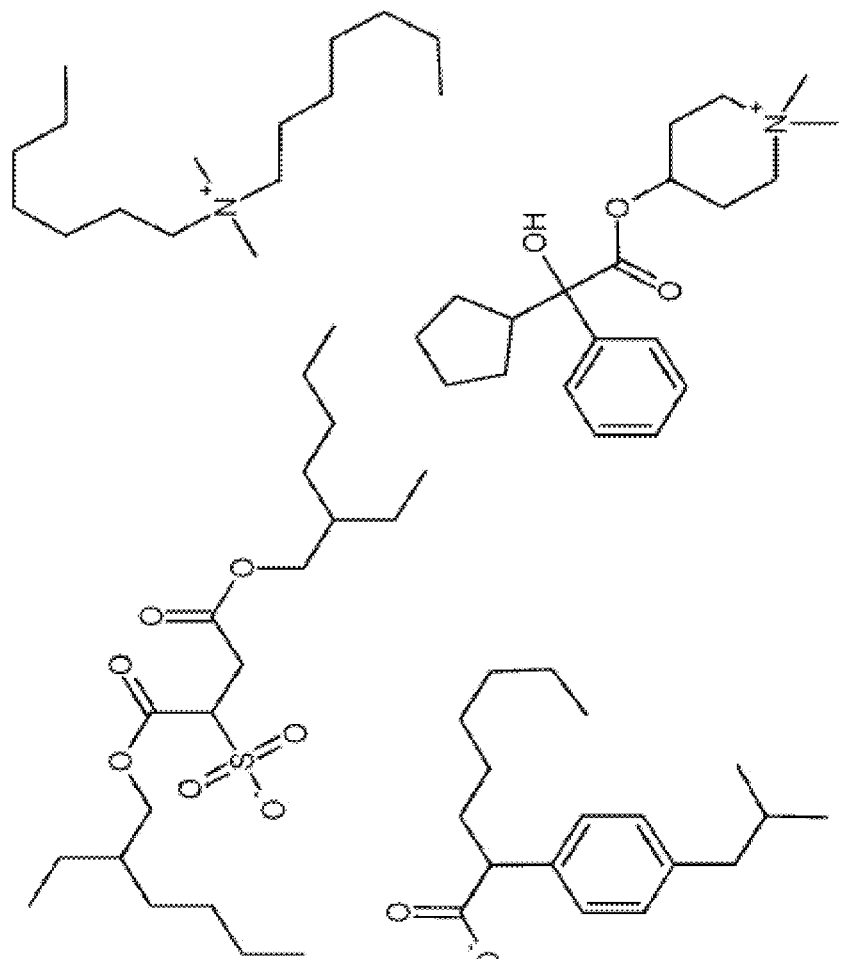
Figure 9C:
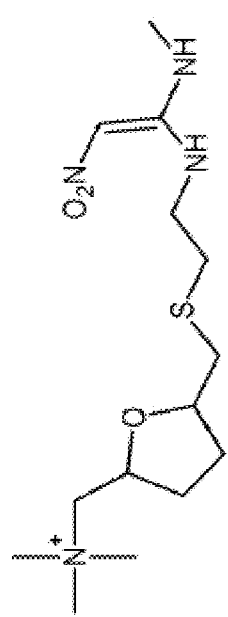
Figure 9D:
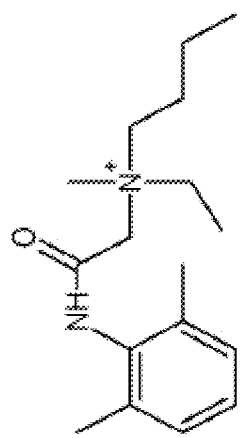
Figure 9E:
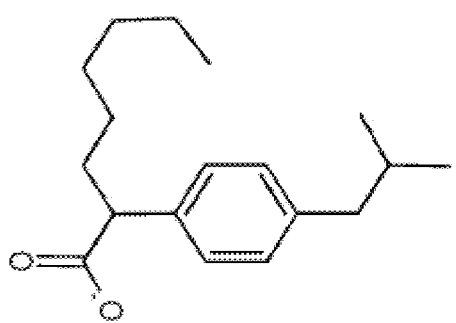
Figure 9F:
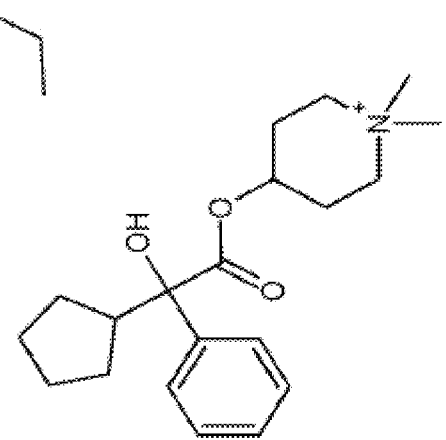
Figure 10I:
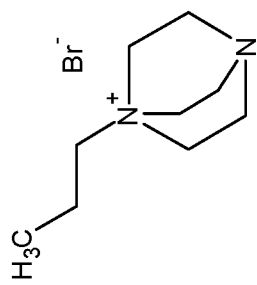
Figure 10H:
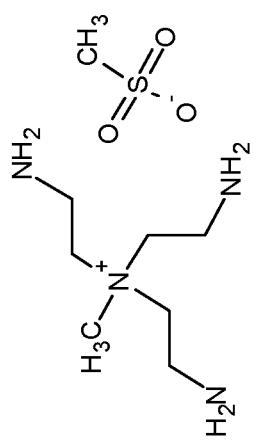
Figure 10G:
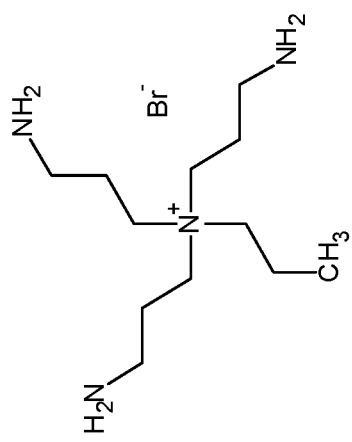

FIG. 8 shows an example of an epoxy system, according to an embodiment, that includes some or all of the features of that shown in scheme 1. The production of a secondary ionic liquid, after the curing process, can be useful in various medical, pharmaceutical and/or other important fields of application for ionic liquid epoxy resins. Some embodiments variously provide a long term release system for medication—e.g., using pharmacologically active ionic liquids such as the ones derived from ibuprofenate and lidocainium. Several combinations can be obtained from these ionic liquids, according to various embodiments, to open—for example—the possibility of pain-killer releasing ferules (FIG. 8). The secondary ionic liquid thus produced would be lidocainium ibuprofenate.

FIGS. 9A-9F show various examples of anionic portions and cationic portions—e.g., each to variously function as a respective one of anionic portion $A^-$ or cationic portion $B^+$ of scheme 1, respectively—each of an epoxy system according to an embodiment. Some embodiments variously blend epoxy polymer technology with the emerging field of pharmaceutical active ionic liquids. FIGS. 9A-9F show some examples of useful therapeutic materials that can be adapted for use according to various embodiment.

FIGS. 10A-10I show various examples of hardener compounds, epoxy compounds and modifiers each of an epoxy system according to a respective embodiment. Some or all of the compounds shown in FIGS. 10A-10I can each be a component of a respective system having, for example, some of all of the features of the system shown in scheme 1.

It is important to remark that the existence of a large number of possible counter-ions permits the design of a final polymer that is to meet any of a wide variety of specifications required by the end user of a solvent-less ionic liquid epoxy system. Combination of the proper ions could tune polymer properties such as flexibility, hardness, hydrophobicity, curing time, curing temperature, set up secondary reactions, ionic conductivity, etc. Also, the design of ionic liquid crosslinking agents, accelerators, and catalysts (examples shown in FIGS. 10A-10I) would ensure that the whole epoxy system is composed of zero vapor pressure components.

Due at least in part to some or all such characteristics, it can be possible, as an example, to produce thermoset solid state electrolytes, important in the development of batteries for the storage of electrical energy. A solvent-less ionic liquid epoxy system according to some embodiments allows the injection of an electrolyte into the battery structure, setting up a polymerization reaction to provide a fully polymerized, ionic liquid filled, solid state electrolyte.

Figure 11:
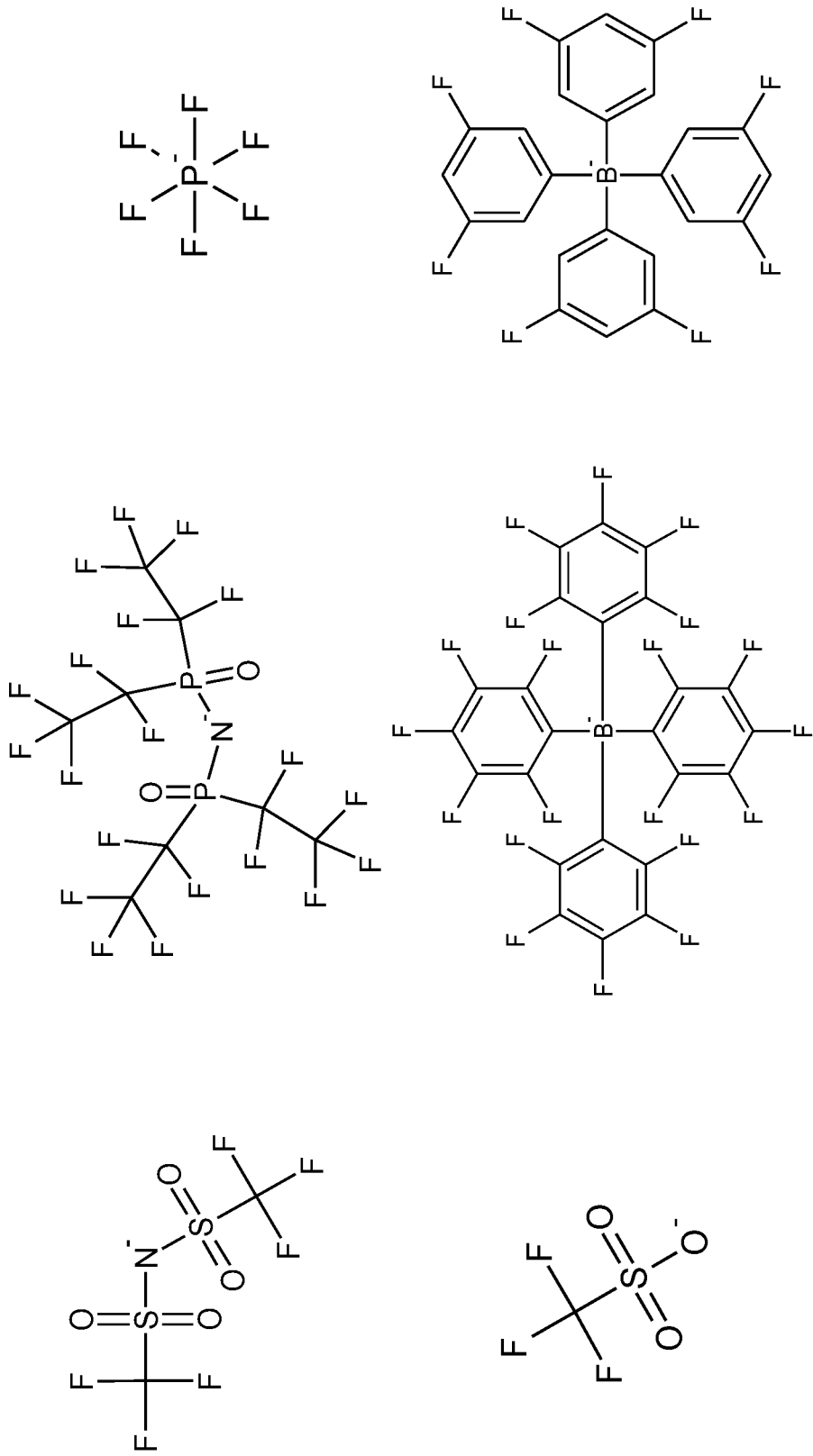
FIG. 11 shows the chemical structures of examples of hydrophobic anions usable for the synthesis of ionic liquid epoxides and hardeners, in accordance with embodiments disclosed herein.

FIG. 11 shows various examples of an anionic portion—e.g., the anionic portion $A^-$ shown in scheme 1—each of a respective epoxy system according to an embodiment. FIG. 12 shows various examples of cationic portions—e.g., the cationic portions $B^+$ shown in scheme 1—each of a respective epoxy system according to an embodiment.

As mentioned above, hydrophobic materials could be produced from ionic liquids epoxies with selection of the corresponding counter ions to the hardener and epoxy ionic liquids. A wide variety of hydrophobic anions (FIG. 11) and hydrophobic cations (FIG. 12) are available to facilitate selection of a combination that, according to different embodiments, precisely accommodates a particular desired level of hydrophobicity for a final material.

FIG. 13 shows various examples of an anionic portion—e.g., the anionic portion $A^-$ shown in scheme 1—each of a respective epoxy system according to an embodiment. As illustrated by the examples shown in FIG. 11, it can be possible to synthesized epoxides ionic liquids where the secondary ionic liquid has a prominent hydrophilic character. Many inorganic anions are highly hydrophilic (FIG. 13) and require bulky anions to produce ionic liquids.

Figure 14:
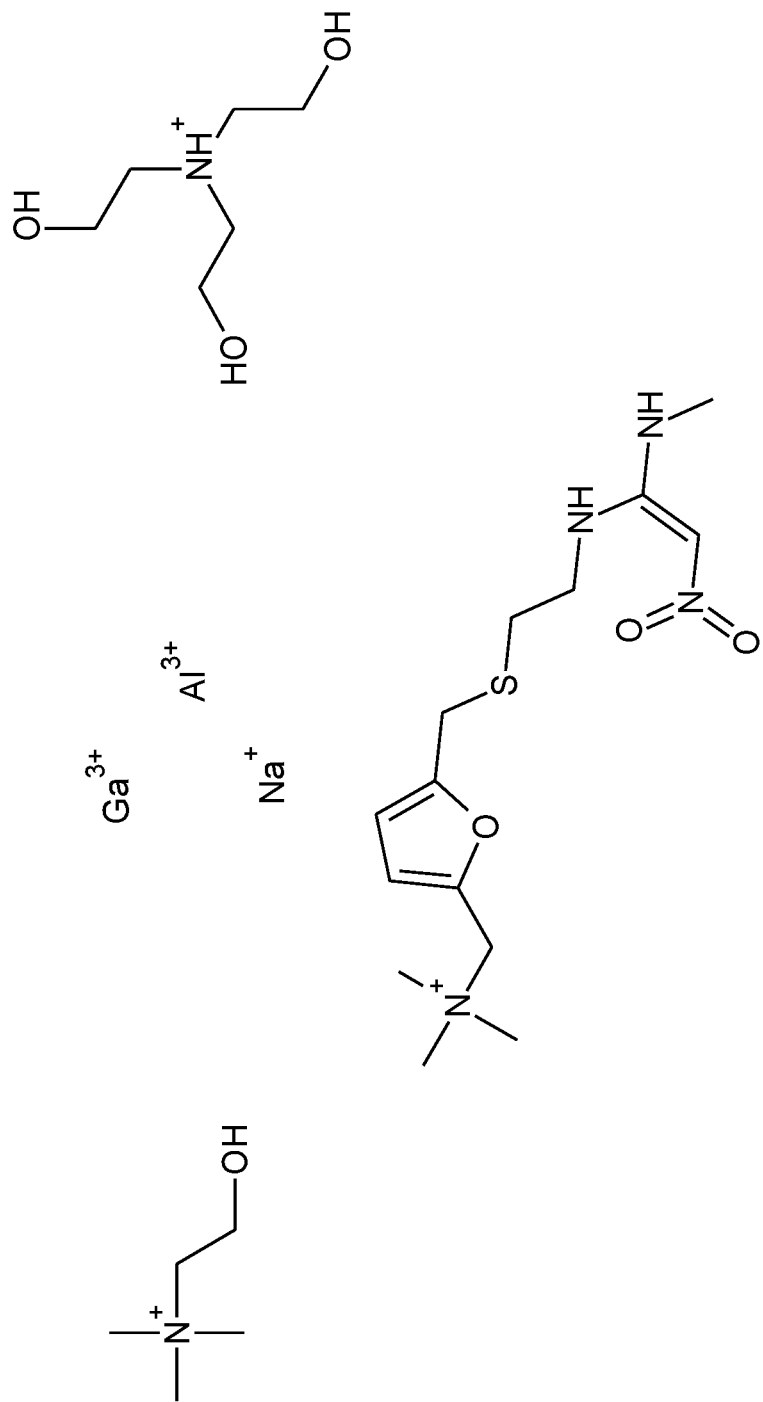
FIG. 14 shows the chemical structures of examples of hydrophilic cations usable for the synthesis of ionic liquid epoxides and hardeners, in accordance with embodiments disclosed herein.
Figure 15B:
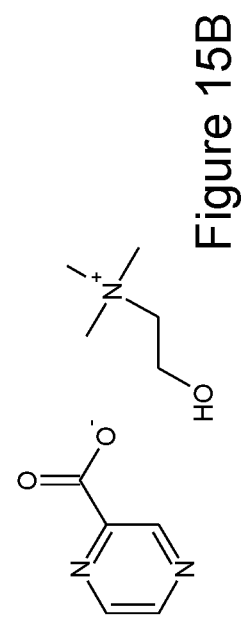
FIGS. 15A-15F show the chemical structures of examples of biological active ionic liquids (BAILs) to be used as an active material in ionic liquid epoxides systems, FIG. 15A) 1-alkyl-1-methylpiperidinium-4-(4-chloro-2-methylphenoxy)butanoate, herbicide.
Figure 15D:
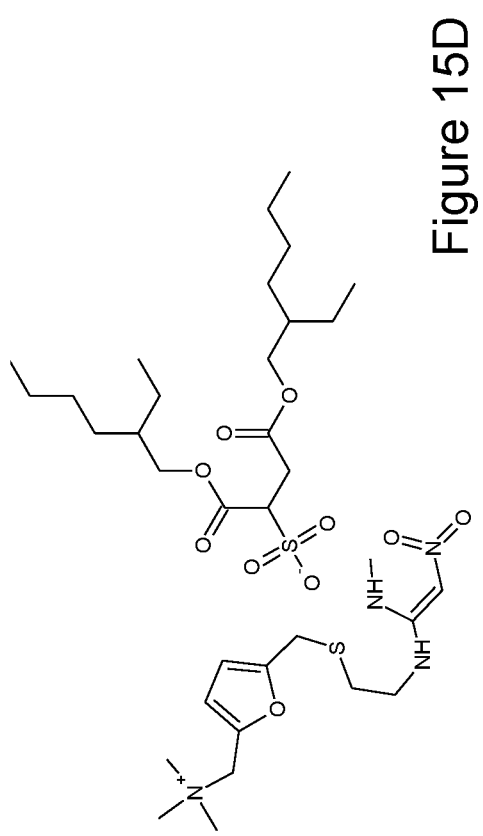
Figure 15F:
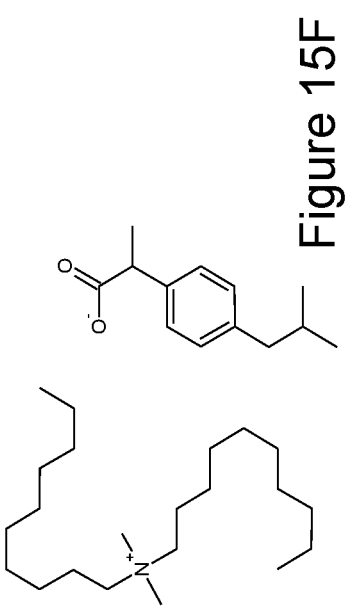
Figure 15A:
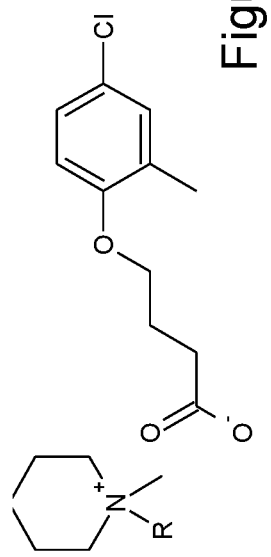
Figure 15C:
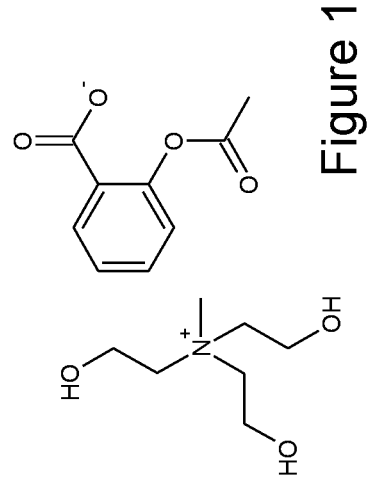
Figure 15E:
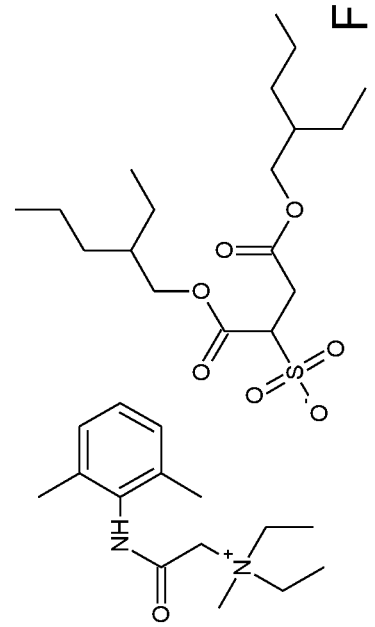
Figure 17C:
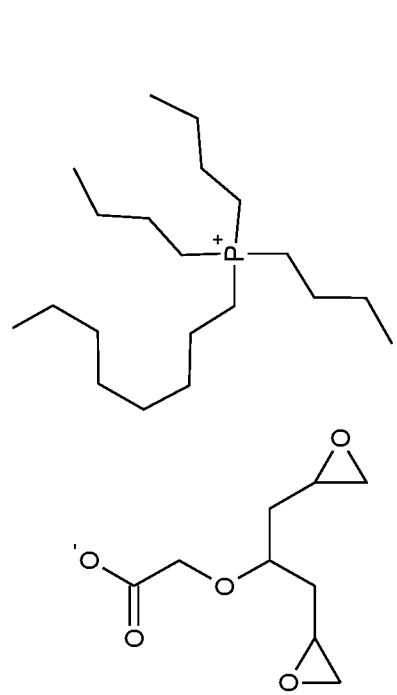
FIGS. 17A-17D show the chemical structures for BPA-free ionic liquid epoxy systems, FIG. 17A) example of an aliphatic epoxy resin, FIG. 17B) example of an aliphatic hardener, FIG. 17C) second example of an aliphatic epoxy resin, and FIG. 17D) Aromatic non phenolic example of an epoxy resin, in accordance with embodiments disclosed herein.
Figure 17D:
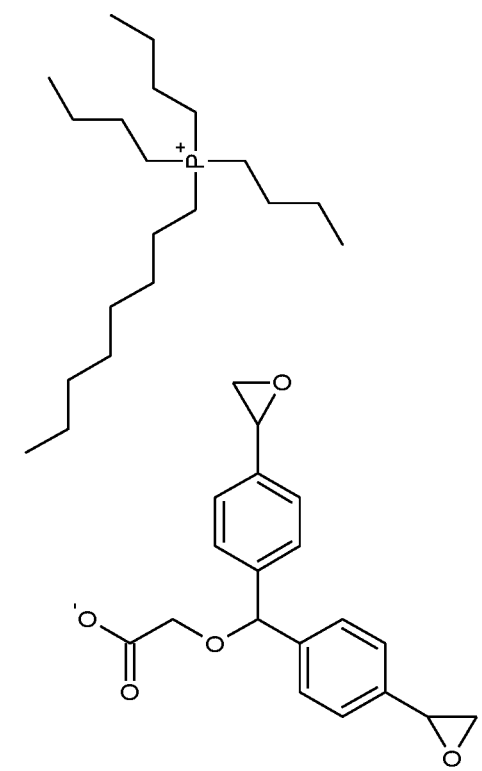
Figure 17A:
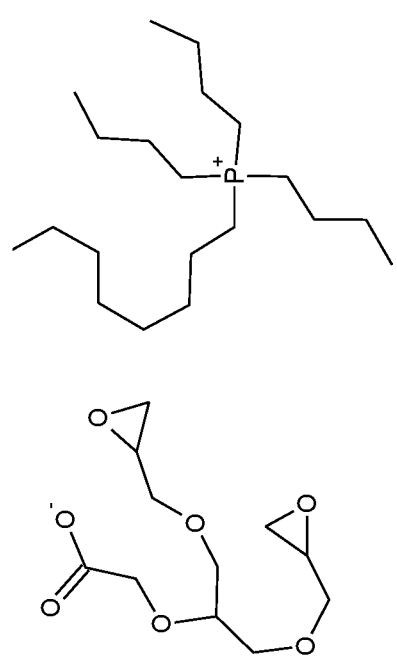
Figure 17B:
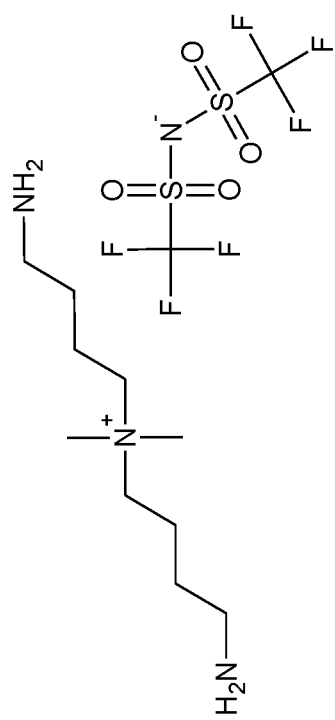

FIG. 14 shows various examples of a cationic portions—e.g., the cationic portion $B^+$ shown in scheme 1—each of a respective epoxy system according to an embodiment. FIG. 14 illustrates inorganic cations and organic cations with hydrogen bond donor moieties that are also highly hydrophilic.

FIGS. 15A-15F show various examples of an ionic liquid epoxy compound—e.g., such as that shown in scheme 1—each of a respective epoxy system according to an embodiment. There is a wide range of biologically active ionic liquids (BAILs), from ionic liquids with herbicidal properties to ionic liquids with antitumor activity. Some examples are shown in FIGS. 15A-15F. New BAILs are being introduced regularly, and many of these BAILs can be used as a secondary ionic liquid in the ionic liquid epoxy systems providing a drug-eluding material after the proper curing process. Other examples are the ionic liquids derived from flufenamic acid (non-steroidal anti-inflammatory drugs) and ampicillin (anti-tumor activity).

FIGS. 16A-16F show various examples byproduct compounds each to be formed by a reaction of a respective epoxy system according to an embodiment. The compounds shown in FIGS. 16A-16F can each be formed, for example, by the reaction of the anion $A^-$ with the cation $B^+$ shown in scheme 1.

Plasticizers are used to modify the mechanical properties of different polymers—e.g., changing the rigidity, deformability, elongation; toughness, process viscosity, service temperature and/or the like. Traditionally, there are two types of plasticizers: inner and external plasticizers. Inner plasticizers are structural modifications to the polymers that affect its mechanical properties, i.e. copolymerization moieties, addition of substituent groups, etc. External plasticizers are additives incorporated during the polymers processing, that have effect on the crystallinity of the polymers. Organic solvents are usually utilized as plasticizers but their efficiency is typically related to the permanence of the solvent in the polymer structure. Many common plasticizers dissipate over time—e.g., at a rate depending on parameters such as volatility, boiling point, osmotic pressure and solvent power. Due to such problems, ionic liquids—which have relatively very low vapor pressure—can be used as a new class of plasticizers, in some embodiments. Such use can take advantage of better solvent powers, osmotic pressures and low volatility. Some of the ionic liquids used as plasticizers are shown in FIGS. 16A-16F and all of them can be used as the secondary ionic liquid in the ionic liquid epoxides systems.

FIGS. 17A-17D show various examples of an epoxy compound—e.g., such as that shown in scheme 1—each of a respective epoxy system according to an embodiment. In recent years it has been discovered that the presence of Bis Phenol A (BPA) in various polymer formulations presents a health hazard concern. BPAs have been associated/correlated to problems in the reproduction systems of women and men, birth defects in children, metabolic diseases and immune system affectation. For these and/or other reasons, it is important for manufacturers to have BPA-free options in polymer production. Since solvent-less ionic liquid epoxide system according to various embodiments have low intrinsic vapor pressure and the risk of volatile BPAs is relatively low, they can be important in mitigating the possibility of BPA contamination in polymer-based products intended for human use. Aliphatic systems are one example of an implementation that can mitigate BPA problems. Some proposed structures to mitigate the possibility of BPA byproducts are show in FIGS. 17A-17D.

Figure 18B:
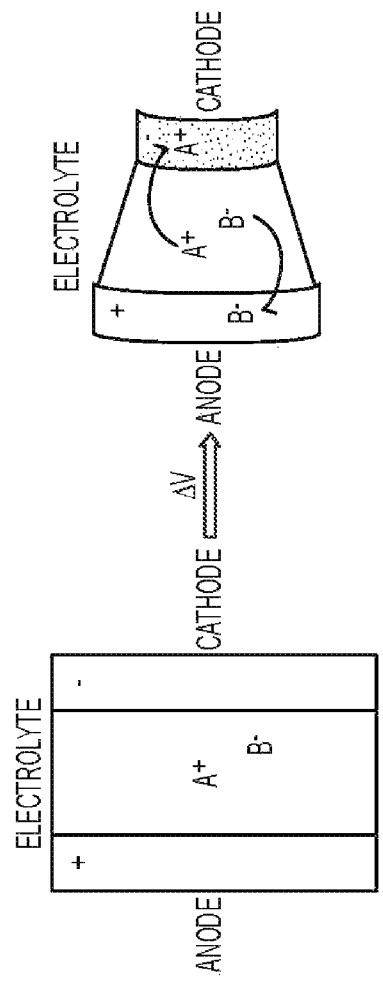
FIGS. 18A and 18B are schematics showing examples of an electrochemical cell with a solid electrolyte component (FIG. 18A) and an electrochemical actuator with a volume change in the electrodes due to the applied potential (FIG. 18B), respectively, in accordance with embodiments disclosed herein.
Figure 18A:
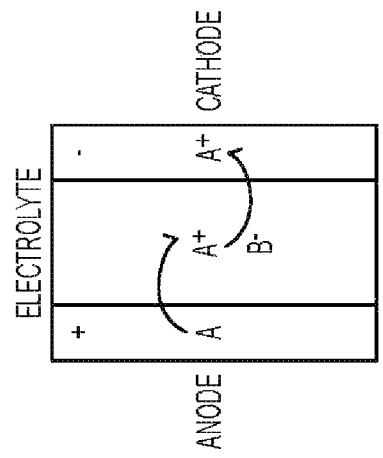

FIGS. 18A-18B show an example of devices each including a respective epoxy material according to an embodiment. For example, the devices of FIGS. 18A and 18B can each include a respective epoxy material such as one formed by a reaction such at that shown in scheme 1.

Solid electrolytes and electrochemical actuators are closely related—e.g., both systems are generally compromised of a polymeric matrix containing an electrolyte (organic or inorganic salt) between two electronic conductors (electrodes). The main difference is that in solid electrolytes the corresponding chemistries are typically designed to minimize a volume change in the electrodes, the volume change provoked by ion migration due to an applied potential (FIG. 18A), where the electrolyte concentration is to be constant during the charge and discharge cycles. On the other hand, in an electrochemical actuator, a different effect is desired—e.g., wherein electrode volume and electrolyte concentration are to change. Accordingly, a different chemistry can be needed in order to provoke a differential volume change in the electrodes (FIG. 18B), resulting in compression in one side of the cell and expansion in the opposite side, this phenomena is used to produce a movement proportional to the potential difference applied to the cell.

Ionic liquid epoxide systems according to different embodiments can be variously adapted for the production of respective ones of solid electrolytes and electrochemical actuators. Such an epoxy system can facilitate synthesis of a polymeric matrix (epoxide polymer) with the production of a secondary ionic liquid as a byproduct of the polymerization reaction. A transition between an electrochemical cell with a solid state electrolyte and an electrochemical actuator can be based on design-time selection of the secondary ionic liquid ions and the composition of the electrodes. Also, the presence of these electromechanical properties can allow an ionic liquid epoxide system to provide improved design and development of piezoelectric materials—e.g., due to a strong correspondence between the mechanical stress in a polymer and an applied electrochemical potential. One possible use for this technology is the construction of a wide variety of sensors.

Self-Healing Polymer

Figure 19:
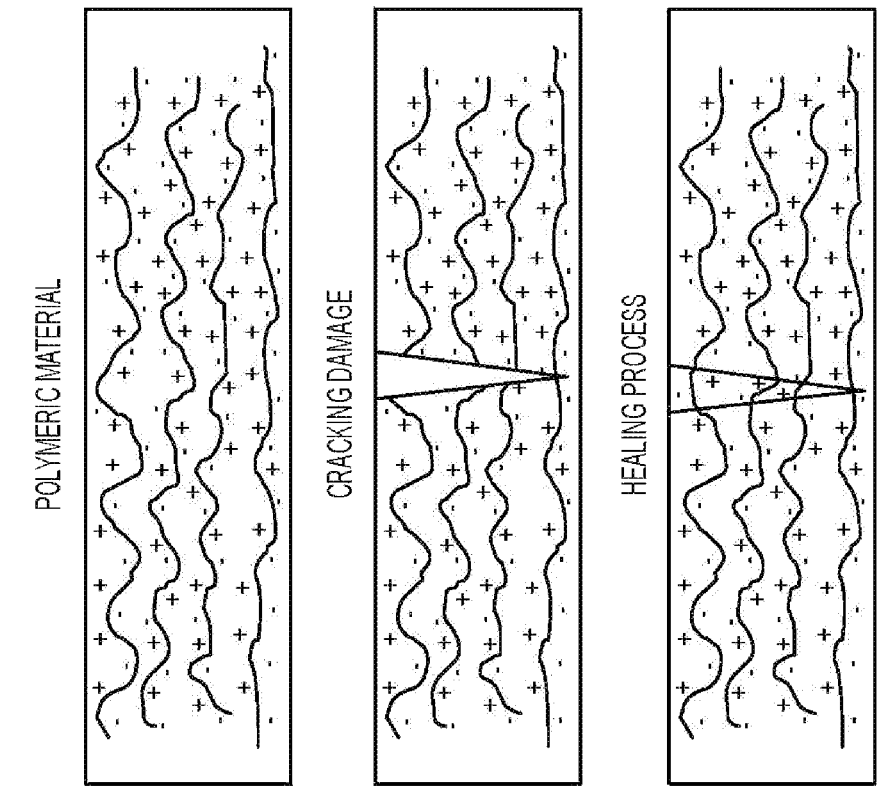
FIG. 19 is a set of cross sectional schematics showing the healing process of polymer systems containing fixed charges in the main chains of the polymer structure. After a mechanical damage (such as cracking) is present, the electrostatic attraction of the charge in the polymer structure carried out the "healing" of the material, in accordance with embodiments disclosed herein.

FIG. 19 shows an example of a self-healing polymer including an epoxy material according to a disclosed embodiment, for example, the epoxy material formed by a reaction such at that shown in scheme 1. Self-healing polymers are materials capable of repair themselves from mechanical damage, as scratches, punctures, or cracking. There are several mechanisms that provide the polymers with the self-healing properties being the most used the formation of micro-capsules filled with the monomeric material and catalysts that react after the formation of the mechanical damage. However, there are also polymeric materials that consist of ionomeric chains, where the healing process is drive for the electrostatic attraction of the charges present in the polymers structure. FIG. 19, shows a cross-sectional illustration of a healing process for this kind of system.

The nature of ionic liquid epoxide systems according to some embodiments can variously enable polymeric chains with fixed charges that are suited to promote self-healing properties of a material, for example, wherein a secondary ionic liquid produced during the polymerization reaction is to act as a plasticizer improving the mechanical behavior of the final product.

Polymer Films

Figure 20:
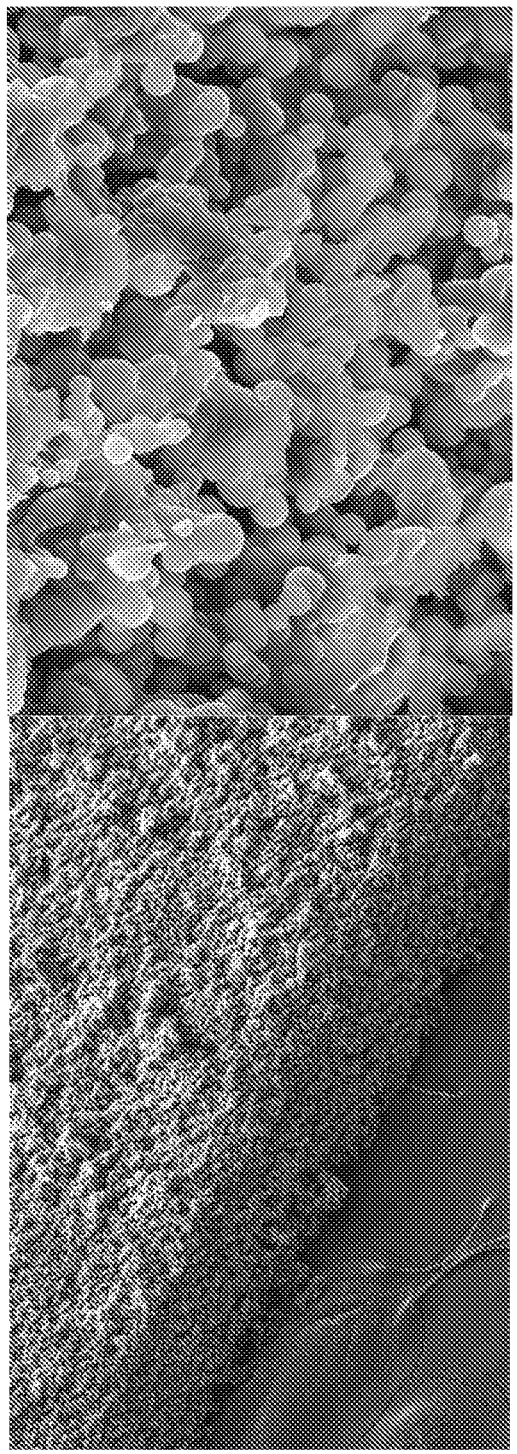
FIG. 20 is a set of scanning electron microscope (SEM) images of a Jeffamine-BPA film cured in presence of 50% w/w of tetrabutylphosphonium TFSI ionic liquid. Before the SEM analysis the film was washed with methanol several times in order to remove the ionic liquid and dried in a vacuum oven (35 C° full vacuum, 48 hours), in accordance with embodiments disclosed herein.
Figure 21A:
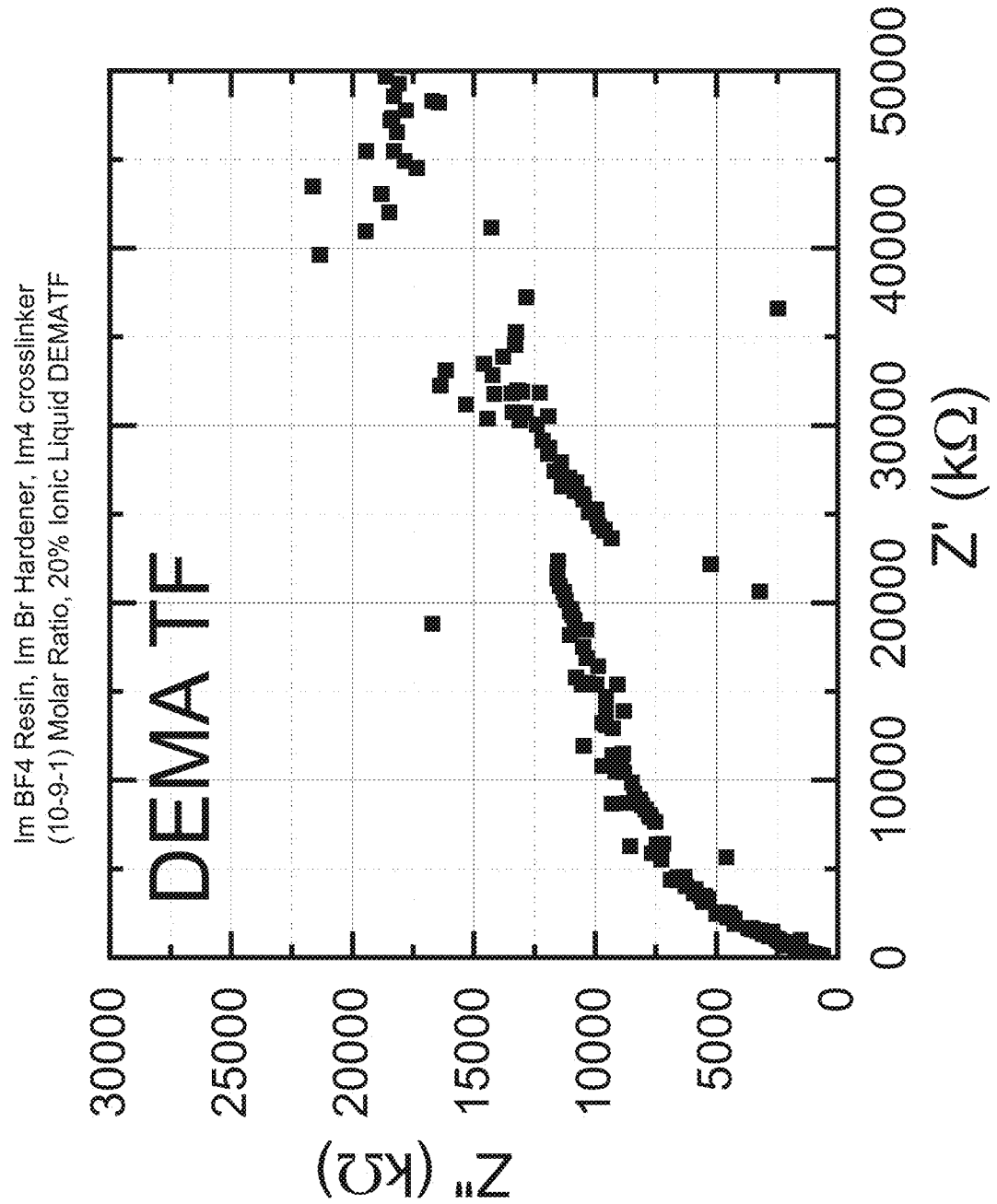
FIGS. 21A-21E are electrochemical impedance spectra for polymers using an imidazolium BF4 resin, Imidazolium bromide hardener, and tetraimidazolium bromide crosslinker (molar ratio 10:9:1) the polymer sample is placed between two Zn plates (99.99% purity, polished with 0.05 μm alumina) and 20% m/m additional ionic liquid as follow: 21A) 20% w/w Diethyl methylammonium triflate, 21B) 20% w/w 0.2M ZnCl/P4448Br, 21C) 20% w/w 0.2M LiTFSI/P4448Br, 21D) 20% w/w 1M LiClO3/P4448Br, and 21E) 20% w/w 1M LiPF6/P4448Br.
Figure 21B:
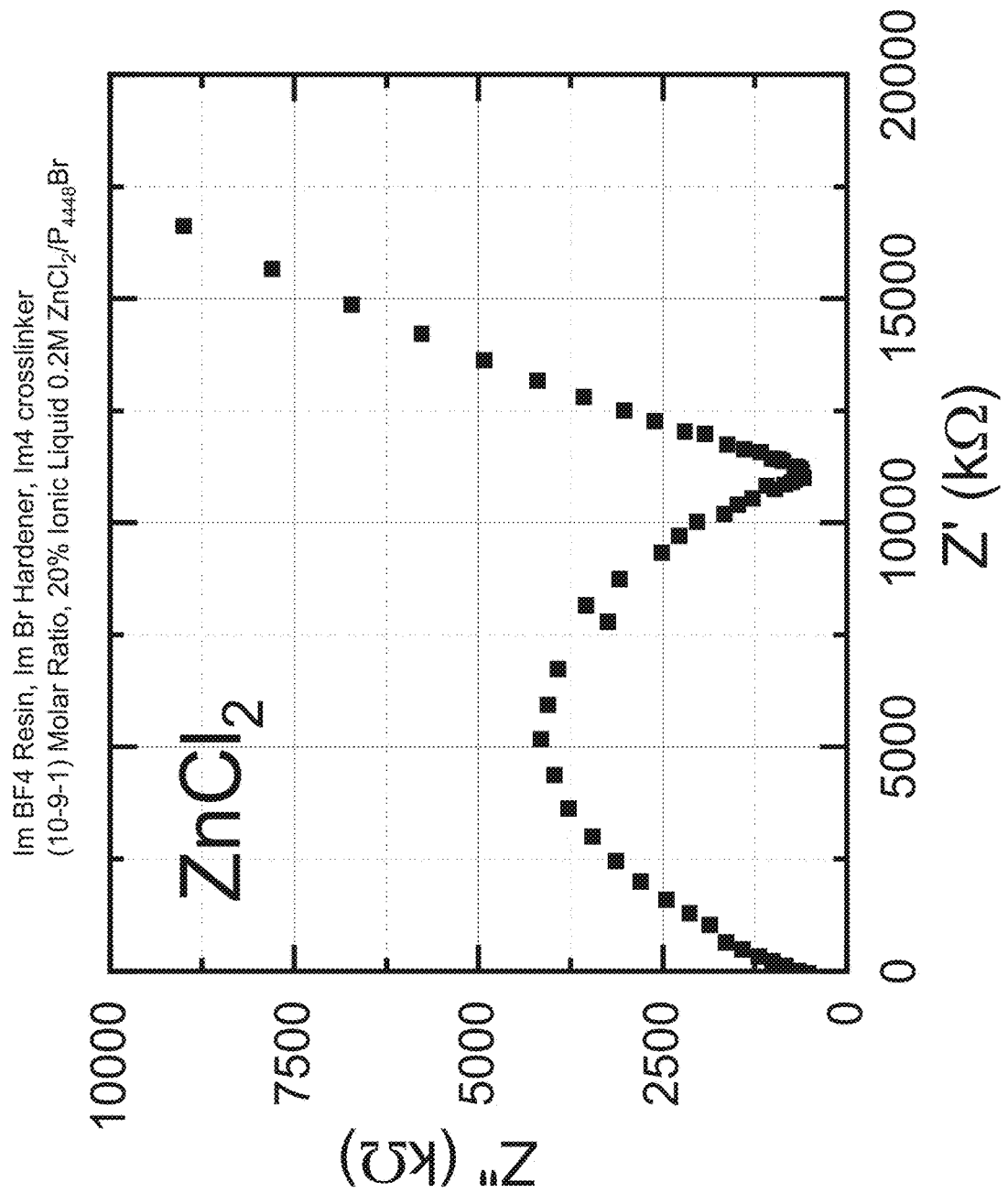
Figure 21C:
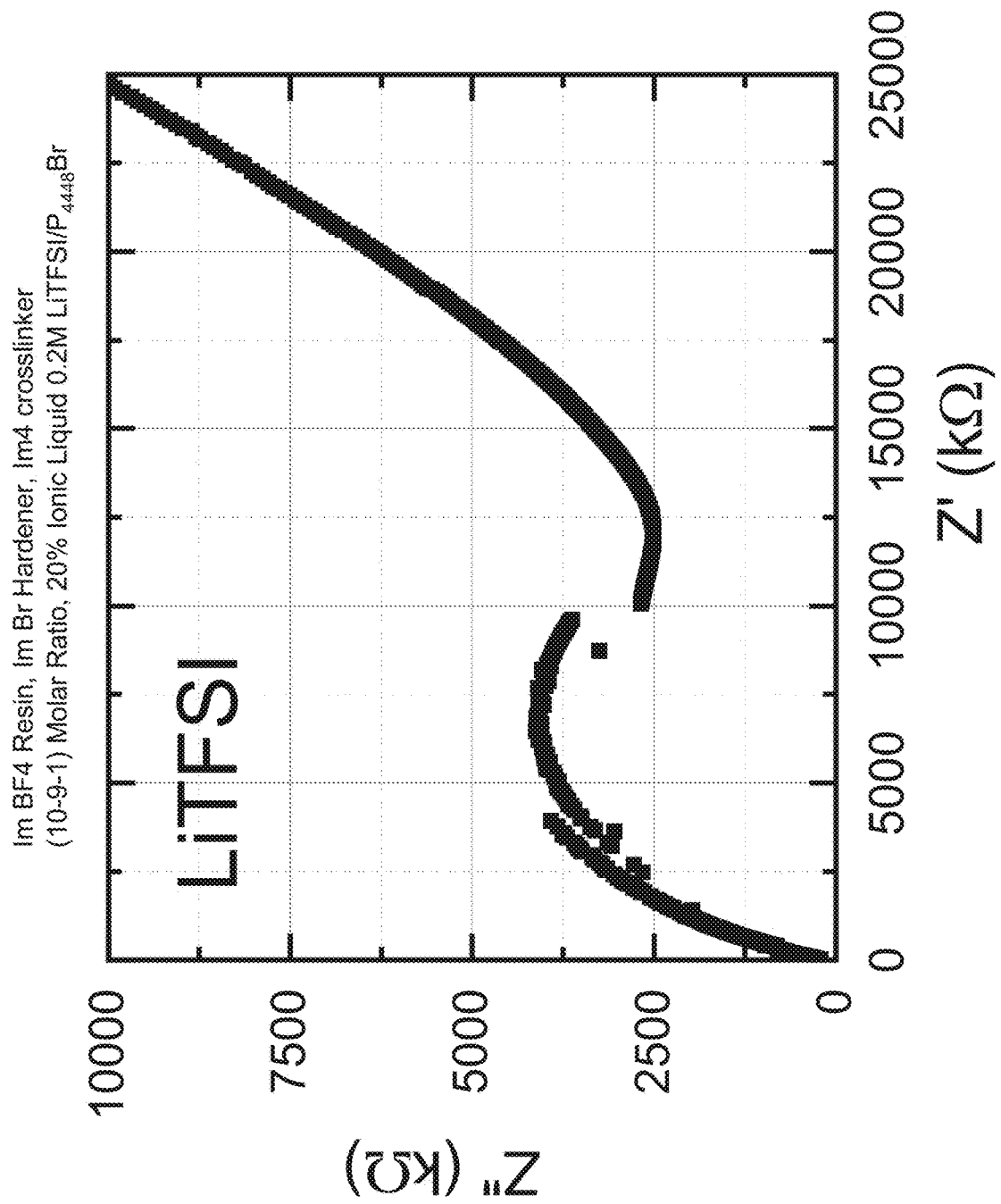
Figure 21D:
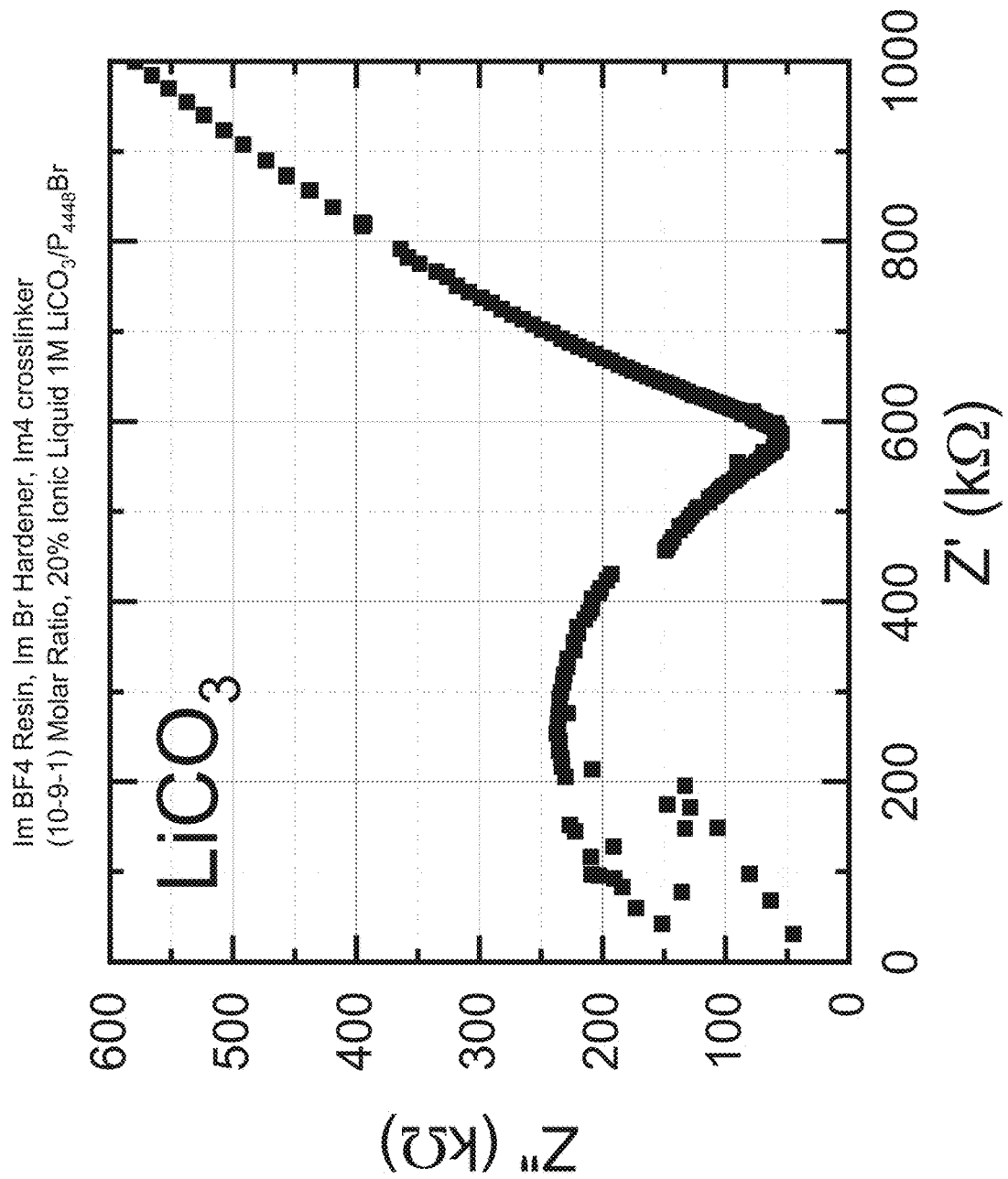
Figure 21E:
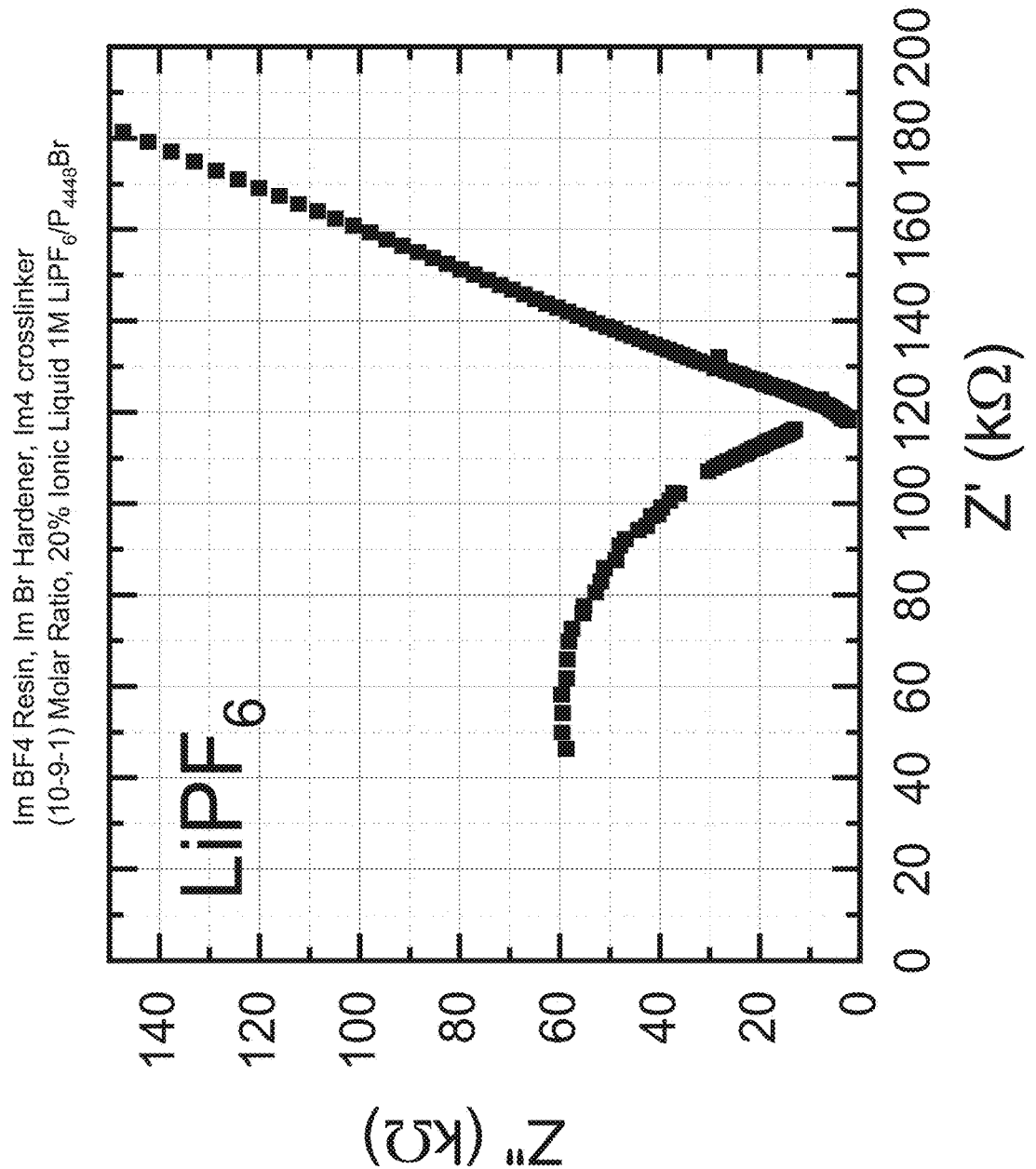

FIG. 20 shows an example of a film including an epoxy material according to disclosed embodiments, for example, the epoxy material formed by a reaction such at that is shown in scheme 1.

Modification of epoxide polymers using an ionic liquid can be performed to change curing reaction conditions, such as temperature, time, hardener/resin ratio and/or the like. For example, ionic liquid content in an epoxy system can be in a range of 2 to 5 parts per hundred rubber (phr) when utilized as a modifier. Ionic liquids can be used in a range of 5 to 10 phr to modify the viscosity of some epoxide components during a curing process. However, with higher ionic liquids contents (around 30 to 70% w/w of the total mass), the ionic liquid tends to produce void space in the final material. After washing out this ionic liquid, the resulting material is a highly porous solid with porous size in the order of 10-20 μm (See FIG. 20 SEM image of a Jeffamine-BPA system with 50% tetrabutyl phosphonium TFSI ionic liquid). An ionic liquid epoxide system according to some embodiments can produce similar results, with a final product that could be used as a filter structure with a highly regular porous size. By modifying the ionic liquid content, it can be possible to selectively design ("tune") the resulting porous size and selectivity of the filter system.

Battery Separators with Solvent-Less Ionic Liquids Epoxy Resins (SILER)

In embodiments, the disclosed ionic liquids are used as ionic thermosetting crosslinkers. For example, in some embodiments, the molecules with structures provided in Table 1 are used as IT-crosslinkers. It is contemplated that the disclosed ionic liquids can be used as ionic thermosetting crosslinkers for various industrial uses. In some specific embodiments, IT-crosslinkers are used in the construction of battery separators together with Solvent-less Ionic Liquids Epoxy Resins (SILER). The ionic conductivity is an essential property to those materials. FIGS. 21A-23 show studies demonstrating the ability of disclosed compositions to be used as IT-crosslinkers. First, several samples of SILER polymers modified with IT-crosslinkers and containing additional ionic liquid were tested by electrochemical impedance spectroscopy. Full polymer samples were placed between two Zn plates, and the thickness controlled using a customized hand press and connected to a GAMRY potentiostat. The polymer samples had the same basic formulation, (imidazolium BF4 resin, imidazolium bromide hardener, and tetraimidazolium bromide crosslinker, in a molar ratio of 10:9:1, respectively) and were modified with a 20% m/m additional ionic liquid to improve the conductivity of the material. The polymers samples were cured overnight at 60° C. to ensure full polymerization. Diethylmethylammonium triflate (DEMATF) was added to one sample to determine proton conductivity; another had zinc chloride, 0.2 M in tributyloctylphosphonium bromide, mimicking typical concentrations found in commercial zinc batteries. Three samples were modified with different lithium compounds used in lithium batteries: lithium bis(trifluoromethane)sulfonamide (LiTFSI, 0.2 M), lithium carbonate (LiCO3, 1 M), and lithium hexafluorophosphate (LiPF6, 1 M) in tributyloctylphosphonium bromide. The resulting electrochemical impedance spectra are shown in FIGS. 21A-21E. The following increasing order of conductivity for the Ionic Thermo-setting polymer samples was DEMATF<ZnCl2<LiTFSI<LiCO3<LiPF6. The Z' values at the intercept were estimated by the best fitting semicircle equation, and the corresponding conductivities were calculated using the specific geometrical dimensions for each sample and are shown in Table 2 below. The conductivity for the polymer containing 1M of $LiPF_6$ is three orders of magnitude higher than the one with DEMATF (see Table 2). It is of interest to note that traditional epoxy polymers would need to reach an ionic liquid content in the range of 40 to 60% to have similar conductivities, the reduction from 60 to 20 percent by weight indicates an advantage of the IT structure to ionic conductivity over non-ionic epoxy materials.

TABLE 2

Conductivity values in uS/m for SILER polymer samples containing 20% m/m of the additional ionic liquid. Electrochemical cells were assemble using two Zn plates and connected to a Gamry potentiostat. Values were estimated from electrochemical impedance Z' at the intercept and individual geometrical dimensions.

| Compound | Conductivity (uS/m) |
| --- | --- |
| DEMATF | 8.27 |
| $ZnCl_2$ (0.2M) | 37.47 |
| LiTFSI (0.2M) | 52.5 |
| $LiCO_3$(1M) | 1274.5 |
| $LiPF_6$(1M) | 6208.09 |

Figure 22A:
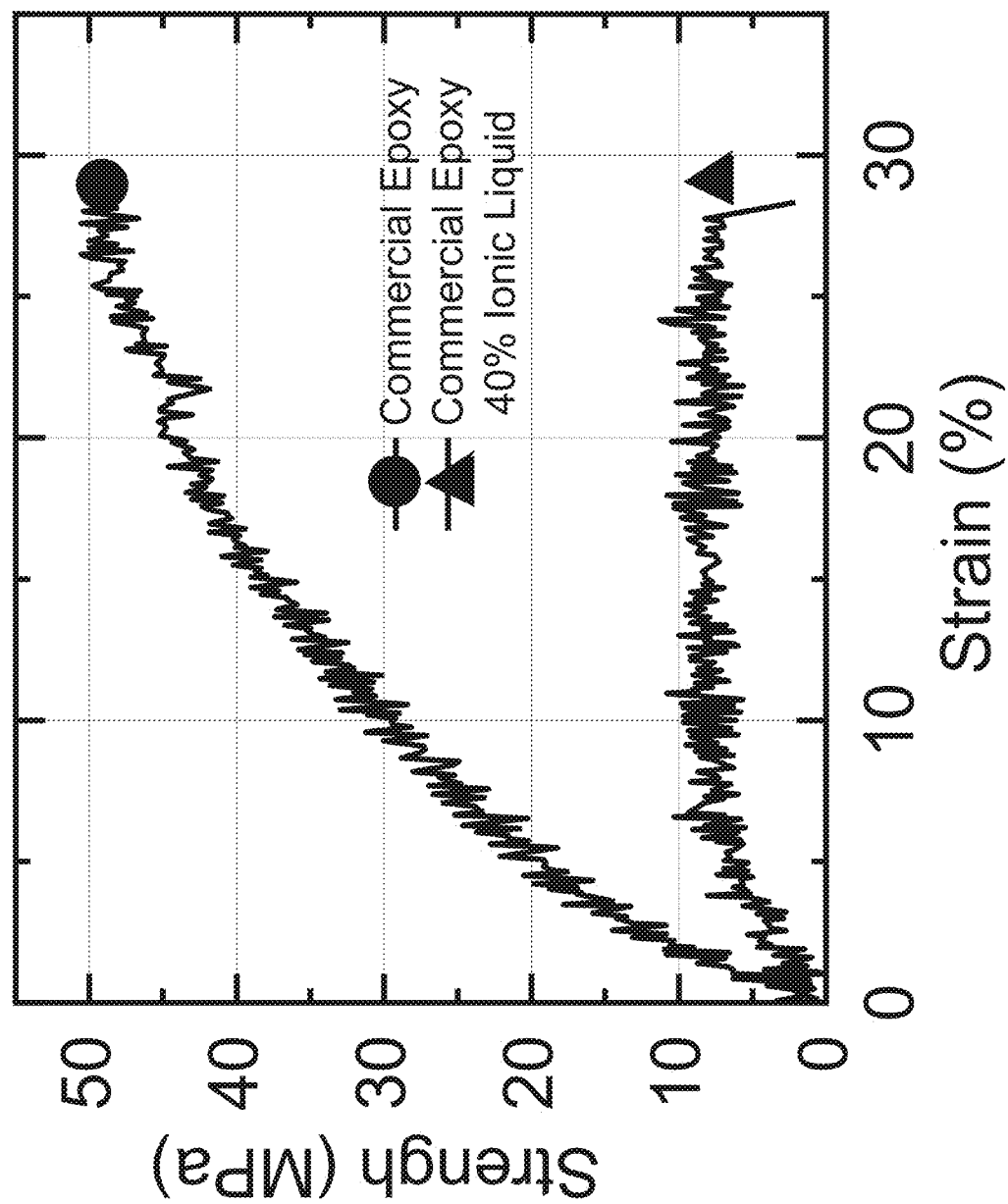
FIGS. 22A and 22B are strength versus strain plots recorded for commercial epoxy polymer without (22A, oval) and with 40% additional P4448Br ionic liquid (22A, triangle), and comparison of a commercial epoxy sample (22B, rectangle) with polymers (imidazolium BF4 resin, Imidazolium bromide hardener, and tetraimidazolium bromide or linear triamine crosslinker (molar ratio 10:9:1)) tetraimidazolium crosslinker (22B, triangle) and triamine linear crosslinker (22B, oval), polymers contain 20% additional ionic liquid, tributyloctylphosphonium bromide.
Figure 22B:
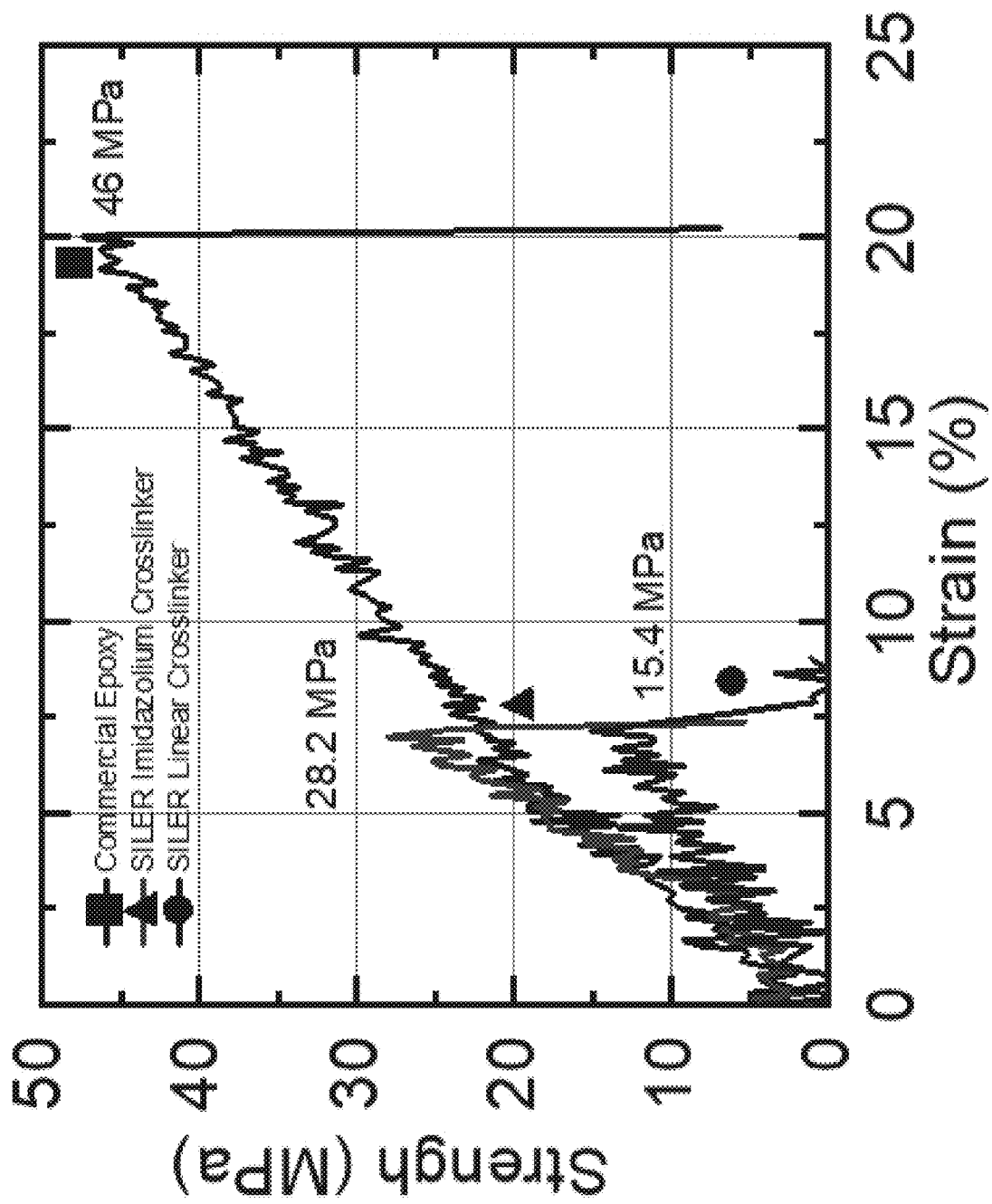

The tensile strength of different SILER polymers modified with IT-crosslinkers in a wide range of compositions and their comparison with fully formulated commercial polymers was investigated (see FIGS. 22A and 22B). FIGS. 22A and 22B show typical tensile strength vs. strain for a commercial epoxy polymer alone and IT-Crosslinker polymers; all polymers were molded into a dog-bone shape (46 mm×10 mm×2 mm). The maximum strength for the commercial polymer was 46 MPa when this polymer was cured with an addition of 40% m/m of tributyloctylphosphonium bromide, necessary of sufficient ionic conductivity in battery separators; the maximum tensile strength decreased to 8 MPa. Also, significant viscoelastic behavior was observed before the sample fracture, which is believed to be related to the plasticization effect of the additional ionic liquid.

SILER/IT-Crosslinker polymer samples (either with a composition of imidazolium $BF_4$ resin, imidazolium bromide hardener and triethylmethylammonium bromine crosslinker (FIG. 22B, triangle) or tetraimidazolium amine bromine crosslinker (FIG. 22B, oval) in a mol ratio of 10:9:1) contained 20% additional ionic liquid. SILER polymer using the linear triamine crosslinker had an ultimate tensile strength value of 15.4 MPa, and the corresponding to the tetraimidazolium amine crosslinker was 28.2 MPa. In both cases, there was no significant presence of a viscoelastic region. It is contemplated that SILER/IT-Crosslinker polymers may include an additive balance to match that of the commercial epoxies to impart improved curing and maximum strength. Thus, the disclosed polymers provide improved mechanical strength characteristics which are not sacrificed for increased ionic conductivity.

Figure 23:
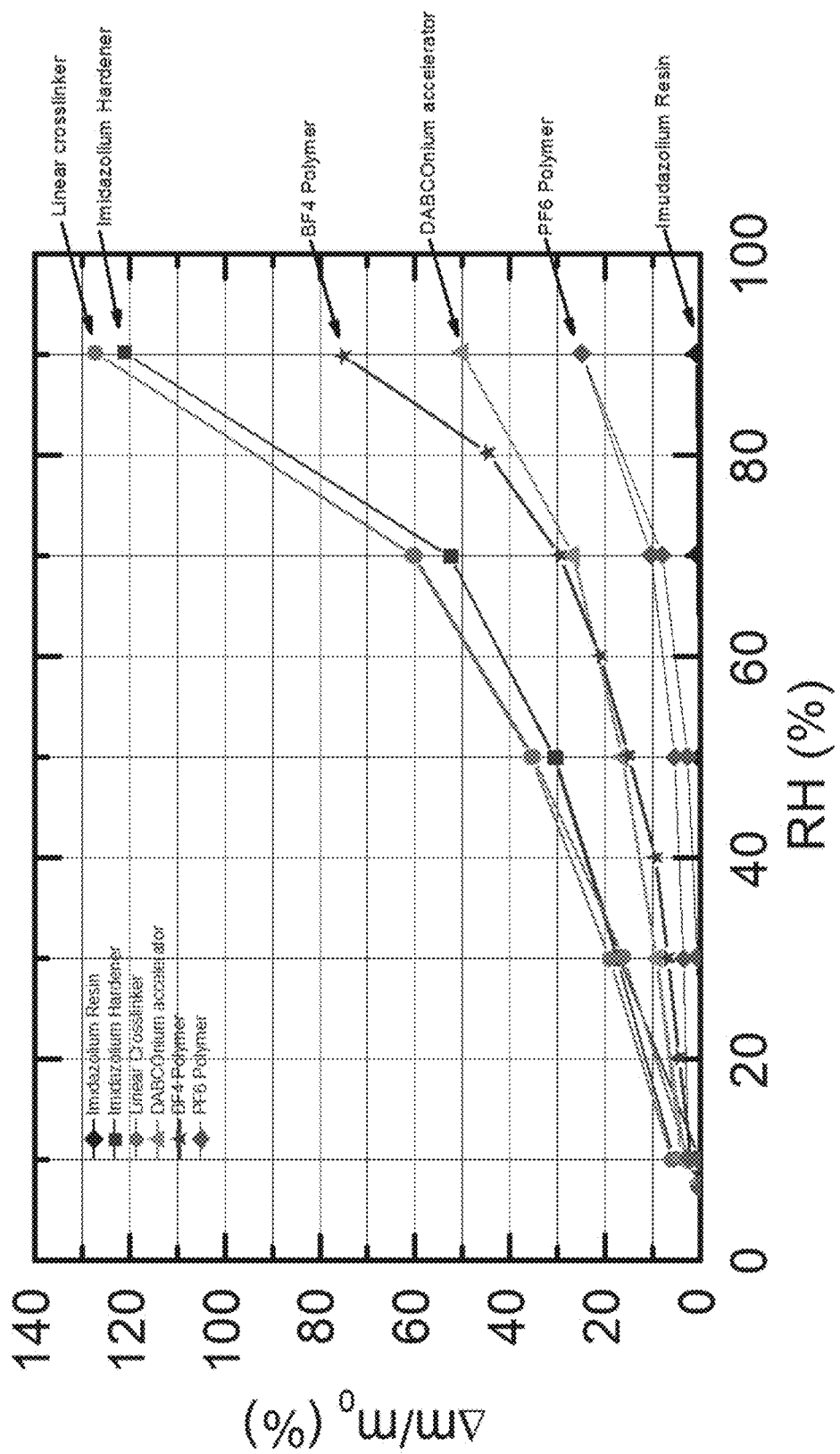
FIG. 23 is a plot of water absorption mass change with respect to relative humidity by Surface Sorption Analyzer for Imidazolium BF4 resin (diamonds), imidazolium bromide hardener (red squares), triamine linear crosslinker (circles), DABCOnium bromide accelerator (triangles), BF4 polymer (stars), and PF6 polymer (diamonds). Equilibria times were set up for mass changes lower to 0.05% and recorded in forward and backward directions.

Another property tested was the capacity of SILER components and polymers to absorb water vapor. In order to measure this property, samples of imidazolium $BF_4$ resin, imidazolium bromide hardener linear triethylmethyl ammonium crosslinker and two SILER polymers (10:9:1 resin: hardener:crosslinker one using the $BF_4$ resin and another using the $PF_6$ version of the same), were stabilized at different relative humidities: 10, 30, 50, 70, and 90% until a minimum mass change was detected. Typical isotherms, plotted as $\Delta m/m_0$ vs. RH, are shown in FIG. 23. The linear crosslinker and the imidazolium bromide hardener were shown to have higher water uptake at all the relative humidities, with a maximum of 127% and 120% respectively. SILER imidazolium $BF_4$ resin shows a negligible water uptake at all RH. The polymers have a behavior dependent on the resin anion. The polymer with the most hydrophobic anion ($PF_6$) has a maximum $\Delta m/m_0$ value of 27% (90% RH), and the less hydrophobic ($BF_4$) is close to three times higher with a 76% at the same relative humidity. There is no appreciable hysteresis in the behavior of the $\Delta m/m_0$ vs RH plots for all the samples when the direction of the RH sweep is reversed, showing a reversible water absorption/desorption process.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. An epoxy system, comprising:
   a hardener compound H comprising a structure represented by $R_1$-$(Y)_n$ and an ionic moiety A, wherein:
   $R_1$ is an ionic moiety comprising a 2-methyl substituted imidazolium,
   Y is a nucleophilic group,
   n is an integer between 2 and 10 inclusive, and
   A is a counter ion to $R_1$; and
   an epoxy compound E comprising a structure represented by $R_2$-$(Z)_p$ and an ionic moiety B, wherein:
   $R_2$ is an ionic moiety,
   Z comprises an epoxide group,
   p is an integer between 2 and 10 inclusive, and
   B is a counter ion to $R_2$,
   wherein the hardener compound H and the epoxy compound E are configured to form a polymer when mixed.

2. The epoxy system of claim 1, wherein the epoxy compound E is a solvent-less ionic liquid.

3. The epoxy system of claim 1, wherein the hardener compound H is a solvent-less ionic liquid.

4. The epoxy system of claim 1, wherein the structure represented by $R_1$-$(Y)_n$ is 1,3,5-tris[1-(2'-aminoethyl)-2-methyl-1H-imidazol-3-iummethylenelbenzene.

5. The epoxy system of claim 1, wherein the structure represented by $R_1$-$(Y)_n$ is tetrakis[1-(2'-aminoethyl)-2-methyl-1H-imidazol-3-iummethyl]methane.

6. The epoxy system of claim 1, further comprising one or more of an accelerator, a crosslinker, a plasticizer, and an inhibitor.

7. The epoxy system of claim 1, further comprising one or more of the following additives:
   an ionic hydrophobic compound;
   a super-hydrophobic compound;
   an ionic hydrophilic compound;
   an ionic transitional hydrophobic/hydrophilic compound;
   a biological active liquid compound; and
   a plasticizer compound;

wherein the one or more additives are released as an ionic liquid upon polymerization of the hardener compound H and the epoxy compound E.

8. The epoxy system of claim 1, further comprising a plasticizer compound, wherein the plasticizer compound has zero volatility.

9. The epoxy system of claim 1, wherein the polymer comprises a plurality of polymeric chains, each polymeric chain having stable electrical charges along its length.

10. The epoxy system of claim 1, wherein the polymer is porous.

11. The epoxy system of claim 1, wherein the structure represented by $R_1\text{-}(Y)_n$ is 1,3-di(2'-aminoethylene)-2-methylimidazolium.

12. The epoxy system of claim 1, wherein $R_1$ and $R_2$ have the same charge.

13. A filtration membrane, a solid electrolyte, or an exchange membrane comprising the polymer of claim 1.

14. A polymer produced by the polymerization of the epoxy system of claim 1.

15. The polymer of claim 14, wherein the polymer is a solid electrolyte.

16. An electronic component comprising the polymer of claim 15.

17. The electronic component of claim 16, wherein electronic component is a battery, a capacitor, a piezoelectric material, or an electro-actuator.

18. An epoxy system comprising:
a hardener compound H comprising a cation of 2-amino-N,N-bis(2-aminoethyl)-N-methyl-ethanaminium and a counterion A; and
an epoxy compound E comprising a structure represented by $R_2\text{-}(Z)_p$ and an ionic moiety B, wherein:
$R_2$ is an ionic moiety,
Z comprises an epoxide group,
p is an integer between 2 and 10 inclusive; and
B is a counter ion to $R_2$; and
wherein the hardener compound H and the epoxy compound E are configured to form a polymer when mixed.

19. An epoxy system comprising:
a hardener compound H comprising a cation having the following structure and a counterion A

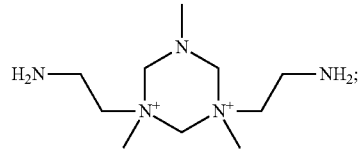

and
an epoxy compound E comprising a structure represented by $R_2\text{-}(Z)_p$ and an ionic moiety B, wherein:
$R_2$ is an ionic moiety,
Z comprises an epoxide group,
p is an integer between 2 and 10 inclusive; and
B is a counter ion to $R_2$; and
wherein the hardener compound H and the epoxy compound E are configured to form a polymer when mixed.

20. An epoxy system comprising:
a hardener compound H comprising a cation having the following structure and a counterion A

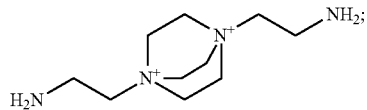

and
an epoxy compound E comprising a structure represented by $R_2\text{-}(Z)_p$ and an ionic moiety B, wherein:
$R_2$ is an ionic moiety,
Z comprises an epoxide group,
p is an integer between 2 and 10 inclusive; and
B is a counter ion to $R_2$; and
wherein the hardener compound H and the epoxy compound E are configured to form a polymer when mixed.

* * * * *